US012001016B2

(12) United States Patent
Edwin et al.

(10) Patent No.: US 12,001,016 B2
(45) Date of Patent: Jun. 4, 2024

(54) WAVEGUIDE-BASED ILLUMINATION FOR HEAD MOUNTED DISPLAY SYSTEM

(71) Applicant: Magic Leap, Inc., Plantation, FL (US)

(72) Inventors: Lionel Ernest Edwin, Hollywood, FL (US); Ivan Li Chuen Yeoh, Wesley Chapel, FL (US); Zhiheng Jia, Weston, FL (US); Adam C. Carlson, Miami, FL (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

(21) Appl. No.: 17/459,958

(22) Filed: Aug. 27, 2021

(65) Prior Publication Data

US 2022/0057630 A1 Feb. 24, 2022

Related U.S. Application Data

(63) Continuation of application No. 16/503,323, filed on Jul. 3, 2019, now Pat. No. 11,106,033.
(Continued)

(51) Int. Cl.
*G09G 5/00* (2006.01)
*F21V 8/00* (2006.01)
(Continued)

(52) U.S. Cl.
CPC ....... *G02B 27/0093* (2013.01); *G02B 6/0025* (2013.01); *G02B 6/0028* (2013.01);
(Continued)

(58) Field of Classification Search
CPC .......... G02B 27/0093; G02B 6/0025; G02B 6/0028; G02B 6/0031
(Continued)

(56) References Cited

U.S. PATENT DOCUMENTS 6,850,221 B1 2/2005 Tickle
9,081,426 B2 7/2015 Armstrong
(Continued)

FOREIGN PATENT DOCUMENTS

WO WO 2016/179246 11/2016
WO WO 2020/010271 1/2020

OTHER PUBLICATIONS

International Search Report and Written Opinion for PCT Application No. PCT/US 19/40633, dated Sep. 24, 2019.
(Continued)

*Primary Examiner* — Jonathan M Blancha
(74) *Attorney, Agent, or Firm* — Seed IP Law Group LLP

(57) ABSTRACT

A head-mounted display system is configured to project light to an eye of a user wearing the head-mounted display system to display content in a vision field of said user. The head-mounted display system comprises at least one diffusive optical element, at least one out-coupling optical element, at least one mask comprising at least one mask opening, at least one illumination in-coupling optical element configured to in-couple light from at least one illumination source into a light-guiding component, an image projector configured to in-couple an image and an at least one illumination source is configured to in-couple light into at least one illumination in-coupling optical element, an eyepiece, a curved light-guiding component, a light-guiding component comprising a portion of a frame, and/or two light-guiding components disposed on opposite sides of at least one out-coupling optical element.

18 Claims, 31 Drawing Sheets

Related U.S. Application Data

(60) Provisional application No. 62/694,366, filed on Jul. 5, 2018.

(51) Int. Cl.
  *G02B 27/00* (2006.01)
  *G02B 27/01* (2006.01)
  *G06F 3/01* (2006.01)
  *G06T 19/00* (2011.01)

(52) U.S. Cl.
  CPC ........ *G02B 6/0031* (2013.01); *G02B 27/0176* (2013.01); *G06F 3/013* (2013.01); *G06T 19/006* (2013.01); *G02B 2027/0138* (2013.01); *G02B 2027/0174* (2013.01)

(58) Field of Classification Search
  USPC .......................................................... 345/8
  See application file for complete search history.

(56) References Cited

U.S. PATENT DOCUMENTS

| | | |
|---|---|---|
| 9,215,293 B2 | 12/2015 | Miller |
| 9,348,143 B2 | 5/2016 | Gao et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| 9,740,006 B2 | 8/2017 | Gao |
| 9,791,700 B2 | 10/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 11,106,033 B2 | 8/2021 | Edwin et al. |
| 2005/0024558 A1 | 2/2005 | Toyooka |
| 2006/0028436 A1 | 2/2006 | Armstrong |
| 2007/0081123 A1 | 4/2007 | Lewis |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0101253 A1* | 4/2013 | Popovich ............. G02B 27/017 385/37 |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2014/0306878 A1 | 10/2014 | Bhakta |
| 2014/0354953 A1* | 12/2014 | Chen ....................... G06F 3/013 351/221 |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0235461 A1 | 8/2015 | Schowengerdt |
| 2015/0268415 A1 | 9/2015 | Schowengerdt et al. |
| 2015/0302652 A1 | 10/2015 | Miller et al. |
| 2015/0309263 A2 | 10/2015 | Abovitz et al. |
| 2015/0310670 A1 | 10/2015 | Grossinger |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0037146 A1* | 2/2016 | McGrew ................ G03H 1/28 353/38 |
| 2017/0007450 A1 | 1/2017 | Samec et al. |
| 2017/0122725 A1 | 5/2017 | Yeoh et al. |
| 2017/0227764 A1* | 8/2017 | Kim ................... G02B 27/0103 |
| 2017/0285344 A1* | 10/2017 | Benko .................. G06T 19/006 |
| 2017/0295362 A1* | 10/2017 | Travis ................. H04N 13/128 |
| 2017/0299860 A1* | 10/2017 | Wall ........................ G02B 3/04 |
| 2017/0323485 A1 | 11/2017 | Samec et al. |
| 2017/0330042 A1* | 11/2017 | Vaziri .................... H04N 23/56 |
| 2018/0067318 A1 | 3/2018 | St. Hilaire |
| 2018/0136471 A1 | 5/2018 | Miller et al. |
| 2018/0252857 A1* | 9/2018 | Glik ........................ G02B 6/00 |
| 2018/0335628 A1* | 11/2018 | Hung ....................... G02B 6/00 |
| 2018/0365490 A1* | 12/2018 | Agrawal .............. G06V 40/193 |
| 2019/0004325 A1* | 1/2019 | Connor ............. G02B 27/0172 |
| 2019/0196199 A1* | 6/2019 | Matsuki ............ G02B 27/0172 |
| 2020/0012095 A1 | 1/2020 | Edwin et al. |

OTHER PUBLICATIONS

International Preliminary Report on Patentability for PCT Application No. PCT/US 19/40633, dated Jan. 5, 2021.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, Aug. 4, 1997, pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

\* cited by examiner

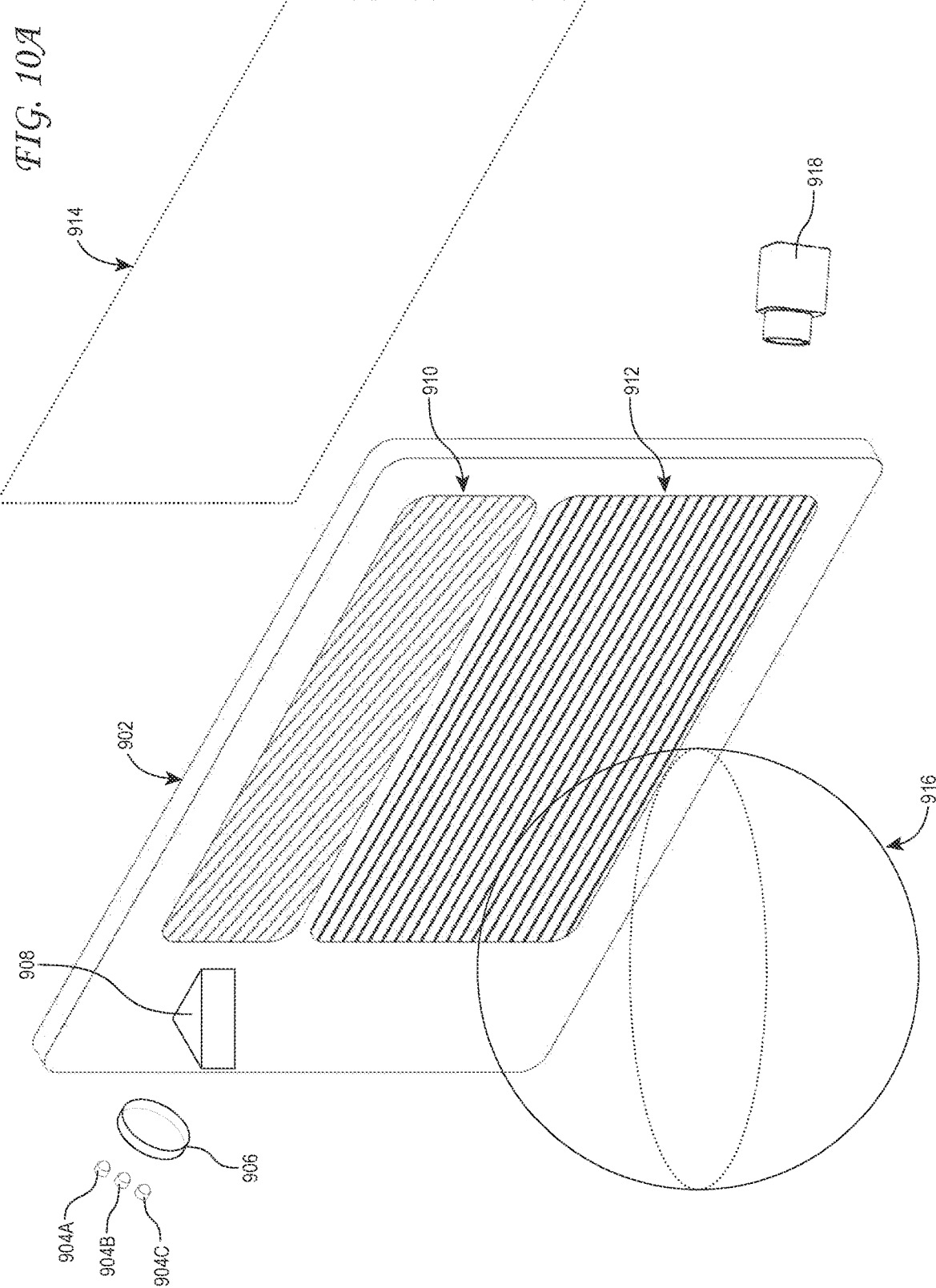

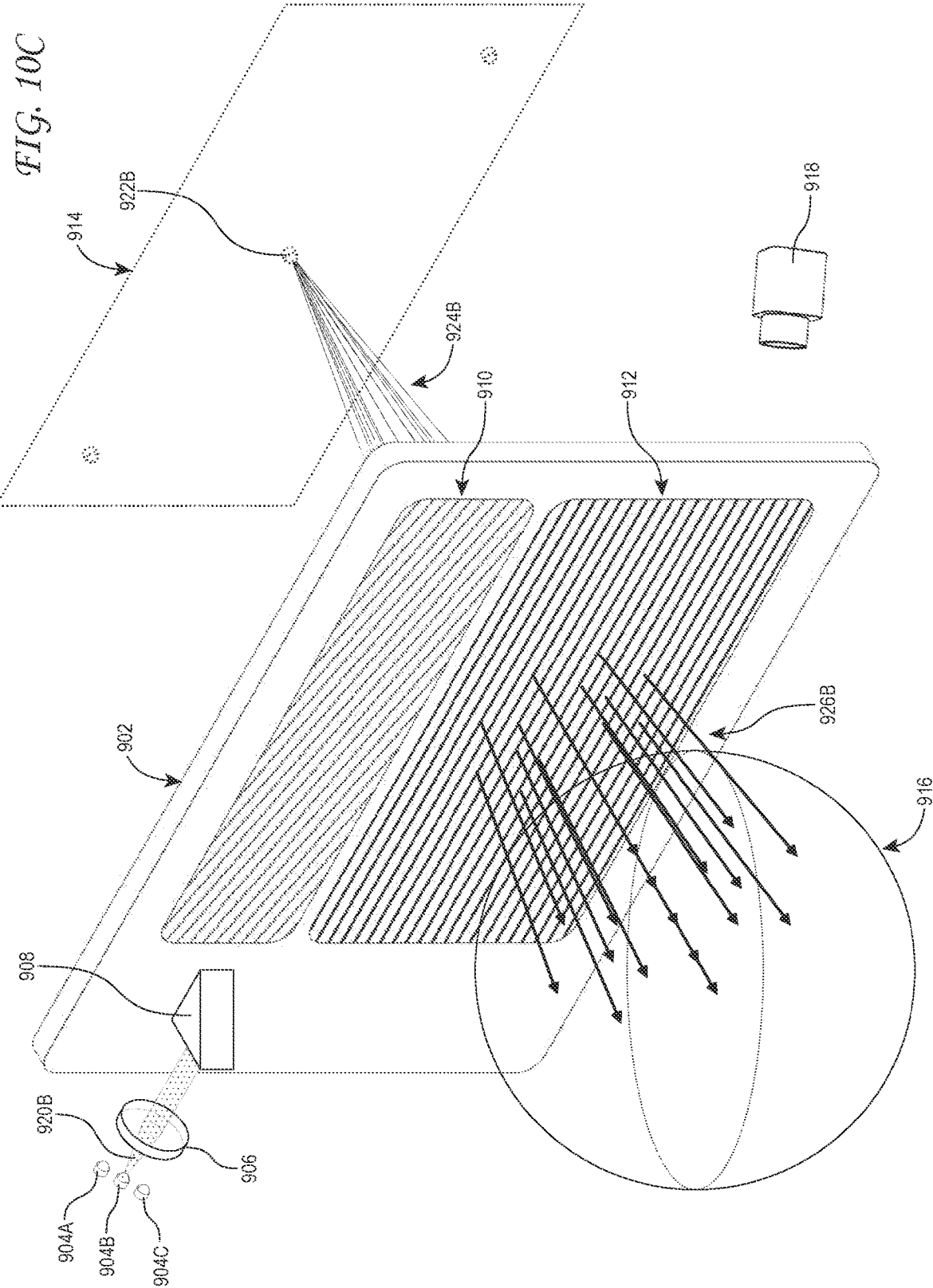

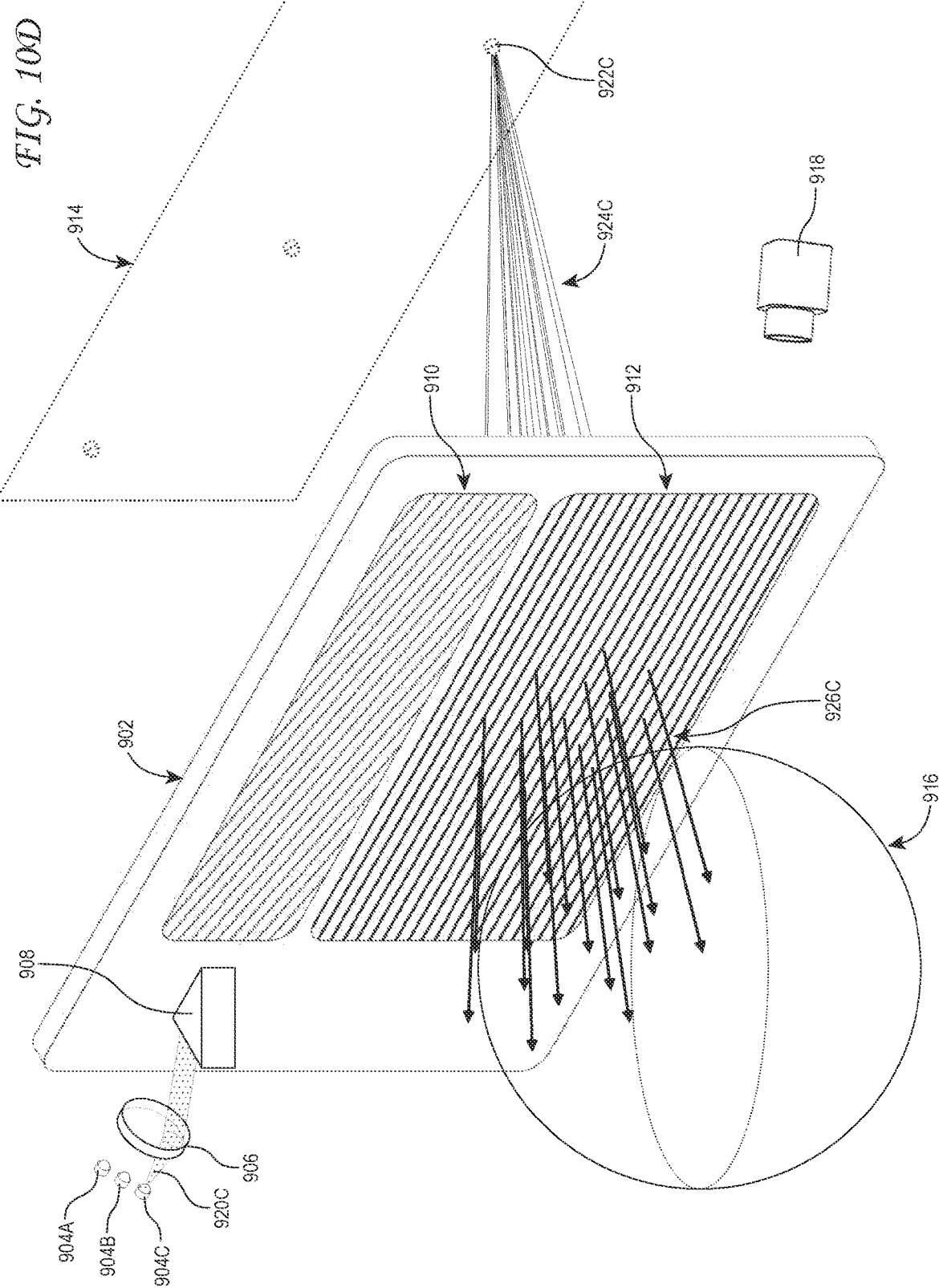

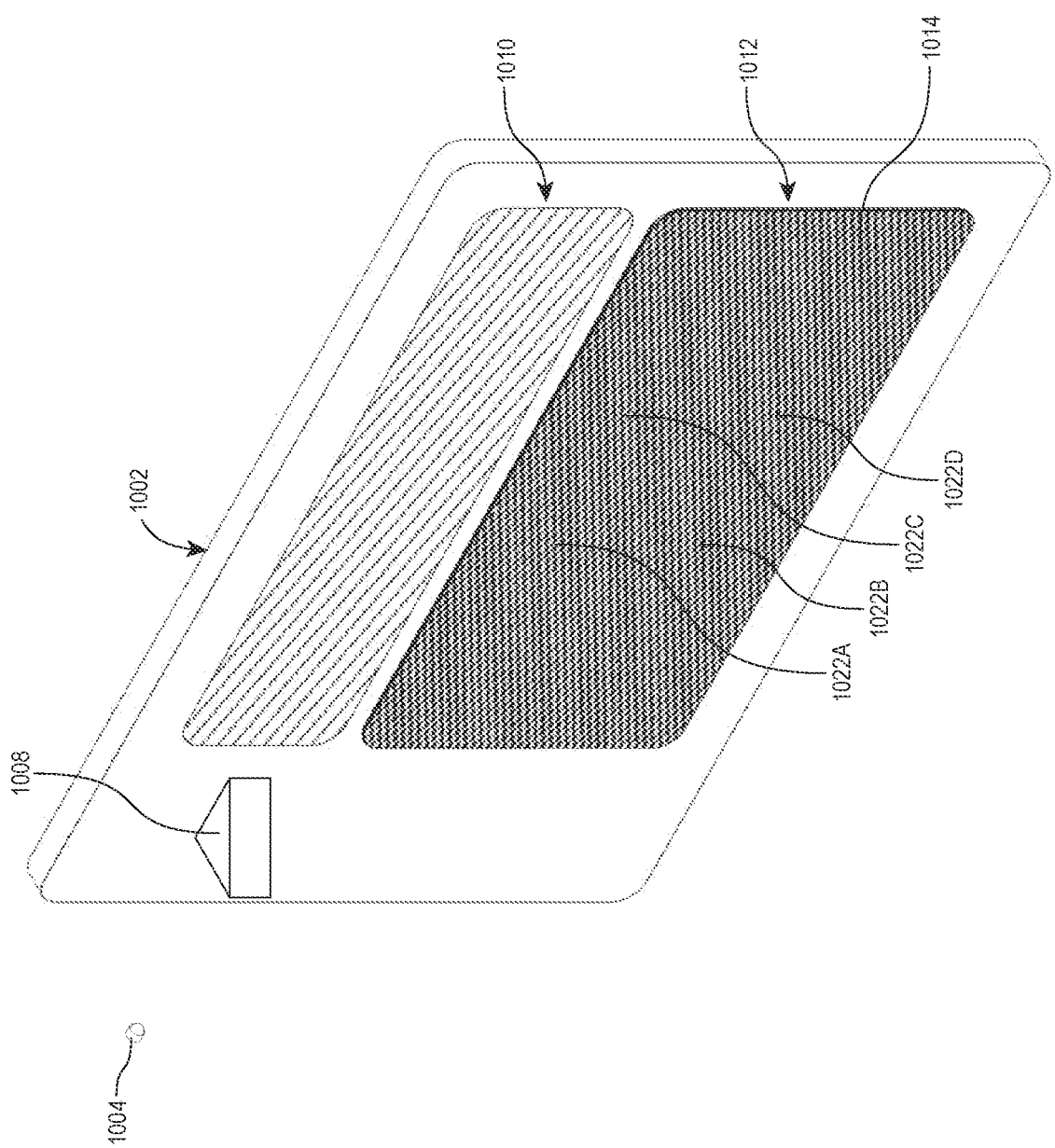

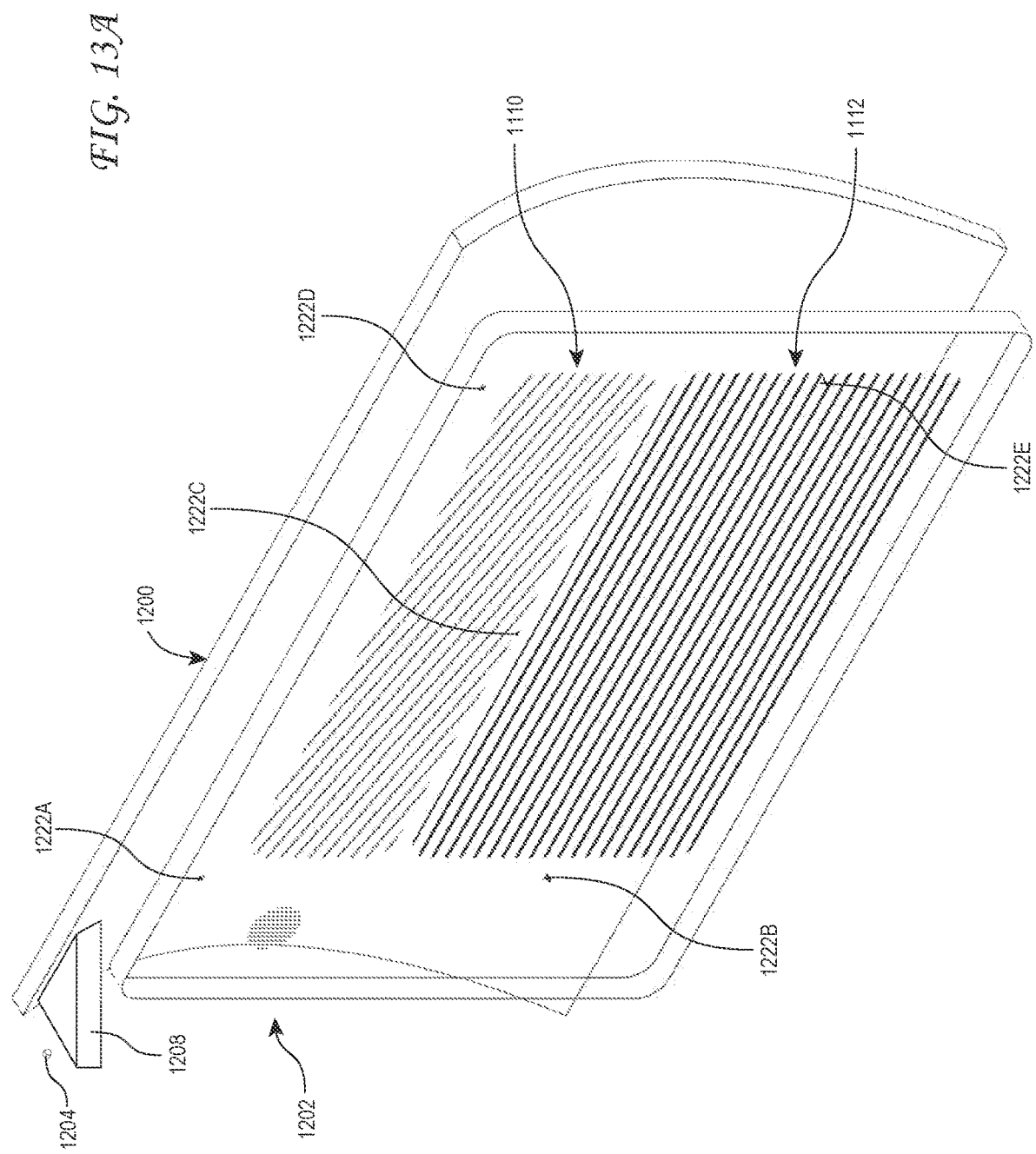

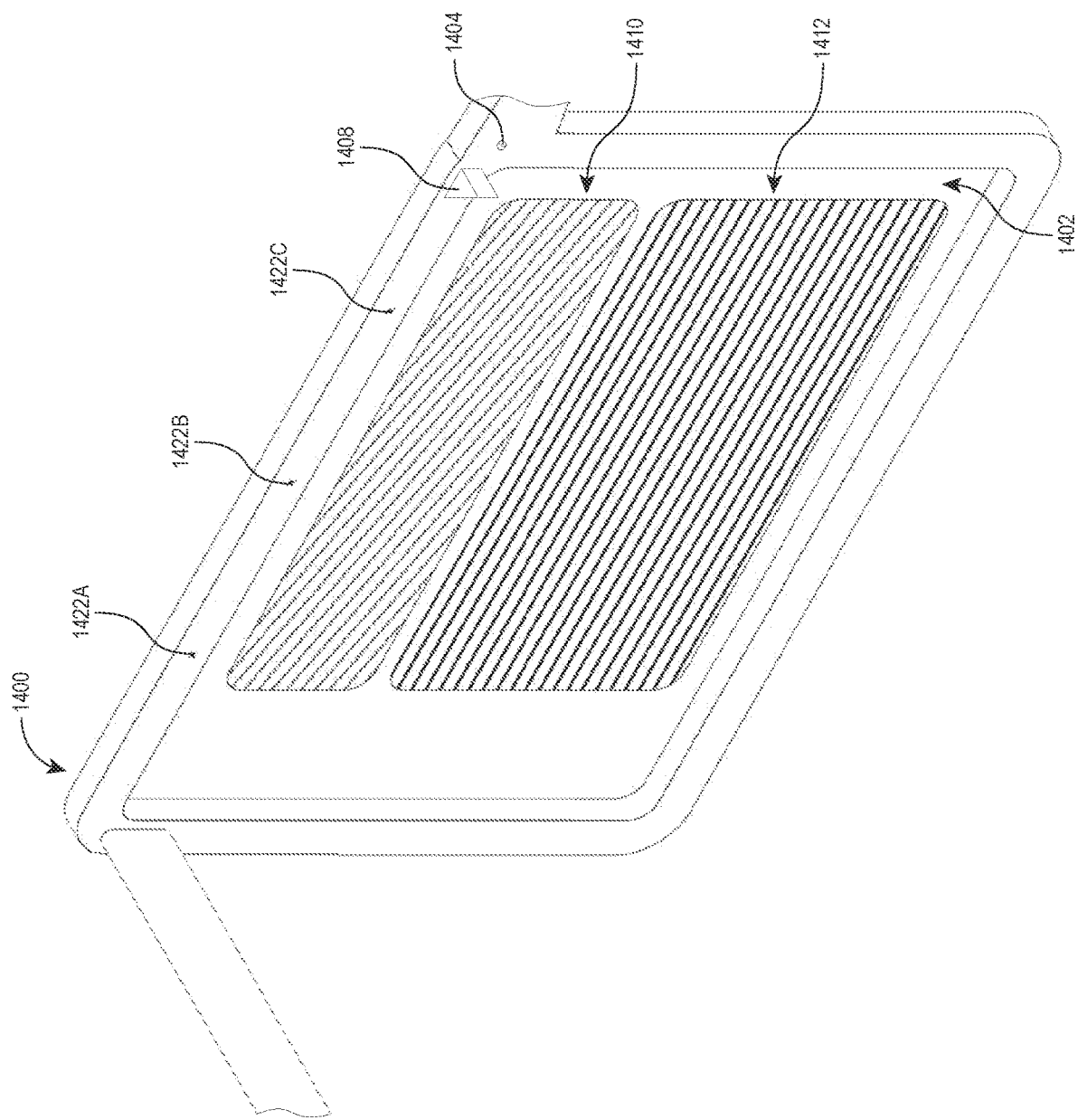

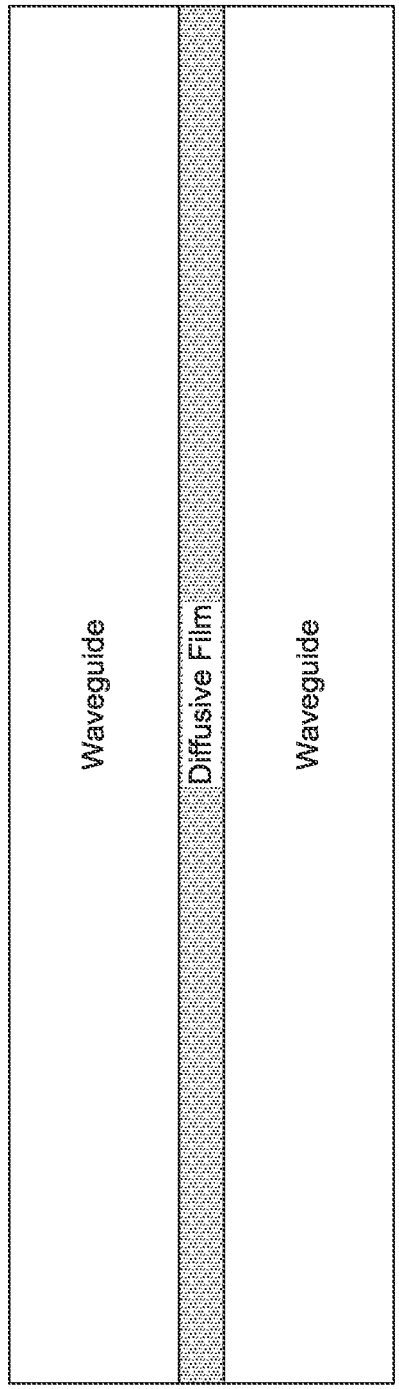
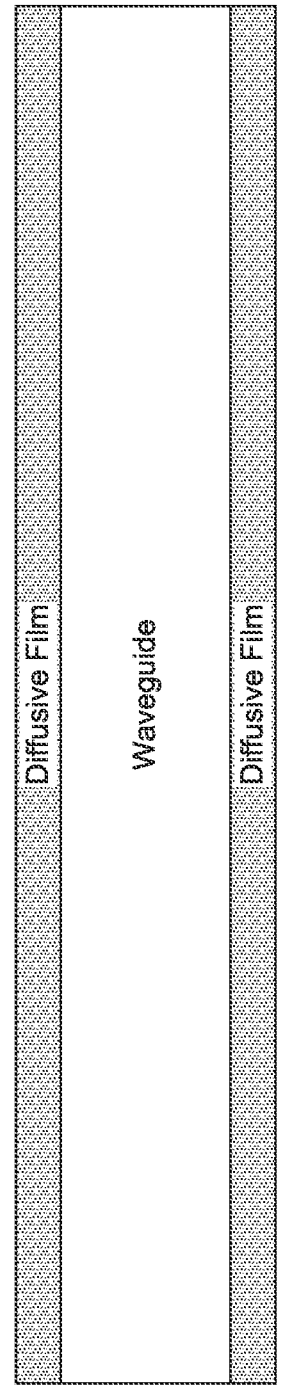
Bidirectional waveguide-diffuser architectures
FIG. 17A
FIG. 17B

WAVEGUIDE-BASED ILLUMINATION FOR HEAD MOUNTED DISPLAY SYSTEM

PRIORITY CLAIM

This application is a continuation of U.S. patent application Ser. No. 16/503,323 filed on Jul. 3, 2019, which claims the priority benefit of U.S. Provisional Patent Application No. 62/694,366 filed on Jul. 5, 2018. Each patent application referenced in this paragraph is hereby incorporated by reference herein in its entirety.

BACKGROUND

Field

The present disclosure relates to display systems and, more particularly, to augmented and virtual reality display systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

Physical LEDs for IR eye tracking are aesthetically bad and impose mechanical placement constraints such that eye tracking performance is sub-optimal. An improved system configuration for illuminating the user's eye with IR light without considerably affecting the mass, power, volume, and cost of the overall system is desired.

SUMMARY

Various examples are provided below.

A head-mounted display system configured to project light to an eye of a user wearing the head-mounted display system to display content in a vision field of said user, said head-mounted display system comprising:
  a frame configured to be supported on a head of the user;
  an image projector configured to project an image;
  at least one illumination source;
  a light-guiding component, said light-guiding component configured so as to be positioned forward one of the user's eyes when the frame is worn by the user;
  at least one illumination in-coupling optical element configured to in-couple light from the at least one illumination source into the light-guiding component so as to guide light from the at least one illumination source therein; and
  at least one diffusive optical element disposed on the light-guiding component so as to be positioned forward one of the user's eyes when the frame is worn by the user, wherein the at least one diffusive optical element is configured to diffusively couple light from the at least one illumination source out of the light-guiding component.

A head-mounted display system configured to project light to an eye of a user wearing the head-mounted display system to display content in a vision field of said user, said head-mounted display system comprising:
  a frame configured to be supported on a head of the user;
  an image projector configured to project an image;
  at least one illumination source;
  a light-guiding component, said light-guiding component configured so as to be positioned forward one of the user's eyes when the frame is worn by the user;
  at least one illumination in-coupling optical element configured to in-couple light from the at least one illumination source into the light-guiding component so as to guide light from the at least one illumination source therein; and
  at least one out-coupling optical element disposed on the light-guiding component so as to be positioned forward one of the user's eyes when the frame is worn by the user, wherein the at least one out-coupling optical element is configured to couple light from the at least one illumination source out of the light-guiding component and cause light coupled out of the light-guiding component to diverge in a manner consistent with light originating from a location a distance forward said light-guiding component.

A head-mounted display system configured to project light to an eye of a user wearing the head-mounted display system to display content in a vision field of said user, said head-mounted display system comprising:
  a frame configured to be supported on a head of the user;
  an image projector configured to project an image;
  at least one illumination source;
  a light-guiding component, said light-guiding component configured so as to be positioned forward one of the user's eyes when the frame is worn by the user;
  at least one illumination in-coupling optical element configured to in-couple light from the at least one illumination source into the light-guiding component so as to guide light from the at least one illumination source therein; and
  at least one mask comprising at least one mask opening disposed on the light-guiding component so as to be positioned forward one of the user's eyes when the frame is worn by the user, wherein the at least one mask and at least one mask opening are configured to couple light from the at least one illumination source out of the light-guiding component through the at least one mask opening.

A head-mounted display system configured to project light to an eye of a user wearing the head-mounted display system to display content in a vision field of said user, said head-mounted display system comprising:
- a frame configured to be supported on a head of the user;
- an image projector configured to project an image;
- at least one illumination source;
- a light-guiding component, said light-guiding component configured so as to be positioned forward one of the user's eyes when the frame is worn by the user; and
- at least one illumination in-coupling optical element configured to in-couple light from the at least one illumination source into the light-guiding component so as to guide light from the at least one illumination source therein, said at least one in-coupling optical element comprising a prism,
- wherein said light-guiding component is configured such that light from the illumination source guided within the light-guiding component is coupled out of the light-guiding component.

A head-mounted display system configured to project light to an eye of a user wearing the head-mounted display system to display content in a vision field of said user, said head-mounted display system comprising:
- a frame configured to be supported on a head of the user;
- an image projector configured to project an image;
- at least one illumination source;
- a light-guiding component, said light-guiding component configured so as to be positioned forward one of the user's eyes when the frame is worn by the user; and
- at least one illumination in-coupling optical element configured to in-couple light from the at least one illumination source into the light-guiding component so as to guide light from the at least one illumination source therein;
- wherein said light-guiding component is configured such that light from the illumination source guided within the light-guiding component is coupled out of the light-guiding component, and
- wherein the image projector is configured to in-couple the image and the at least one illumination source is configured to in-couple light into the at least one illumination in-coupling optical element.

A head-mounted display system configured to project light to an eye of a user wearing the head-mounted display system to display content in a vision field of said user, said head-mounted display system comprising:
- a frame configured to be supported on a head of the user;
- an image projector configured to project an image;
- at least one illumination source;
- a light-guiding component, said light-guiding component configured so as to be positioned forward one of the user's eyes when the frame is worn by the user;
- at least one illumination in-coupling optical element configured to in-couple light from the at least one illumination source into the light-guiding component so as to guide light from the at least one illumination source therein; and
- an eyepiece configured to direct light into said user's eye to display augmented reality image content to the user's vision field, at least a portion of said eyepiece being transparent and disposed at a location forward the user's eye when the user wears said frame such that said transparent portion transmits light from the environment forward the user to the user's eye to provide a view of the environment forward the user,
- wherein said eyepiece comprises a waveguide and at least one image in-coupling optical element configured to in-couple light from the image projector into the waveguide so as to guide light from the image projector therein.

A head-mounted display system configured to project light to an eye of a user wearing the head-mounted display system to display content in a vision field of said user, said head-mounted display system comprising:
- a frame configured to be supported on a head of the user;
- an image projector configured to project an image;
- at least one illumination source;
- a light-guiding component, said light-guiding component configured so as to be positioned forward one of the user's eyes when the frame is worn by the user, said light-guiding component being curved; and
- at least one illumination in-coupling optical element configured to in-couple light from the at least one illumination source into the light-guiding component so as to guide light from the at least one illumination source therein,
- wherein said light-guiding component is configured such that light from the illumination source guided within the light-guiding component is coupled out of the light-guiding component.

A head-mounted display system configured to project light to an eye of a user wearing the head-mounted display system to display content in a vision field of said user, said head-mounted display system comprising:
- a frame configured to be supported on a head of the user;
- an image projector configured to project an image;
- at least one illumination source;
- a light-guiding component, said light-guiding component configured so as to be positioned forward one of the user's eyes when the frame is worn by the user, said light-guiding component comprising a portion of said frame; and
- at least one illumination in-coupling optical element configured to in-couple light from the at least one illumination source into the light-guiding component so as to guide light from the at least one illumination source therein,
- wherein said light-guiding component is configured such that light from the illumination source guided within the light-guiding component is coupled out of the light-guiding component.

A head-mounted display system configured to project light to an eye of a user wearing the head-mounted display system to display content in a vision field of said user, said head-mounted display system comprising:
- a frame configured to be supported on a head of the user;
- an image projector configured to project an image;
- at least one illumination source;
- a light-guiding component, said light-guiding component configured so as to be positioned forward one of the user's eyes when the frame is worn by the user; and
- at least one illumination in-coupling optical element configured to in-couple light from the at least one illumination source into the light-guiding component so as to guide light from the at least one illumination source therein, and
- at least one out-coupling optical element disposed on the light-guiding component so as to be positioned forward one of the user's eyes when the frame is worn by the user, wherein the at least one out-coupling optical element is configured to couple light from the at least one illumination source out of the light-guiding component, wherein said light-guiding component comprises two light-guiding components disposed on opposite sides of said at least one out-coupling optical element.

The system of any of the above Examples, wherein said image projector comprises a visible light source and modulator.

The system of any of the above Examples, wherein the light modulator comprises a spatial light modulator.

The system of any of the above Examples, wherein the at least one illumination source comprises an infrared (IR) light source configured to emit IR light.

The system of any of the above Examples, wherein the at least one illumination source comprises a visible light source configured to emit visible light.

The system of any of the Examples above, wherein said light-guiding component comprises a material that is transparent to visible light having a refractive index sufficient to guide light from said at least one illumination source in said light-guiding component by total internal reflection.

The system of any of the Examples above, wherein at least a portion of said light-guiding component is transparent and disposed at a location forward the user's eye when the user wears said frame such that said transparent portion transmits light from the environment forward the user to the user's eye to provide a view of the environment forward the user.

The system of any of the Examples above, wherein the at least one illumination in-coupling optical element comprises at least one prism.

The system of any of the Examples above, further comprising at least one image in-coupling optical element configured to in-couple light from the image projector into the light-guiding component so as to guide light from the image projector therein.

The system of any of the Examples above, wherein the image projector is configured to in-couple the image and the at least one illumination source is configured to in-couple light into the at least one illumination in-coupling optical element.

The system of any of the Examples above, further comprising an eyepiece configured to direct light into said user's eye to display augmented reality image content to the user's vision field, at least a portion of said eyepiece being transparent and disposed at a location forward the user's eye when the user wears said frame such that said transparent portion transmits light from the environment forward the user to the user's eye to provide a view of the environment forward the user.

The system of any of the Examples above, wherein said eyepiece comprises a waveguide and at least one image in-coupling optical element configured to in-couple light from the image projector into the waveguide so as to guide light from the image projector therein.

The system of any of the Examples above, wherein said light-guiding component is disposed on an inside portion of said eyepiece, wherein the inside portion is between the user's eye and the eyepiece.

The system of any of the Examples above, wherein said light-guiding component is disposed on an outside portion of said eyepiece, wherein the outside portion is between the environment and the eyepiece.

The system of any of the Examples above, wherein said light-guiding component is curved.

The system of any of the Examples above, wherein said light-guiding component has the shape of a portion of a cylinder.

The system of any of the Examples above, wherein said light-guiding component comprises a shield or visor attached to said frame.

The system of any of the Examples above, wherein said shield or visor is disposed on an inside portion of said display system.

The system of any of the Examples above, wherein said shield or visor is disposed on an outside portion of said display system.

The system of any of the Examples above, wherein said light-guiding component comprises a portion of said frame.

The system of any of the Examples above, wherein the at least one diffusive optical element is configured to couple light from the at least one illumination source out of the light-guiding component toward said user's eye.

The system of any of the Examples above, wherein the at least one diffusive optical element is configured to couple light from the at least one illumination source out of the light-guiding component toward the environment forward the user to the user's eye.

The system of any of the Examples above, wherein the at least one mask blocks light guided within said light-guiding component from exiting said light-guiding component.

The system of any of the Examples above, wherein said at least one mask reflects light from said at least one illumination source back into said light-guiding components.

The system of any of the Examples above, wherein said at least one mask is dichroic reflecting certain wavelengths emitted by said at least one illumination source and transmitting other wavelengths not emitted by said at least one illumination source.

The system of any of the Examples above, wherein said at least one mask is dichroic reflecting certain infrared wavelengths emitted by said at least one illumination source and transmitting other visible wavelengths not emitted by said at least one illumination source.

The system of any of the Examples above, wherein said at least one mask is configured to absorb light emitted by said illumination source.

The system of any of the Examples above, wherein said at least one mask opening is about 10 μm in diameter.

The system of any of the Examples above, wherein the at least one diffusive optical element extends across an area that is less than 5% the area of the at least one light-guiding component.

The system of any of the Examples above, wherein the at least one mask opening extends across an area that is less than 5% the area of the at least one light-guiding component.

The system of any of the Examples above, further comprising a light redirecting element configured to direct light received from said at least one illumination in-coupling optical element to within said light-guiding component such that said light-guiding component redirects said light to said at least one diffusive optical element.

The system of any of the Examples above, further comprising a light redirecting element configured to direct light received from said at least one illumination in-coupling optical element to within said light-guiding component such that said light-guiding component redirects said light to said at least one mask opening.

The system of any of the Examples above, further comprising a light redirecting element configured to direct light received from said at least one illumination in-coupling optical element to within said light-guiding component such that said light-guiding component redirects said light to said at least one out-coupling element.

The system of any of the Examples above, wherein said light redirecting element comprises an orthogonal pupil expander.

The system of any of the Examples above, further comprising at least one camera configured to image the user's eye using light from said at least one illumination source that is reflected from said eye.

The system of any of the Examples above, wherein said at least one camera comprises an eye tracking camera that is configured to communicate with electronics configured to track movement of said eye based on images from said at least one camera.

The system of any of the Examples above, wherein said light-guiding component has a circular shape.

The system of any of the Examples above, wherein said light-guiding component comprises two light-guiding components disposed on opposite sides of said at least one diffusive optical element.

The system of any of the Examples above, wherein said at least one light-guiding component comprises first and second light-guiding components disposed on opposite sides of a diffusive film.

The system of any of the Examples above, wherein said at least one diffusive optical element comprises a pair of diffusive optical elements disposed on opposite sides of said light-guiding component.

The system of any of the Examples above, wherein said at least one diffusive optical element comprises first and second diffusive films disposed on opposite sides of said light-guiding component.

The system of any of the Examples above, wherein said at least one diffusive optical element comprises first and second diffusive optical elements configured to direct light into distributions oriented in different first and second directions.

The system of any of the Examples above, wherein said at least one diffusive optical element comprises first and second diffusive optical elements configured to selectively direct light having first and second wavelengths, respectively, into distributions oriented in different first and second directions, and said at least one illumination source comprising first and second light sources that selectively emits said first and second wavelengths respectively.

The system of any of the Examples above, wherein said at least one illumination source comprises a plurality of illuminations sources.

The system of any of the Examples above, wherein said at least one illumination source comprises a plurality of illuminations sources and said at least one diffusive optical element directs light from different illumination sources into respective distributions oriented in different directions.

The system of any of the Examples above, wherein said at least one illumination source comprises a plurality of illuminations sources and said at least one diffusive optical element directs light from different illumination sources as if originating from different respective locations forward said at least one light-guiding component.

The system of any of the Examples above, wherein said at least one illumination source comprises a laser, LED, or vertical cavity surface emitting laser (VCSEL).

The system of any of the Examples above, wherein said at least one illumination source further comprises at least one filter.

The system of any of the Examples above, wherein said at least one diffusive optical element is refractive, reflective, diffractive, or any combination thereof.

The system of any of the Examples above, wherein said at least one diffusive optical element comprises one or more diffuser sheets, one or more light shaping diffusers, one or more diffuser films, one or more etchings, one or more transmissive optical elements, one or more particles, one or more irregular surfaces, one or more surface relieve structures, PTFE, Teflon, ground glass, opal glass, greyed glass, one or more white surfaces, colored gel, one or more holograms or any combination thereof.

The system of any of the Examples above, wherein said at least one diffusive optical element is wavelength selective so as to substantially selectively diffuse one or more wavelengths of light emitted from the at least one illumination source and not others.

The system of any of the Examples above, wherein the system comprises a plurality of diffusive optical elements and at least one illumination source emits a plurality of wavelength bands of light, and wherein different of the diffusive optical elements selectively diffuse respective ones of the plurality of wavelength bands from the at least one illumination source.

The system of any of the Examples above, wherein said at least one diffusive optical element does not re-direct visible light from said environment.

The system of any of the Examples above, wherein said at least one diffusive optical element is configured to direct light from said illumination source toward said environment.

The system of any of the Examples above, wherein said at least one illumination source comprises an infrared source configured to output infrared light and said at least one diffusive optical element is configured to direct infrared light from said at least one illumination source toward said environment to provide depth sensing.

The system of any of the Examples above, wherein said at least one illumination source comprises a visible source configured to output visible light and said at least one diffusive optical element is configured to direct visible light from said at least one illumination source toward said environment to provide indicia to a non-user.

The system of any of the Examples above, wherein said at least one illumination source comprises a visible source configured to output visible light and said at least one diffusive optical element is configured to direct visible light from said at least one illumination source toward said eye to provide indicia to the user.

The system of any of the Examples above, wherein said at least one illumination source comprises a visible source configured to output visible light and said at least one diffusive optical element is configured to direct visible light from said at least one illumination source toward a periphery of an eye.

The system of any of the Examples above, wherein said at least one illumination source comprises a visible source, an infrared source, or both configured to output light and said at least one diffusive optical element is configured to direct the light from said at least one illumination source toward said environment to provide a signal or fiducial to an external sensor or external imaging sensor.

The system of any of the Examples above, wherein said at least one illumination source comprises a visible source, an infrared source or both configured to output light and said at least one diffusive optical element is configured to direct the light from said at least one illumination source toward said user to provide a signal or fiducial to an external sensor or external imaging sensor.

The system of any of the Examples above, wherein the at least one out-coupling optical element extends across an area that is less than 5% the area of the at least one light-guiding component.

The system of any of the Examples above, wherein said light-guiding component comprises two light-guiding components disposed on opposite sides of said at least one out-coupling optical element.

The system of any of the Examples above, wherein said at least one light-guiding component comprises first and second light-guiding components disposed on opposite sides of an out-coupling optical film.

The system of any of the Examples above, wherein said at least one out-coupling optical element comprises a pair of out-coupling optical element disposed on opposite sides of said light-guiding component.

The system of any of the Examples above, wherein said at least one out-coupling optical element comprises first and second out-coupling optical films disposed on opposite sides of said light-guiding component.

The system of any of the Examples above, wherein said at least one out-coupling optical element comprises first and second out-coupling optical elements configured to direct light into distributions oriented in different first and second directions.

The system of any of the Examples above, wherein said at least one out-coupling optical element comprises first and second out-coupling optical elements configured to selectively direct light having first and second wavelengths, respectively, into distributions oriented in different first and second directions, and said at least one illumination source comprising first and second light sources that selectively emits said first and second wavelengths respectively.

The system of any of the Examples above, wherein said at least one illumination source comprises a plurality of illuminations sources.

The system of any of the Examples above, wherein said at least one illumination source comprises a plurality of illuminations sources and said at least one out-coupling optical element directs light from different illumination sources into respective distributions oriented in different directions.

The system of any of the Examples above, wherein said at least one illumination source comprises a plurality of illuminations sources and said at least one out-coupling optical element directs light from different illumination sources as if originating from different respective locations forward said at least one light-guiding component.

The system of any of the Examples above, wherein said at least one illumination source comprises a laser, LED, or vertical cavity surface emitting laser (VCSEL).

The system of any of the Examples above, wherein said at least one illumination source further comprises at least one filter.

The system of any of the Examples above, wherein said at least one out-coupling optical element is refractive, reflective, diffractive, or any combination thereof.

The system of any of the Examples above, wherein said at least one out-coupling optical element comprises one or more diffuser sheets, one or more light shaping diffusers, one or more diffuser films, one or more etchings, one or more transmissive optical elements, one or more particles, one or more irregular surfaces, one or more surface relieve structures, PTFE, Teflon, ground glass, opal glass, greyed glass, one or more white surfaces, colored gel, one or more holograms or any combination thereof.

The system of any of the Examples above, wherein said at least one out-coupling optical element is wavelength selective so as to substantially only interact with a wavelength band of light emitted from the at least one illumination source.

The system of any of the Examples above, wherein the system comprises a plurality of out-coupling optical elements and at least one illumination source emits a plurality of wavelength bands of light, and wherein each out-coupling optical element is wavelength selective so as to substantially only interact with different wavelength bands of light emitted from the at least one illumination source.

The system of any of the Examples above, wherein said at least one out-coupling optical element does not re-direct visible light from said environment.

The system of any of the Examples above, wherein said at least one out-coupling optical element is configured to direct light from said illumination source toward said environment.

The system of any of the Examples above, wherein said at least one illumination source comprises an infrared source configured to output infrared light and said at least one out-coupling optical element is configured to direct infrared light from said at least one illumination source toward said environment to provide depth sensing.

The system of any of the Examples above, wherein said at least one illumination source comprises a visible source configured to output visible light and said at least one out-coupling optical element is configured to direct visible light from said at least one illumination source toward said environment to provide indicia to a non-user.

The system of any of the Examples above, wherein said at least one illumination source comprises a visible source configured to output visible light and said at least one out-coupling optical element is configured to direct visible light from said at least one illumination source toward said eye to provide indicia to the user.

The system of any of the Examples above, wherein said at least one illumination source comprises a visible source configured to output visible light and said at least one out-coupling optical element is configured to direct visible light from said at least one illumination source toward a periphery of an eye.

The system of any of the Examples above, wherein said at least one illumination source comprises a visible source, an infrared source, or both configured to output light and said at least one out-coupling optical element is configured to direct the light from said at least one illumination source toward said environment to provide a signal or a fiducial to an external sensor or external imaging sensor.

The system of any of the Examples above, wherein said at least one illumination source comprises a visible source, an infrared source, or both configured to output light and said at least one out-coupling optical element is configured to direct the light from said at least one illumination source toward said user to provide a signal or a fiducial to an sensor or external imaging sensor.

The system of any of the Claims above, wherein the image projector and the illumination source share the same in-coupling optical element and light-guiding component.

The system of any of the Examples above, wherein said at least one out-coupling optical element comprises at least one diffusive optical element or at least one diffusive film or any combination thereof.

The system of any of the Examples above, wherein said at least one out-coupling optical element comprises at least one diffractive optical element or at least one holographical optical element or any combination thereof.

BRIEF DESCRIPTION OF THE DRAWINGS

FIGS. 10A-10D illustrate perspective views of a light-guiding component configured to project light from an illumination source to a user's eye, such that the light appears to originate from virtual sources in front of the user's eye beyond the light-guiding component (e.g., in the far-field). In some designs, this light-guiding component comprises an eyepiece of a head-mounted display that is also configured to project images from a display into the user's eye.

FIGS. 11A-11B illustrate perspective views of a light-guiding component having a mask with a plurality of openings therein through which light can exit the light-guiding component thereby producing localized (e.g., point) sources of illumination.

FIGS. 13A-13B illustrate the light-guiding component comprising an outer cover of an eyepiece of a head-mounted display. In this example, the light-guiding component comprising the outer cover is curved. Additionally, one or more out-coupling optical elements comprising diffusive optical elements scatter light guided within the light-guiding component out of the light-guiding component.

FIGS. 15A-15B illustrate a light-guiding component integrated in a frame of the head-mounted display system. In this example, one or more out-coupling optical elements comprising, e.g., diffusive optical elements or holes, are positioned on the light-guiding portion of the frame to cause light guided therein to be ejected out.

FIG. 17A illustrates first and second light-guiding components stacked on top of each other. In this example, the first and second light-guiding components are separated by an out-coupling optical element comprising, e.g., a diffusive optical element or a diffractive optical element, that is configured to couple light guided within the first and second light-guiding components out of the light-guiding components. In some implementations, the out-coupling is bi-directional, with light being ejected forward and rearward of the pair of light guiding components.

FIG. 17B illustrates a light guiding component comprising first and second out-coupling optical elements disposed on either side of the light-guiding component to couple light guided within the light-guiding component out of the light-guiding component. In some examples, the first and second out-coupling optical elements may be configured to provide bidirectional out-coupling such that light is ejected forward and rearward of the light-guiding component and the pair of out-coupling optical elements.

The drawings are provided to illustrate example embodiments and are not intended to limit the scope of the disclosure. Like reference numerals refer to like parts throughout.

DETAILED DESCRIPTION

Figure 1:
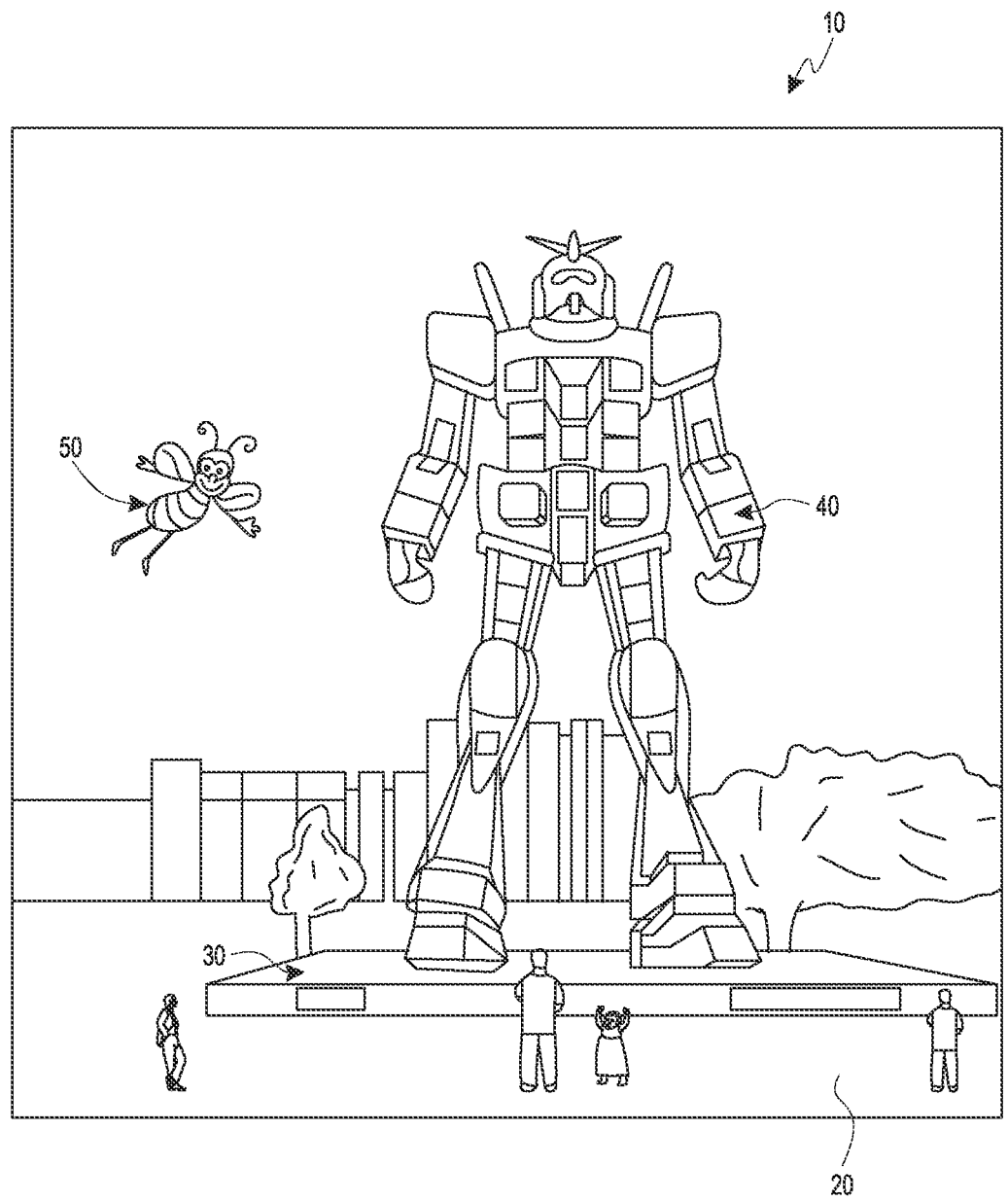
FIG. 1 illustrates a user's view of augmented reality (AR) through an AR device.

AR systems may display virtual content to a user, or viewer, while still allowing the user to see the world around them. Preferably, this content is displayed on a head-mounted display, e.g., as part of eyewear, that projects image information to the user's eyes. In addition, the display may also transmit light from the surrounding environment to the user's eyes, to allow a view of that surrounding environment. As used herein, it will be appreciated that a "head-mounted" or "head mountable" display is a display that may be mounted on the head of a viewer or user.

In some AR systems, a plurality of waveguides may be configured to form virtual images at a plurality of virtual depth planes (also referred to simply a "depth planes" herein). Different waveguides of the plurality of waveguides may have different optical powers and may be formed at different distances from the user's eye. The display systems may also include a plurality lenses that provide or additionally provide optical powers. The optical powers of the waveguides and/or the lenses may provide images at different virtual depth planes. Undesirably, each of the waveguides and lenses may increase the overall thickness, weight and cost of the display.

Advantageously, in various embodiments described herein, an adaptive lens assembly may be utilized to provide variable optical power to, e.g., modify the wavefront divergence of light propagating through the lens assembly to provide virtual depth planes at different perceived distances from a user. The adaptive lens assembly may include a pair of waveplate lenses having a switchable waveplate disposed between them. Each of the first and second waveplate lenses may be configured to alter a polarization state of the light passing therethrough, and the switchable waveplate may be switchable between a plurality of states, e.g., a first state that allows light to pass without changing a polarization of the light and a second state that alters the polarization of the light (e.g., by changing the handedness of the polarization). In some embodiments, one or both of the waveplate lenses may be switchable between these first and second states and the intervening switchable waveplate noted above may be omitted.

It will be appreciated that the adaptive lens assembly may comprise a stack of a plurality of waveplate lenses and a plurality of switchable waveplates. For example, the adaptive lens assembly may comprise multiple subassemblies comprising a pair of waveplate lenses with an intervening switchable waveplate. In some embodiments, the adaptive lens assembly may include alternating waveplate lenses and switchable waveplates. Advantageously, such alternating arrangement allows a reduction in thickness and weight by having neighboring switchable waveplates share a common waveplate lens. In some embodiments, by switching the states of the various combinations of the switchable plates in the stack, more than two discrete levels of optical power may be provided.

In some embodiments, the adaptive lens assembly forms a display device with a waveguide assembly to form images at different virtual depth planes. In various embodiments, the display device comprises a pair of adaptive lens assemblies interposed by a waveguide assembly. The waveguide assembly includes a waveguide configured to propagate light (e.g., visible light) therein (e.g., via total internal reflection) and to out-couple the light. For example, the light may be out-coupled along an optical axis direction normal to a major surface of the waveguide. One of the pair of adaptive lens assemblies may be formed on a first side of the waveguide assembly and may be configured to provide variable optical power to modify the wavefront of light passing through the adaptive lens assembly to form images at each of a plurality of virtual depth planes. For example, the adaptive lens assemblies may converge or diverge out-coupled light received from the waveguide assembly. To compensate for modifications of real world views due to the convergence or divergence of ambient light propagating through the adaptive lens assembly and/or the waveguide assembly, the other of the pair of adaptive lens assemblies is additionally provided on a second side of the waveguide assembly opposite the first side. When the switchable waveplates of each adaptive lens assembly assume a corresponding state, the adaptive lens assemblies may have optical powers with opposite signs, such that the other of the adaptive lens assemblies correct for distortions caused by the adaptive lens assembly on the first side of the waveguide assembly.

Advantageously, relative to a continuously variable adaptive lens having continuously variable optical elements, utilizing a switchable waveplate that is switchable between two states simplifies the driving of the adaptive lens assembly and reduces the computational power needed to determine how to appropriately activate the adaptive lens assembly for a desired optical power. In addition, by allowing the adaptive lens assembly to modify the wavefront divergence of light outputted by a waveguide, the number waveguides needed to provide a plurality of depth planes is reduced relative to an arrangement in which each waveguide provides a particular amount of wavefront divergence.

Reference will now be made to the drawings, in which like reference numerals refer to like parts throughout. Unless indicated otherwise, the drawings are schematic not necessarily drawn to scale.

Example Display Systems

Figure 2:
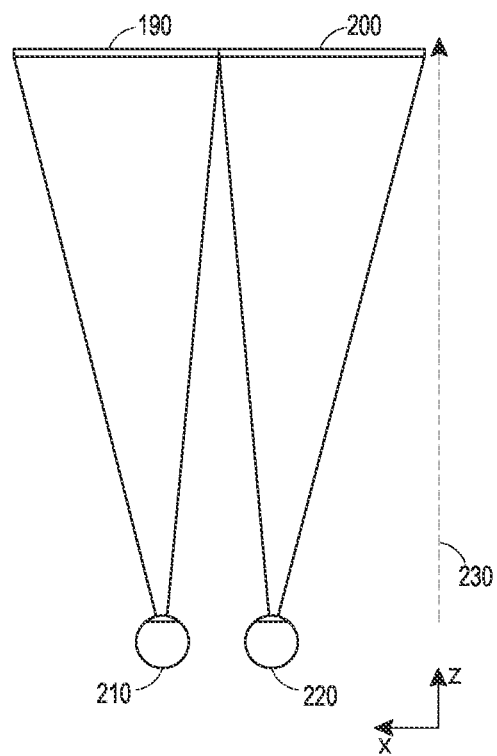
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
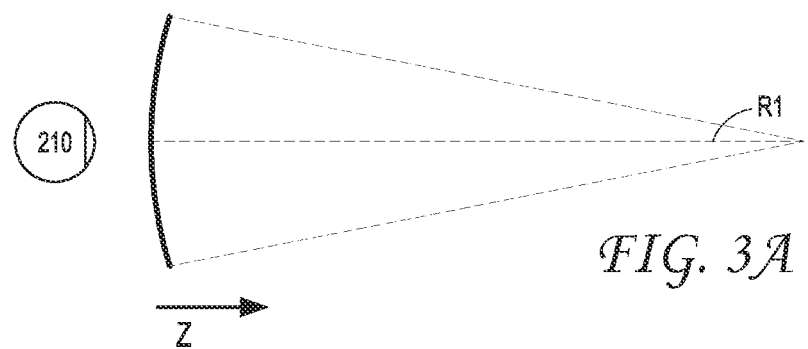
FIGS. 3A-3C illustrate relationships between radius of curvature and focal radius.
Figure 3B:
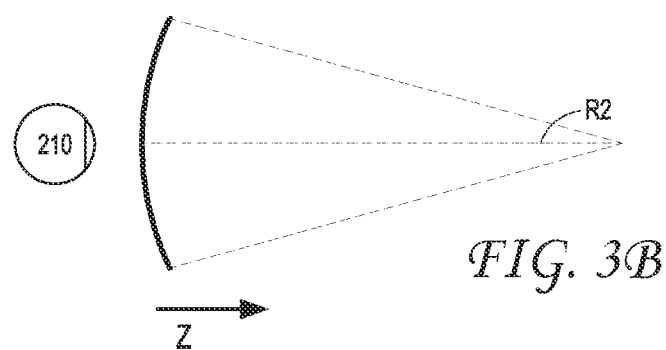
Figure 3C:
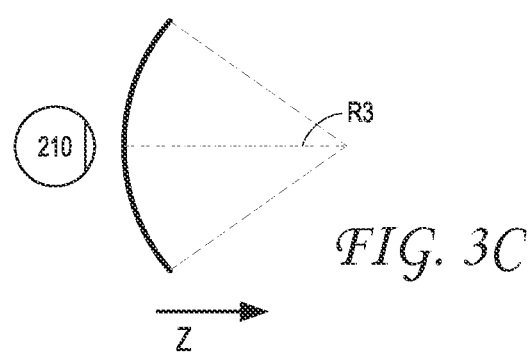

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
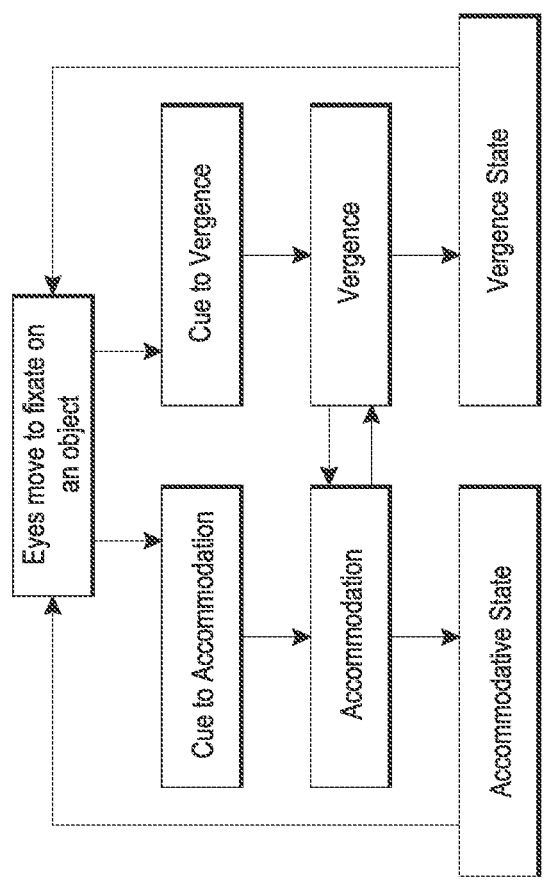
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
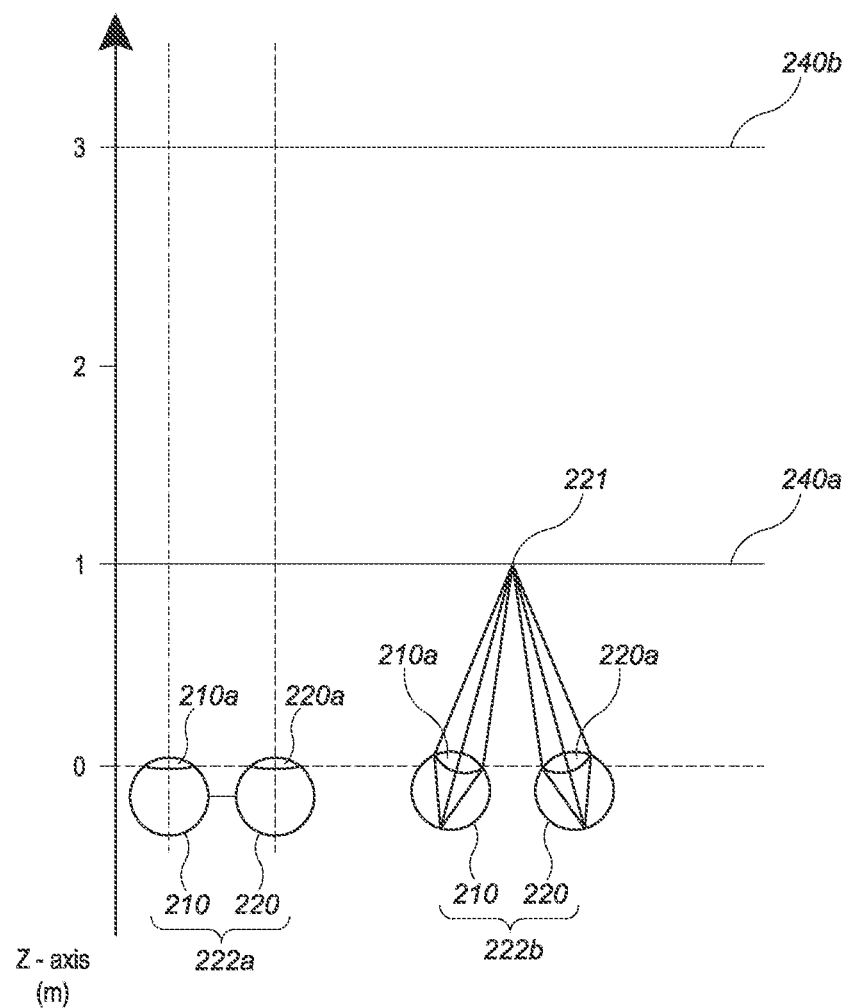
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
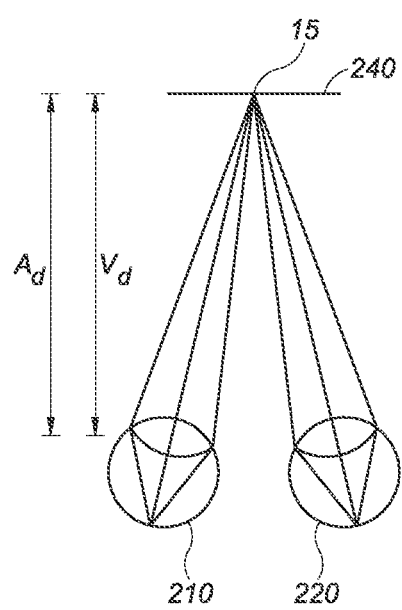
FIG. 4C illustrates an example of a representation of a top-down view of a user viewing content via a display system.
Figure 4D:
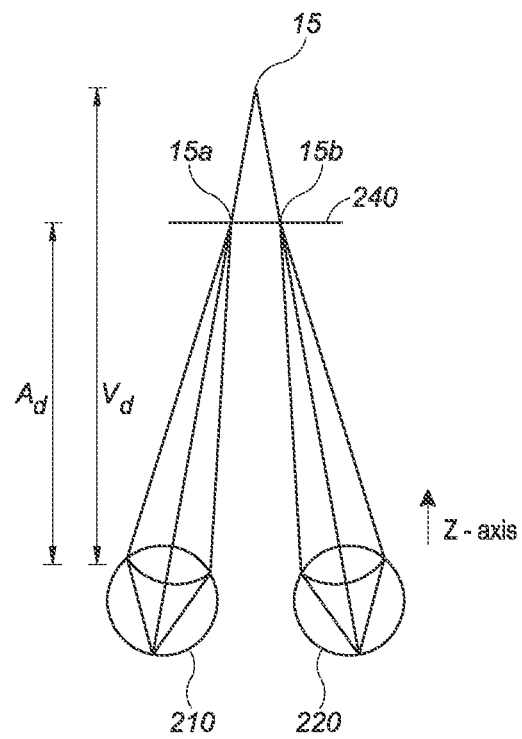
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$-$A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
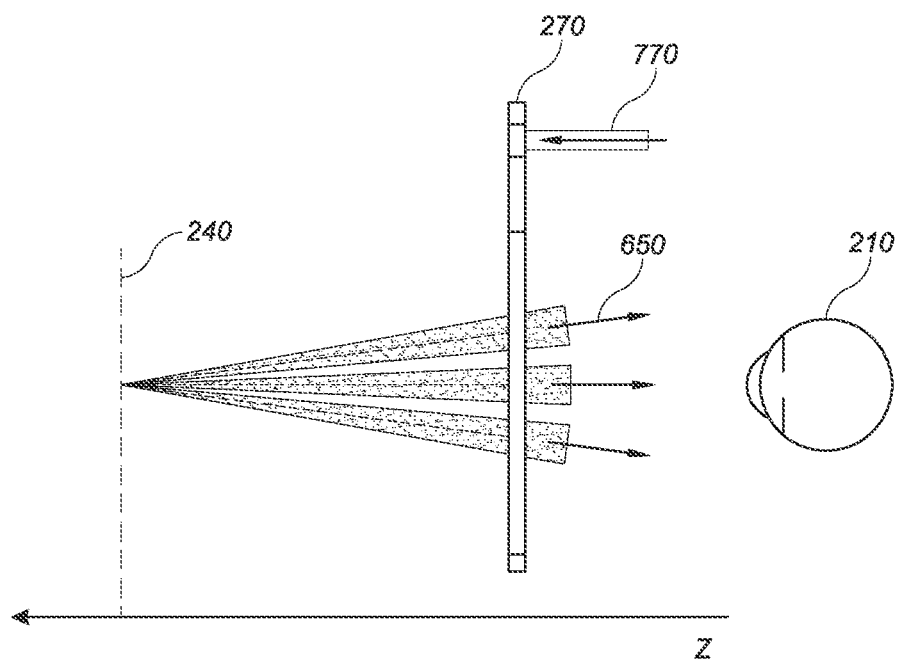
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
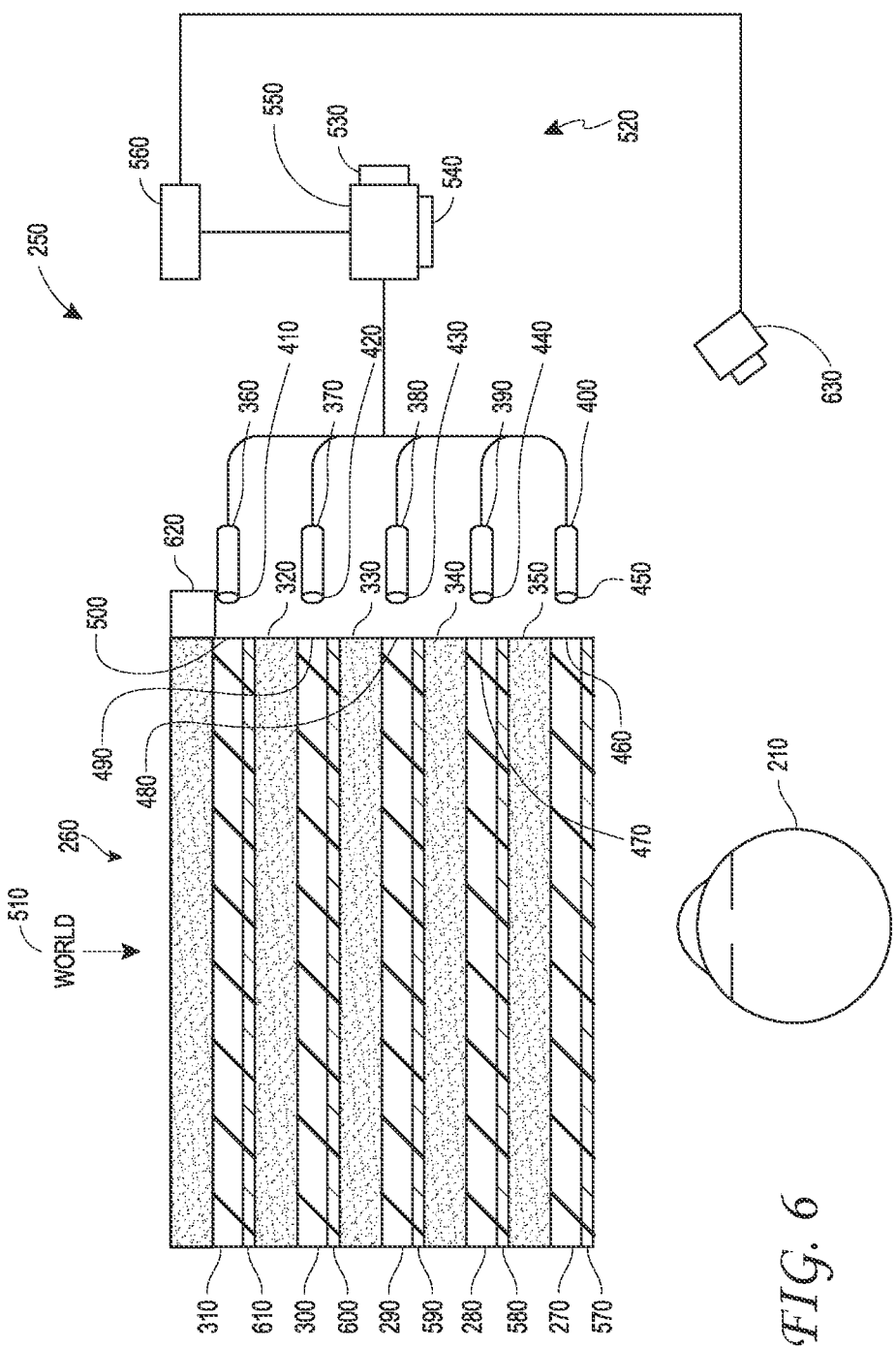
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
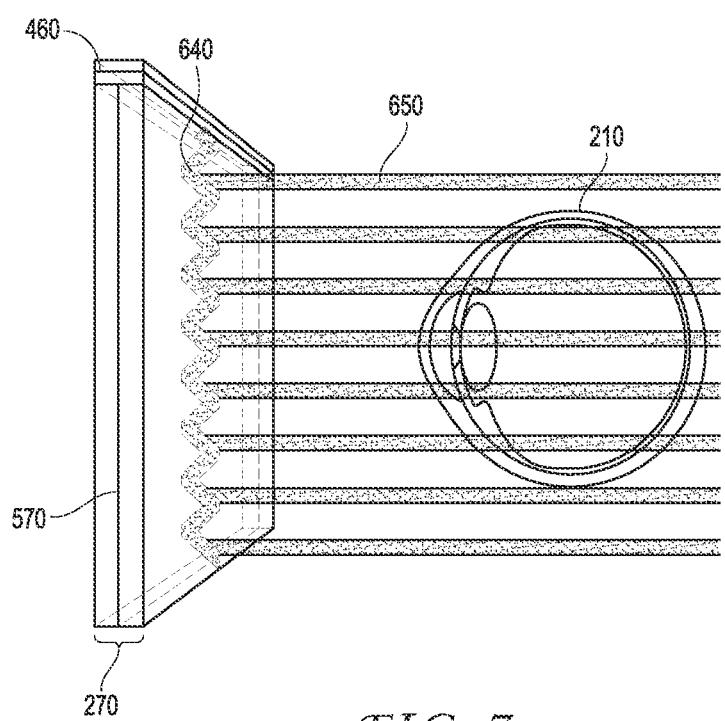
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
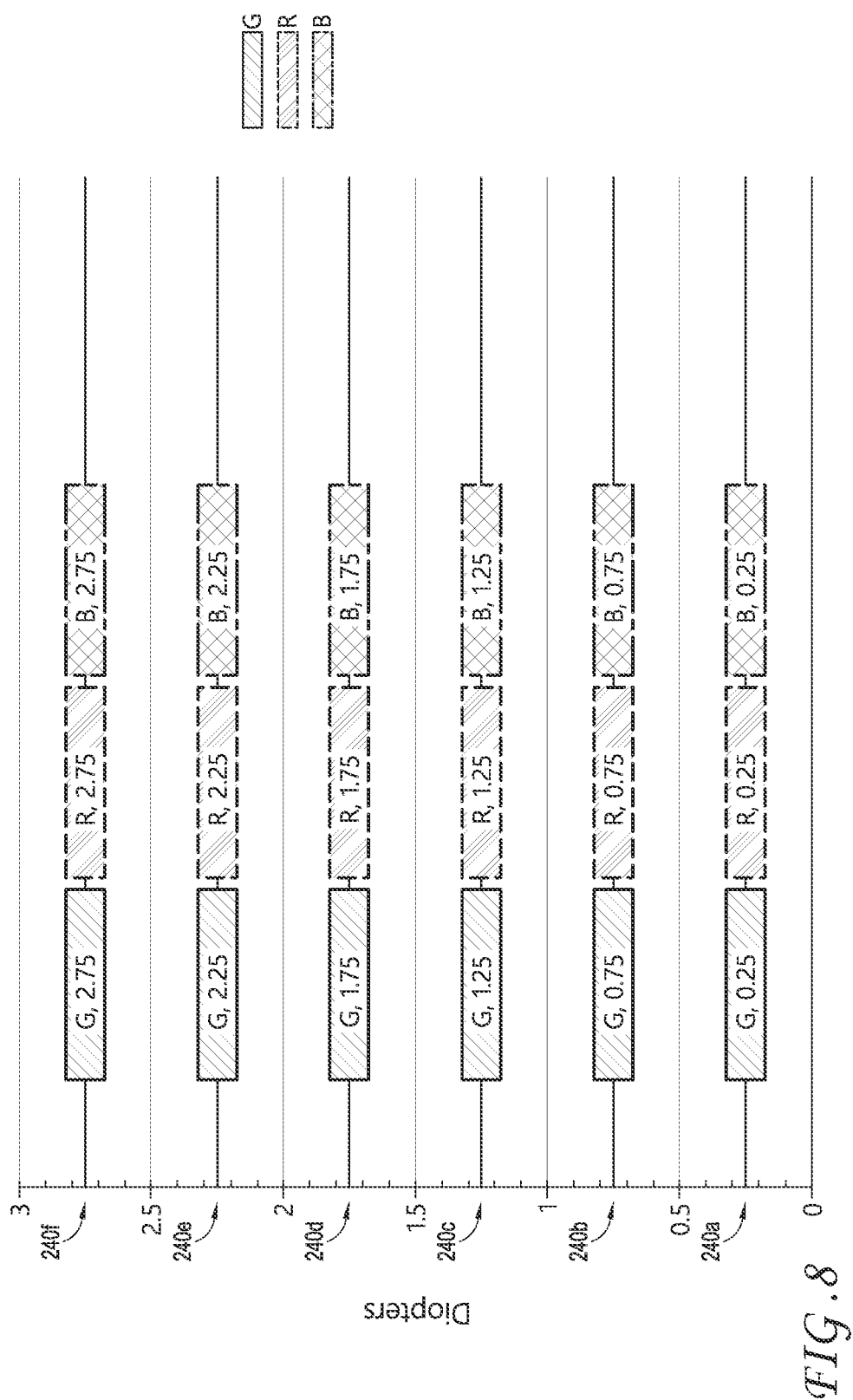
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240*a*-240*f*, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
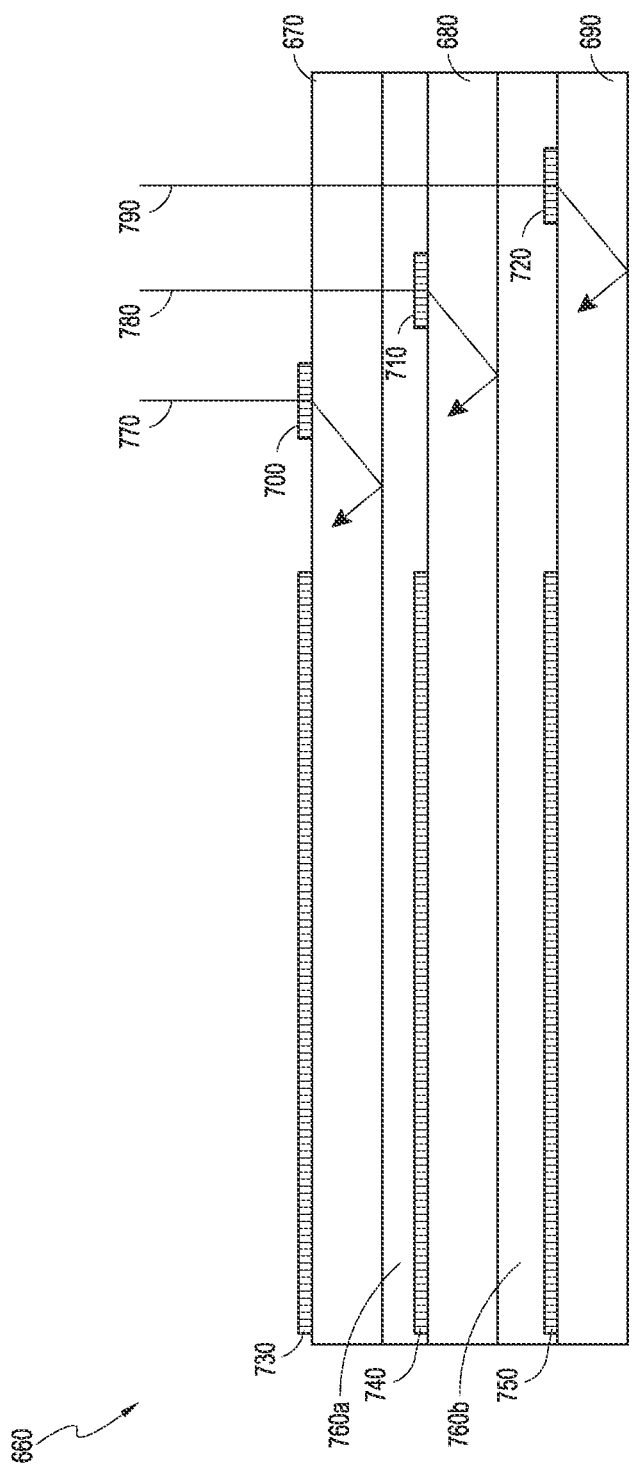
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
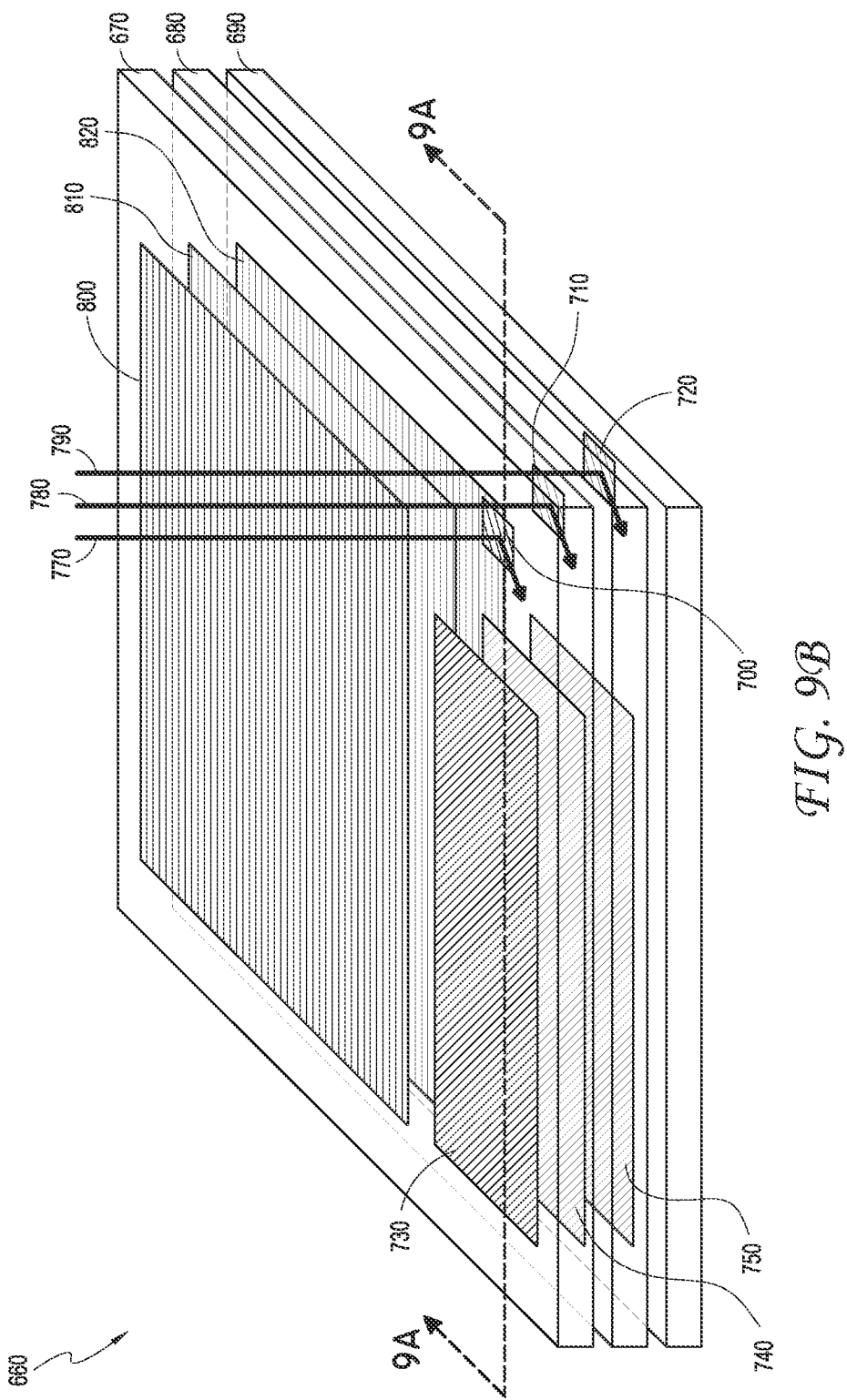
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
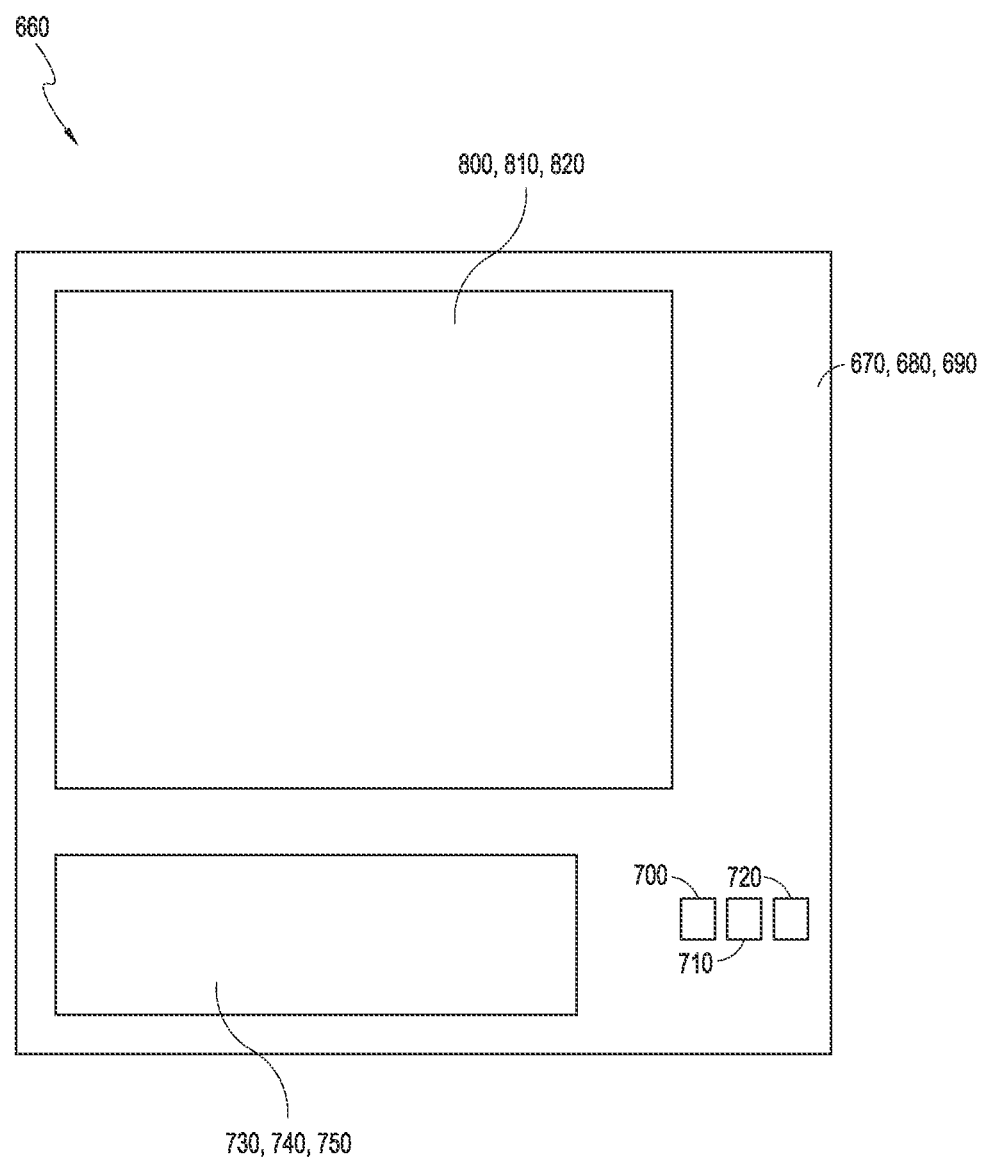
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
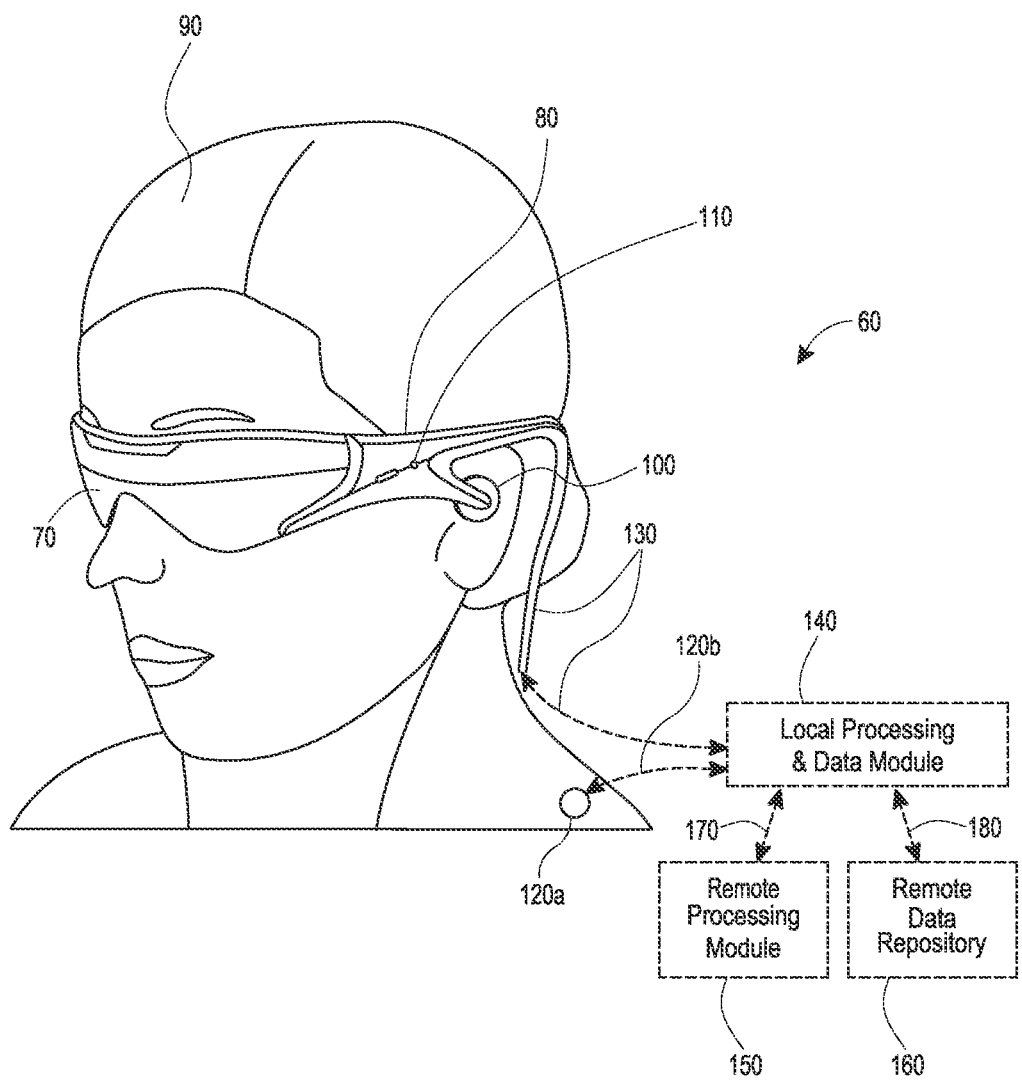
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Illumination

In some instances, providing illumination, for example, to the eye may be useful. For example, it may be beneficial to project light to a user's eye for eye tracking. Eye tracking may in some implementations be accomplished by imaging the user's eye with one or more cameras. Illumination of the eye may aid in such imaging and eye tracking. Having a localized light source, such as a point source and knowing the location of that light source may also assist in executing the eye tracking algorithm. The location of the origins of the illumination may be the actual light source location or the location of the virtual light source where illumination appears to be coming from. Knowledge of such locations can be considered in processing the eye tracking algorithm in some approaches. These illumination sources may, in some implementations, comprise localized light sources such as point sources. Using multiple illumination sources separated by a distance from each other and thus at different/distinct locations (and knowing these locations) may also assist in processing the eye tracking algorithm. Accordingly, in some designs, a first illumination source directs light to the user's eye at a first time while a first image is obtained from an eye tracking camera, and a second illumination source directs light to the user's eye at a second time while a second image is obtained from the eye tracking camera. In some implementations, the second light illumination may not illuminate the eye when the first image is obtained, while the first light illumination may not illuminate the eye when the second image is obtained. This process may be referred to herein as multiplexing and may be beneficial in performing the eye tracking algorithm.

Furthermore, the ability to project light to a user's eye from one or more locations in front of the eye that are more central (as opposed to from locations at the periphery) may also be helpful in some cases. In various examples, disclosed herein (e.g., FIGS. 10A-10D), multiple light beams are projected from generally in front of the user's eye (e.g., from a location more central and less peripheral) using light-guiding components disposed directly in front of the user's eyes. The light-guiding components may be optically transparent to visible light such that the user can see through the light-guiding component disposed directly in front of his or her eye to view the environment and objects therein in front of the user. As discussed herein, the light guiding optical component may be configured to eject light guided therein out of the light guiding optical component to provide illumination, for example, to direct light to the user's eye to assist in eye tracking.

In various situations, the light-guiding optical component is forward the eye and the environment with objects therein is forward the light-guiding optical component. Consequently, the terms "forward" and "in front of" may be used herein to describe locations more distal to the eye. Conversely, "rearward" and "in back of" may be used herein to describe locations more proximal to the eye.

Figure 10B:
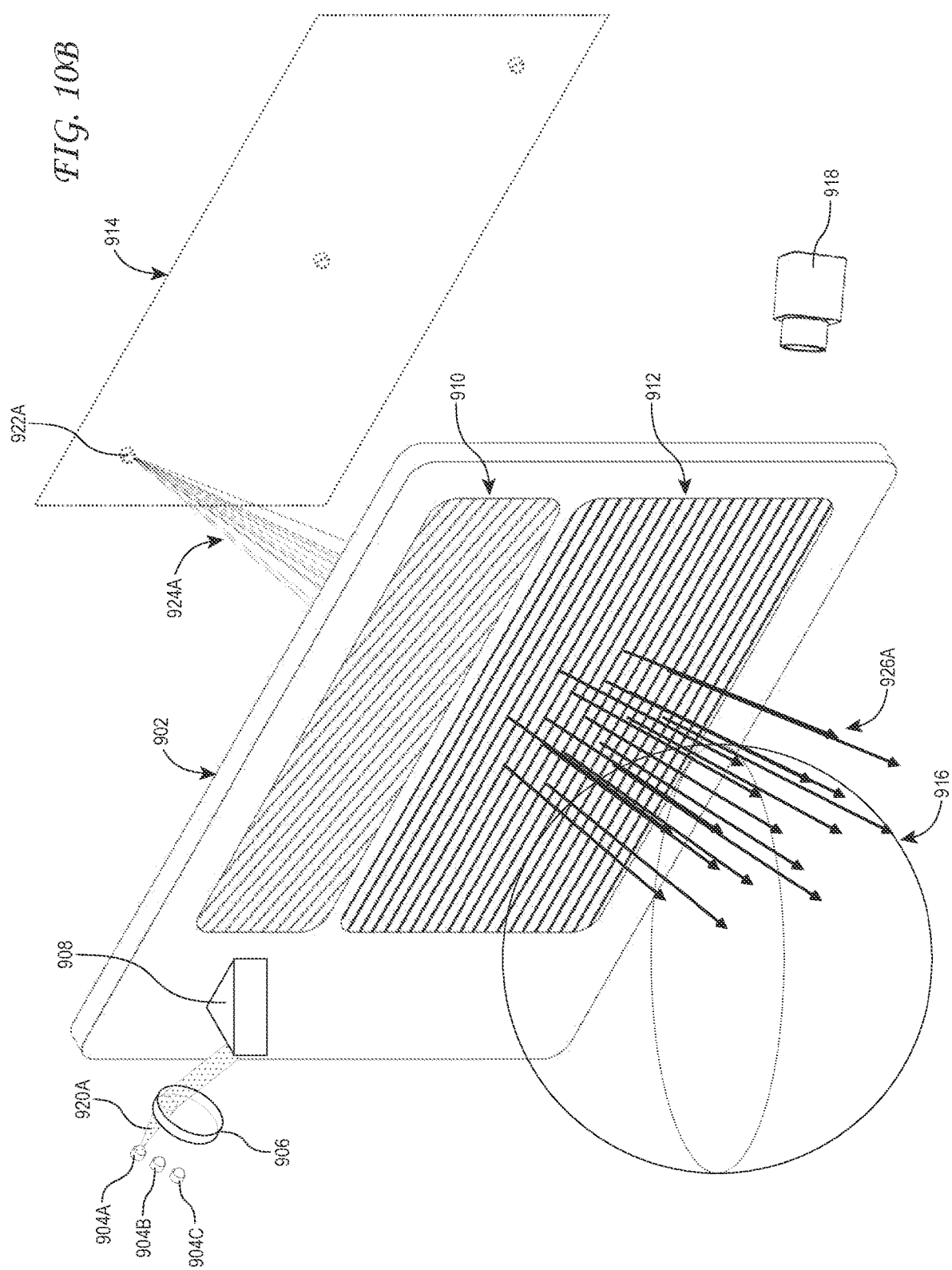

FIGS. 10A-10D illustrate perspective views of a head-mounted display system configured to project light from an illumination source to a user's eye. FIG. 10A illustrates a light guiding component 902 for guiding light therein to provide illumination, for example, to the eye (e.g., for eye tracking). An in-coupling element 908 is positioned to couple light from an illumination source to the light-guiding component. The light guiding component 902 is shown disposed in front of the eye 916. In various implementations, the light guiding component is optically transparent to visible light such that the user can see through the light-guiding component disposed in front of the user's eye. The light guiding component may also comprise material having an index of refraction such that light from the illumination source can be guided therein.

In some designs, the light-guiding component may comprise an eyepiece for presenting images from a display to a user's eye as discussed above. The eyepiece may comprise, for example, a waveguide to guide light from the display in the waveguide by total internal reflection. Likewise, this eyepiece for conveying an image from a display to the user's eye may be used as a conduit for providing light from the illumination source to, for example, the eye for illumination thereof (e.g., for eye tracking).

The light-guiding component includes an out-coupling optical element 912 configured to eject light guided within the light-guiding component out of the light-guiding component. In some design, the light-guiding component and the out-coupling optical element are disposed with respect to the user's eye to direct light from the illumination source onto the user's eye. In the case where the light-coupling optical component comprises the eyepiece for also presenting image content to the user's eye, the out-coupling optical element may comprise, for example, an exit pupil expander 912 such as described above. A light distribution optical element 910 may be used to redirect light guided within the light guiding component 902 such that light is ejected from a particular location on the light-coupling optical element. In the case where the light-coupling optical component comprises the eyepiece for also presenting image content to the user's eye, the light distribution optical element may comprise, for example, an orthogonal pupil expander 910 such as described above. The light guiding component 902, light distribution element (OPE) 910 and out-coupling optical element (OPE) 912 may be configured to operate in a similar manner to waveguides 670, 680, 690 shown in FIGS. 9A-9C. Likewise, in various implementations, the light distribution element and the out-coupling optical element may comprise diffractive optical elements such as diffractive gratings or holograms or both or other diffractive optical elements.

Similarly, the light-guiding component may comprise, for example, one or more of the waveguides 670, 680, 690 shown in FIGS. 9A-9C, or otherwise the eyepiece may be used as the light-guiding component to provide illumination to the eye in addition to providing display content. In some other implementations, however, the light-guiding component comprises an additional light-guiding component to any waveguide or waveguide used to convey image content to the user's eye such the waveguides 670, 680, 690 shown in FIGS. 9A-9C.

As shown in FIGS. 10A-10D, the one or more illumination source provides light that is coupled into the light-guiding component 902 and ejected therefrom providing illumination, for example, to illuminate the user's eye. In some designs, the illumination source may comprises an invisible or visible light source such as an infrared or visible light source configured to selectively emit IR or visible wavelength light, respectively. The illumination source may comprise, for example, an LED or a laser or other type of emitter or light source. In some designs, the illumination source comprises a vertical-cavity surface-emitting laser (VCSEL). In some implementations, a filter may be included to provide for spectral narrowing. The filter may comprise, for example, a narrow band pass filter in some cases.

In some implementations, the illumination source may comprise an emitter that outputs a divergent beam. In some such cases, additional collimating optics may increase the collimation of the light from the illumination source.

In some designs, such as shown in FIG. 10A-10D, the in-coupling element 908 comprises an in-coupling prism or other reflective coupling element. In some implementations, the in-coupling element is configured to in-couple light from at least one illumination source into the light guiding component at angle larger than the critical angle of the light guiding component. In some embodiments, the in-coupling element is configured to in-couple light from at least one illumination source into the light-guiding component at an angle of about 45°. A prism having an inclined reflective surface (e.g., providing reflection via total internal reflection) may be suitable to turn light from the illumination source into the light guiding component at 45° with respect to the light-guiding component (e.g., with respect to the major, top and bottom or front and rear, reflecting surfaces of the light guiding component that guide the light within the light-guiding component via total internal reflection). If the light propagates within the light-guiding component (such as a planar light guide plate, sheet, or film) at an angle of 45° with respect to the light-guiding component (e.g., with respect to major, top and bottom or front and rear, reflecting surfaces of the light-guiding components, and is not turned out of the light-guiding component) the light may reflect from the end of the light-coupling component and continue to be guided therein in the opposite direction via total internal reflection. In some implementations, the in-coupling optical element may comprise an in-coupling grating (ICG) or other diffractive optical element. In some designs, more than one in-coupling element may be employed.

In some designs, the one or more illumination source comprises a plurality of illumination sources that produce a plurality of beams of light. In some implementations, illumination sources radiate light of different color than others of the illumination sources and the illumination sources may include multiple filters, wherein different filters produces a light beams of different wavelengths, respectively. Any number of illumination sources may be utilized such as, for example, 1, 2, 3, 4, 5, 10 or 20 illumination sources, or any range between any of these values. In some implementations, the plurality of light beams have respective spectral compositions or colors or wavelength bands.

FIGS. 10A-10D show three illumination sources 904A, 904B and 904C, and a single collimating lens 906 configured to couple light into in-coupling optical element 908 (e.g., prism), and an out-coupling optical element configured to out-coupling light from the light-guiding component 902 to a user's eye 916. In various implementations (see, e.g., FIG. 10B), the light can be out-coupled from the out-coupling optical element 912 in a manner such that out-coupled light appears to originate from one or more virtual sources 992A such as point sources. The light may, for example, diverge upon exiting the light-guiding component in a manner such that the light appears to emanate from a virtual source such as a localized source (e.g. point source) located a distance away from (e.g., forward) the light-guiding optical element.

FIG. 10B-10D each illustrate such a system in operation displaying light 926A, 926B and 926C from light sources 904A, 904B, 904C coupled into the light-guiding component 902 and out-coupled to an eye 916 in different directions as if emanating from differently spatially located localized virtual sources 922A, 922B and 922C at a particular depth (e.g. a depth plane 914). FIG. 10B, for example, illustrates the first illumination source 904A emitting a divergent beam of light 920A that is coupled into the light-guiding component 902 via the prism 908. The collimating lens 906 in the optical path between the illumination source 904A and in-coupling element 908 collimates the light such that the light is substantially propagating along a common direction. Light from the first illumination source 920A propagates within the light-guiding component 902 and is redirected by the light distribution element (e.g. OPE) 910 toward the out-coupling optical element 912 (e.g., EPE). The out-coupling optical element ejects light guided within the light-guiding component 902 toward the user's eye 916. The light exiting the light-guiding component 902 comprises a diverging beam that appears to emanate from a first virtual light source 922A at a depth plane 914. The direction that the divergent beam is directed causes the first virtual light source 922A to appear to be located at a particular location, for example, on the depth plane 914. Accordingly, the out-coupled light 926A is directed to the user's eye 916 as if the out-coupled light 926A is emitted from the first virtual source 922A originating from the depth plane 914, wherein the virtual light 924A is the virtual projection of out-coupled light 926A between light-guiding component 902 and depth plane 914.

FIG. 10C illustrates the second illumination source 904B emitting a divergent beam of light 920B that is coupled into the light-guiding component 902 via the prism 908. The collimating lens 906 in the optical path between the second illumination source 904B and in-coupling element 908 collimates the light such that the light is substantially propagating along a common direction. Light from the second light source 920B propagates within the light-guiding component 902 and is redirected by the light distribution element (e.g. OPE) 910 toward the out-coupling optical element 912 (e.g., EPE). The out-coupling optical element ejects light guided within the light-guiding component 902 toward the user's eye 916. The light exiting the light-guiding component 902 comprises a diverging beam that appears to emanate from a second virtual light source 922B at a depth plane 914. The direction that the divergent beam is directed causes the second virtual light source 922B to appear to be located at a particular location, for example, on the depth plane 914. Accordingly, the out-coupled light 926B is directed to an eye 916 as if the out-coupled light 926B is emitted from the second virtual source 922B originating from the depth plane 914, wherein the virtual light 924B is the virtual projection of out-coupled light 926B between light coupling component 902 and depth plane 914.

FIG. 10D illustrates the third illumination source 904C emitting a divergent beam of light 920C that is coupled into the light-guiding component 902 via the prism 908. The collimating lens 906 in the optical path between the third illumination source 904C and in-coupling element 908 collimated the light such that the light is substantially propagating along a common direction. Light from the third illumination source 920C propagated within the light-guiding component 902 and is redirected by the light distribution element (e.g. OPE) 910 toward the out-coupling optical element 912 (e.g., EPE). The out-coupling optical element ejects light guided within the light-guiding component 902 toward the user's eye 916. The light exiting the light-guiding component 902 comprises a diverging beam that appears to emanate from a third virtual light source 922C at a depth plane 914. The direction that the divergent beam is directed causes the third virtual light source 922C to appear to be located at a particular location, for example, on the depth plane 914. Accordingly, the out-coupled light 926C is directed to an eye 916 as if the out-coupled light 926C is emitted from the third virtual source 922C originating from the depth plane 914, wherein the virtual light 924C is the virtual projection of out-coupled light 926C between light coupling component 902 and depth plane 914.

In various implementations, the out-coupling optical element comprises a diffractive optical element such as a grating structure or hologram or other diffractive optical element configured to turn light guided within the light-guiding component out of the light guiding component such that the light is not guided within the light-guiding optical component. In various implementations, the out-coupling optical element may be formed on either side of the light-guiding components and/or in the light guiding component. The out-coupling optical element may comprise, for example, one or more volume holograms, surface holograms, volume or surface diffractive optical elements and/or diffraction gratings. The diffractive optical element (e.g. grating or hologram), can be configured to cause the light exiting the light-guiding component to diverge and may be configured to cause the light to appear as if the light originated from a different location, for example, forward the light-guiding component. Accordingly, the out-coupling optical element can be considered to have optical power, such as negative optical power, to cause the light incident thereon to diverge as if originating from a different location or depth. Accordingly, in some cases, the out-coupling optical element may comprise a diffraction grating or diffractive optical element (e.g., hologram) with optical power, for example, negative optical power. Other types of out-coupling optical elements or the addition of additional optical elements such as a lens or lens arrays may be used to impart optical power, for example, to cause the light to diverge as if emanating from a virtual light source located in front (or rearward) of the light-guiding component.

As discussed above, head-mounted display systems may include waveguides configured to receive light from one or more displays and direct the light to a user's eye so as to provide image content to the user. Optical power may be provided to optical elements (e.g. out-coupling optical elements or EPEs) to cause light ejected from the waveguides to diverge as if originating from different depth planes. Such system (e.g., waveguides) used to direct light from display into the eyes of user's and provide image content to the user may also be used to direct illumination from an illumination source (e.g., to the eye of the user). Similar structures (e.g., out-coupling optical element or EPEs) configured to cause the light from the display to diverge may be used to cause the light from the illumination source to be divergent as if originating from a localized virtual light source (e.g., point source) a distance away from the light-coupling component. In such configurations, the light guiding optical element may receive light from both one or more displays and one or more illumination sources via one or more in-coupling optical elements. In some implementations, the same out-coupling optical element (e.g., EPE) is used to out-couple light from the light-guiding component(s) or waveguides(s). This out-coupling optical element may comprise a diffractive optical element such as a hologram, etc. in some implementations and/or may further be integrated with one or more lens to provide negative (or positive) optical power. In other implementations, the light-guiding component may be provided in addition to an eyepiece or other waveguide for conveying light from one or more displays to the user's eye. In some implementations, the out-coupling optical element may be diffusive. The out-coupling optical element may comprise, for example, a holographic diffuser.

As illustrated in FIGS. 10B-10D, the virtual sources from which light appears to be emanating may be located at different positions along a single virtual depth plane. Accordingly, a plurality of virtual sources may originate from a single virtual depth plane. Conversely, a plurality of virtual sources may originate from a plurality of virtual depth planes. In some designs, the virtual source may be a localized source of emission such as a virtual point source. In some implementations, the virtual source may have a maximum lateral extent of about 100 nm, 250 nm, 500 nm, about 1 μm, about 2 μm, about 3 μm, about 5 μm, about 10 μm or about 50 μm, or any range between any of these values. In some configurations, the virtual depth plane where the virtual source is located may be at about 5 mm, about 10 mm, about 15 mm, about 20 mm, about 30 mm, about 50 mm, about 100 mm or about 200 mm in front (or rearward) of the light coupling component or the user's eye, or any range between any of these values.

In various implementations, the out-coupling optical element may produce a plurality of virtual sources such as, for example, 2, 3, 4, 5, 6, 10 or 20 virtual sources, or any range between any of these values. These virtual sources may be at different locations on a same depth plane, at different depth planes or a combination of both.

Accordingly, the out-coupling optical element may produce out-coupled light in a plurality of directions. This may depend, for example, on which light source is outputting light. The different light sources having different positions with respect to the in-coupling optical element may provide different beams that are possibly collimated and directed in different directions within the light-guiding component and therefore are incident on the out-coupling optical element from different directions and possibly at different locations. The result is that the out-coupled beam has different direction. This may cause the virtual source from which the light appears to originate to be different (e.g., have a different location) for different illumination sources.

As discussed above, having a plurality of light sources situated at different known locations can be used for eye tracking, knowledge of the location of the light sources, assisting in executing the eye tracking algorithm. Accordingly, different illuminations sources (and consequently different corresponding virtual sources) may be activated when a camera or sensor (e.g., eye tracking camera) captures an image. Light may be projected into the eye from different virtual sources at specific lateral positions and/or depths in front of the user's eye at different times when different images of the eye are captured by the camera. As more light beams with their different known virtual source positions and depths are utilized, the light beams may be multiplexed and eye tracking may be improved. Such a time-multiplexing approach may be used with the eye tracking camera to increase eye tracking robustness. In some cases, wavelength multiplexing may be used. For example, different illumination sources having different spectral output (or sent through wavelength filters) to provide different spectral distributions can be used to couple into different out-coupling optical elements designed to selectively operate on different wavelengths. Accordingly, as illustrated, the system may additionally comprise an eye tracking camera 918 to obtain images of the eye to track the user's eye 916.

In some configurations such as discussed above, the out-coupling optical element may be configured to direct out-coupled light to the user's eye. Such illumination may be provided to the eye, for example, to perform eye tracking. In other configurations, however, the out-coupling optical element may be configured to direct out-coupled light to the environment in front of the user's eye. Such illumination may be used, for example, for sensing the depth of objects in the environment in front of the user. Alternatively, such illumination may be used to provide others with notification of the state of the eyewear (e.g., taking video) or for aesthetic effects. Other uses may be possible.

A wide range of variations are possible. For example, in some implementations a light distribution optical element (or OPE) may be used while in other implementations, the OPE may be absent. Similarly, the light distribution optical element (or OPE) may be formed on or in the light guiding component and may comprise a diffractive optical element or other optical structure.

In some embodiments, the image projector of the head mounted display and the illumination source share the same in-coupling optical element and light-guiding component.

Masks

As discussed above, in some instances such as for eye tracking, projecting light onto the user's eye as if the light originated from multiple light sources may be beneficial. Furthermore, in some instances, projecting light from one or more light sources into the environment in front of the user's eye, for example, for depth sensing, may be useful. One or more illumination sources and a light guiding component may be employed to provide such illumination.

Figure 11B:
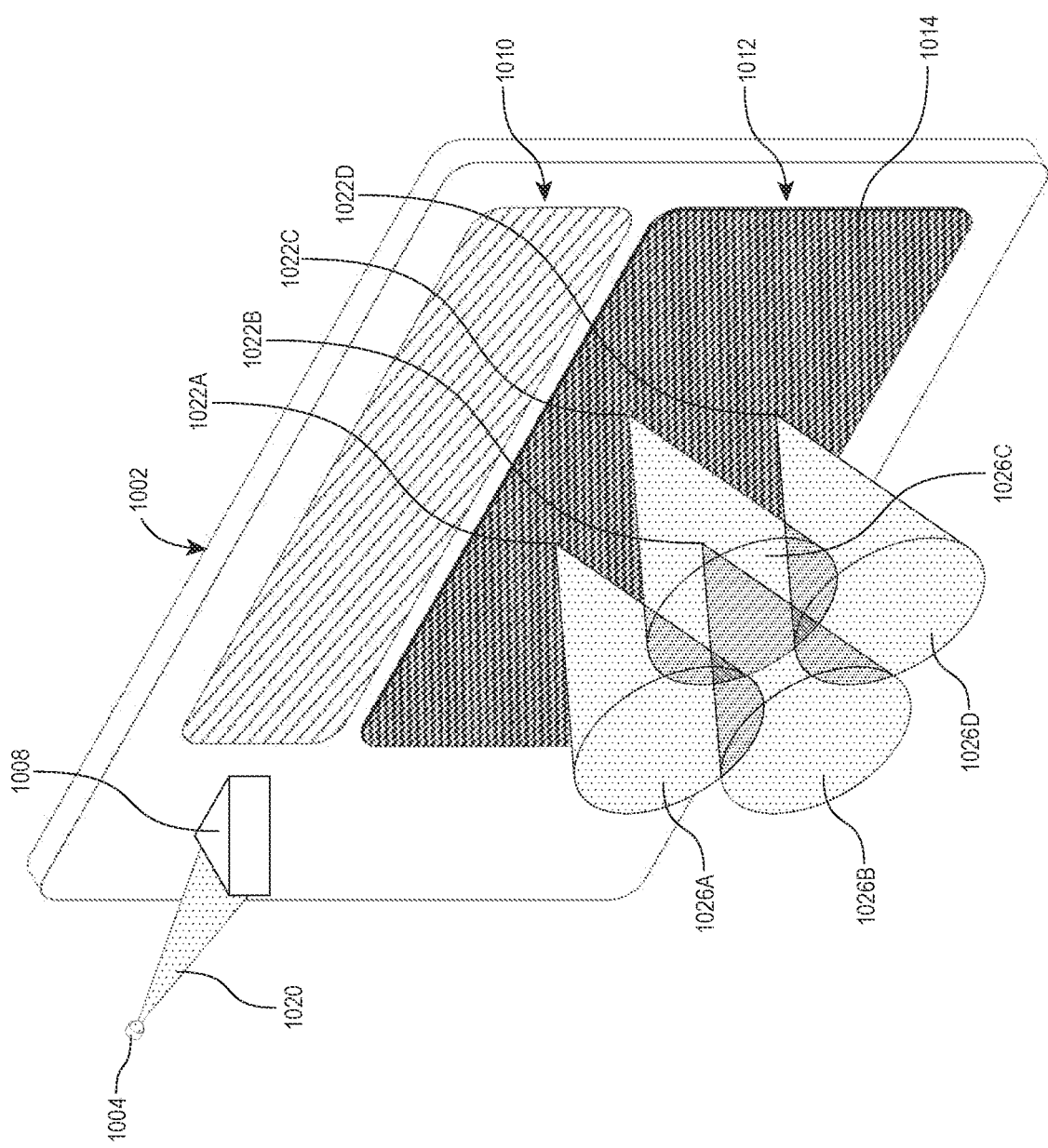

FIGS. 11A-11B illustrates a perspective view of a light-guiding component 1002 having a mask with openings configured to produce localized regions where light emanates. Specifically, FIG. 11A shows a light-guiding component 1002 having an in-coupling element 1008 positioned to couple light therein. A light distribution element (e.g., OPE) 1010 and an out-coupling optical element 1012 (e.g., EPE) are disposed on or in the light-guiding component 1002. Disposed with respect to (e.g., over or under) the out-coupling element 1012 is a mask 1014 comprising four mask holes or mask openings 1022A, 1022B, 1022C, 1022D. The light guiding component 1002, light distribution element (OPE) 1010 and out-coupling optical element (EPE) 1012 may be configured to operate in a similar manner to waveguides 670, 680, 690 shown in FIGS. 9A-9C and as discussed above with regard to FIGS. 10A-10D. For example, in some implementations, one or both of the light distribution element (OPE) 1010 and out-coupling optical element (EPE) 1012 comprises diffractive optical elements, although the structure of these elements should not be so limited. Moreover, the out-coupling optical element need not be provided with optical power or otherwise configured to cause the light ejected from the light-guiding component 1002 by the out-coupling optical element to diverge. As will be discussed below, the openings in the mask may provide for such divergence in some implementations. Also as discussed above, the light-guiding component 1002 may comprise an eyepiece comprising one or more waveguides (such as the waveguides 670, 680, 690 shown in FIGS. 9A-9C) that are configured to receive light from a display and to deliver image content to a user's eye or alternatively the light guiding component 1002 may supplement such an eyepiece configured to deliver image content to a user.

FIG. 11B shows an illumination source 1004 disposed with respect to the in-coupling optical element 1008 to couple light into the light guiding component 1002 such that the light is guided therein by total internal reflection. A light distribution element 1010 is disposed to receive light coupled into the light-guiding component 1002 by the in-coupling optical element and redirect the light toward the out-coupling optical element. The out-coupling optical element causes the light to be ejected from the light guiding component. As discussed above, the out-coupling optical element may comprise a diffractive optical element, diffractive features, scatter features or otherwise is configured to turn the light guided within the light-guiding component such that the light is not guided therein. For example, the light may be directed toward the user's eye at an angle such that the light will not be guided within the light-guiding component by total internal reflection. The mask may comprise material that is opaque (e.g., absorbing, reflective) to light emitted by the illumination source such that this light does not exit the light-guide, for example, toward the eyes unless the light passes through the one or more openings 1022A, 1022B, 1022C, 1022D in the mask. In some implementations, the mays comprises a dielectric such as a dielectric coating and may be reflective at a specific wavelength or wavelengths. In some designs, by being more reflective and less absorptive, the mask may be more efficient.

In some configurations, the openings in the mask are small compared to the mask. The reduced size may in some instances cause divergence of the beam exiting through the opening by diffraction. The openings may, for example, have lateral extent, e.g., widths or diameters of about 1 µm, about 5 µm, about 10 µm, about 20 µm, about 50 µm, about 100 µm, about 500 µm, about 1 mm or about 5 mm, or any range between any of these values. In some cases, the small opening can be considered to create point sources of light. Several such localized light sources spaced apart from each other may be created by the openings in the mask.

FIG. 11B illustrates out-coupled light 1026A, 1026B, 1026C, 1026D, propagated through the openings 1022A, 1022B, 1022C, 1022D, which may be point sources, as shown. FIG. 11B specially depicts the illumination source 1004 emitting a divergent light beam 1020 to the in-coupling optical element 1008. In-coupling element 1008 couples light into the light-guiding component 1002 such that the light is guided therein by total internal reflection. The light beam, however, may continue to diverge within the light-guiding optical element. The light in-coupled into the light-guiding component 1002 may propagate to the light distribution element or OPE 1010. The light distribution element or OPE 1010 may redirect at least a portion of this light to the out-coupling optical element 1012. As discussed above, the out-coupling optical element 1012 is configured to eject light from the light-guiding component 1002. However, where the mask 1014 covers the out-coupling optical element 1012 or portions of the light-guiding component 1002 where light would be ejected by the out-coupling optical element, light may be blocked such that less light escapes through the mask. The openings 1022A, 1022B, 1022C, 1022D in the mask, however, allow light to pass therethrough. Light 1026A, 1026B, 1026C, 1026D may exit through the opening 1022A, 1022B, 1022C, 1022D, for example, to the user's eye (or to the environment in front of the user).

The opening may be regions of the mask where the mask is transmissive and need not necessarily be regions devoid of material. For example, the mask may comprise regions that are substantially opaque (reflective and/or absorbing) and regions that are substantially less opaque (e.g., less reflective and/or absorbing). These later regions are referred to herein as openings in the mask because more light will pass through these regions or openings. In configurations where the mask is reflective, light not transmitted through the opening may be potentially reflected back into the light-guiding component and be guided therein until being ejected in a process referred to herein as recycling or light recycling.

In some implementations, the mask may be dichroic and/or wavelength selective. For example, the mask may absorb or reflect invisible (e.g., infrared) light thereby blocking and/or recycling light from the illumination source, which may be an infrared light source. The opening, however, would be configured to pass this infrared light. The mask may, however, be transmissive to visible light such that the user can see through the mask to the environment in front of the user.

In some embodiments, a plurality of dichroic masks may be stacked with respect to the out-coupling element, for example, such that a first mask blocks a first wavelength or spectral range and second mask blocks a second wavelength or spectral range so that light at first wavelength(s) is blocked or substantially blocked by the first mask, however, passes through an opening the first mask. The first wavelength(s) will also be transmitted by the second mask. Similarly, the second wavelength(s) will be blocked or substantially blocked by the second marks, however, will pass through an opening in the second mask. The second wavelength(s) will also be transmitted by the first mask. As a result, first and second light sources configured to output light corresponding to the first and second wavelength regions, respectively, are produced. As discussed above, having different spatially separated light sources, possibly of known position, may as improve eye tracking. Multiplex (time multiplexing and/or wavelength multiplexing) may be used to coordinate the image capture with the activation of the different respective light sources. In some implementations, different of the plurality of masks may comprise their own pattern and plurality of openings. A plurality of masks and opening patterns may be used in conjunction with multiple wavelength sources and/or filters, thereby allowing for selective wavelength-based out-coupling of light through selective openings of the plurality of masks.

Accordingly, the illumination source may emit light of a wide variety of different wavelength, such as IR and/or visible wavelengths. As discussed above, the illumination source may comprise an LED or laser. In some implementations, the illumination source comprises a vertical-cavity surface-emitting laser (VCSEL). In some configurations, the illumination source may produce a divergent beam and/or a divergent beam is coupled into the light-guiding component. In some designs, the one or more illumination sources may comprises a plurality of illumination sources that produce a plurality of beams of light. In some implementations, the plurality of light beams have different respective wavelengths. In some configurations, a filter, such as a narrow band pass filter is employed to tailor the wavelength characteristics of the light. In some implementations, a plurality of illumination source include a plurality of filters, different filters producing light beams of different wavelengths. Any number of illumination sources may be utilized such as, for example, 1, 2, 3, 4, 5 or 10 illumination sources, or any range between any of these values.

In some configurations, an in-coupling optical element may comprise an in-coupling grating (ICG). In some configurations, the in-coupling optical element comprises an in-coupling prism. In some implementations, the in-coupling element is configured to in-couple light from at least one illumination source into the light-guiding component at angle larger than the critical angle of the light guiding component. In some implementations, the in-coupling optical element is configured to in-couple light from at least one illumination source into the light-guiding component at an angle of about 45°. A prism having an inclined reflective surface (e.g., providing reflection via total internal reflection) may be suitable to turn light from the illumination source into the light guiding component at 45° with respect to the light-guiding component (e.g., with respect to the major, top and bottom or front and rear, reflecting surfaces of the light guiding component that guide the light within the light-guiding component via total internal reflection). If the light propagates within the light-guiding component (such as a planar light guide plate, sheet, or film) at an angle of 45° with respect to the light-guiding component (e.g., with respect to major, top and bottom or front and rear, reflecting surfaces of the light-guiding components), and is not turned out of the light-guiding component, the light may reflect from the end of the light-guiding component and continue to be guided therein in the opposite direction via total internal reflection. More than one in-coupling optical element may be employed.

In various implementations, the light guiding component may comprise material optically transmissive to light from the one or more illumination sources. Light may be guided within the light-guiding component by total internal reflection. In some implementations, however, the light-guiding component comprises a hollow conduit having inner sidewalls from which the light is reflected to guide the light within the light-guiding component.

In some implementations, the light distributing optical element or OPE may be formed on a light-guiding component or in the light-guiding component. In some configurations, the light distributing optical element or OPE may be excluded.

In some designs, the out-coupling optical element may be formed on or in the light-guiding component. The out-coupling optical element may comprise one or more diffractive optical elements such as one or more diffraction gratings and/or holograms. The out-coupling optical element may comprise one or more diffusing or scattering features or layers. For example, the out-coupling optical element may comprise one or more diffuser sheets, one or more light shaping diffusers, one or more diffuser films, one or more etchings, one or more transmissive optical elements, one or more particles or particle layers, one or more irregular surfaces, one or more surface relieve structures, PTFE, Teflon, ground glass, opal glass, greyed glass, one or more white surfaces, colored gel, one or more holograms or any combination thereof. The out-coupling optical element may cause the light guided within the light-guiding optical element to be directed toward the mask and opening(s) in the mask such that at least some of the light can exit through the opening(s).

In some implementations, the out-coupling optical element encompasses the entire area of the mask and/or vice versa. In some implementations, the out-coupling optical element is larger than the mask or the mask is larger than the out-coupling optical element. In some implementations, the out-coupling optical element encompasses the area of the mask openings.

In some configurations, the out-coupling optical element may be excluded. For example, light may simply leak out of the light guiding optical element by not being total internally reflected therein. For example, the inner side walls of the light guiding element may be reflective but allow some light guided within the light-guiding component to pass therethrough. Other variations are possible.

As discussed above, in some configurations, light is ejected out of the light-guiding optical element towards the user's eye to illuminate the user's eye, for example, with infrared light for tracking. In some implementations, one or more cameras are used to capture the images of the eye illuminated by the illumination source. In some configurations, a time-multiplexing approach may be used with a camera to increase eye tracking robustness.

In some configurations, light is ejected out of the light-guiding component towards the environment in front of the user possibly to illuminate objects in the environment, for example, to provide for depth sensing.

Accordingly, one or more eye tracking cameras, depth sensor(s), or other components may additionally be included. Likewise, one or more displays for projecting image content into the eye of the users may also be included. Similarly, any of the features, structures, variations, applications, uses, benefits, etc. described above may be used in connection with or are applicable to implementations that employ the mask and one or more openings in the mask to provide illumination.

In some embodiments, the image projector of the head mounted display and the illumination source share the same in-coupling optical element and light-guiding component.

Diffusive Optical Elements

In various implementations, the out-coupling optical element may comprise a diffusive optical element.

Figure 12A:
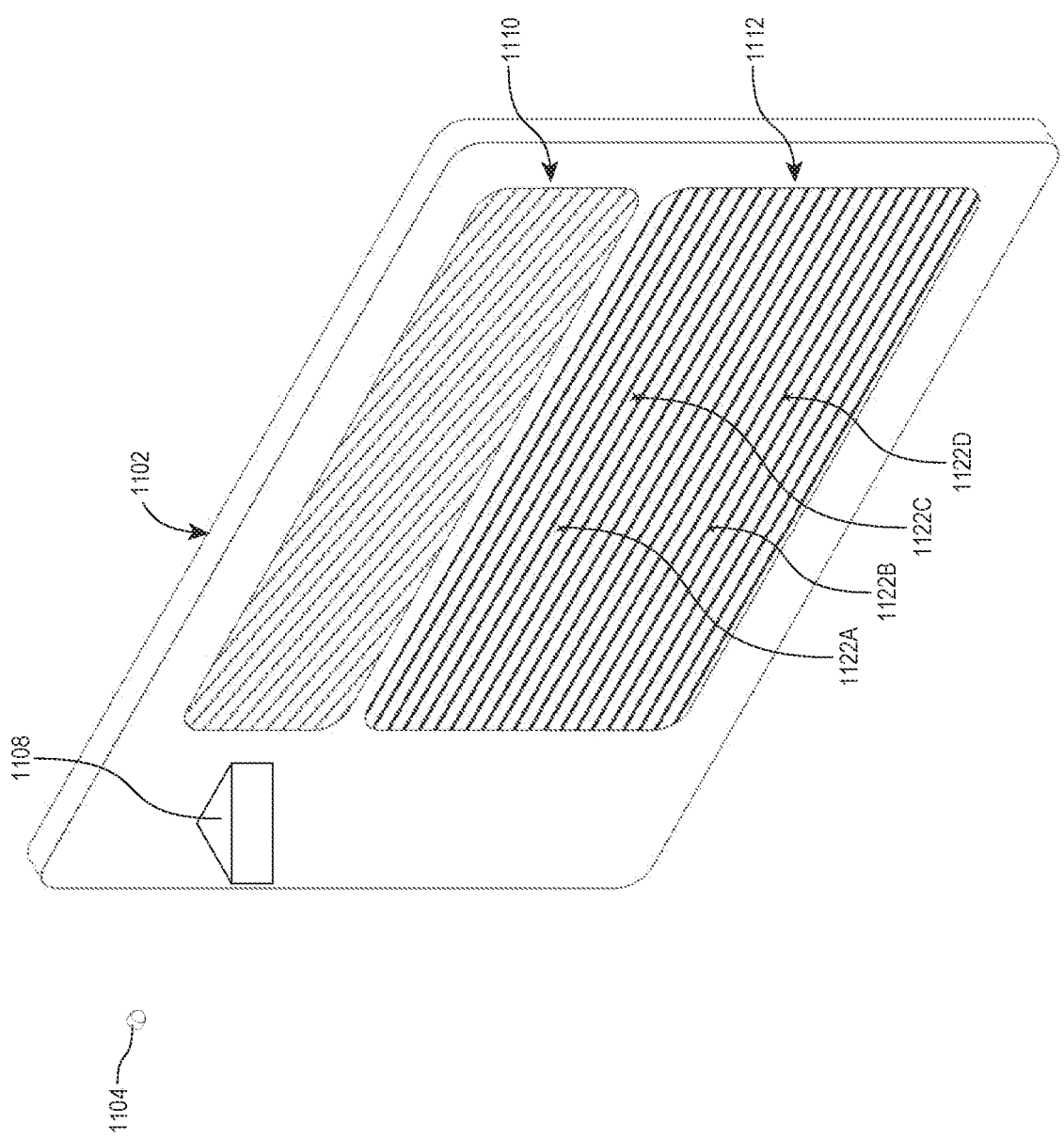
FIGS. 12A-12B illustrate perspective views of a light-guiding component and one or more out-coupling optical elements comprising diffusive optical elements or scatter regions that scatter light guided within the light-guiding component, in this example, producing a plurality of separate localized (e.g., point) sources of illumination.
Figure 12B:
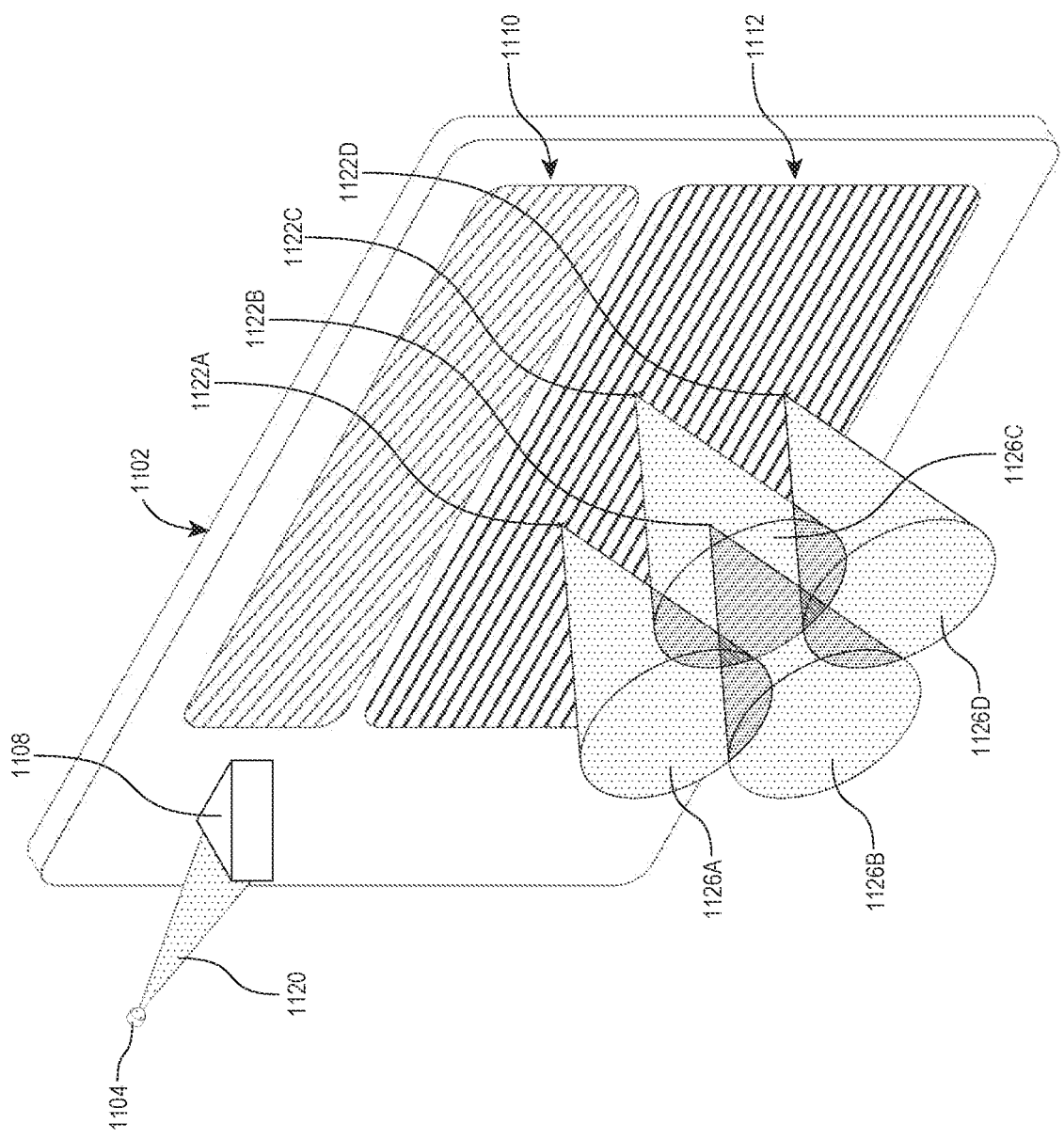

FIGS. 12A-12B, for example, illustrates a perspective view of a light-guiding component 1102 including a plurality of diffusive optical elements, diffusive regions, or scatter regions for ejecting light guided within the light-guiding component 1102. Specifically, FIG. 12A shows a light-guiding component 1102 having an in-coupling element 1108 positioned to couple light therein. A light distribution element (e.g., OPE) 1110 and an out-coupling optical element 1112 (e.g., EPE) comprising a plurality of diffusive optical elements or scatter regions 1122A, 1122B, 1122C, 1122D (e.g., four diffusive optical element shown) for ejecting light guided within the light-guiding component 1102 are disposed on or in the light-guiding component 1102. The light guiding component 1102, light distribution element (OPE) 1110 and out-coupling optical element (EPE) 1112 may be configured to operate in a similar manner to waveguides 670, 680, 690 shown in FIGS. 9A-9C and as discussed above with regard to FIGS. 10A-10D. For example, in some implementations, the light distribution element (OPE) 1010 comprises diffractive optical elements although the structure of these elements should not be so limited. Also as discussed above, the light-guiding component may further comprise an eyepiece comprising one or more waveguides (such as the waveguides 670, 680, 690 shown in FIGS. 9A-9C) that are configured to receive light from a display and to deliver image content to a user's eye or alternatively the light guiding component may supplement such an eyepiece configured to deliver image content to a user. In some implementations, however, the light-guiding component may comprise the eye piece that is also used to convey image content to a user. For example, the light-guiding component may comprise a waveguide that guides light from the illumination source (e.g., to the user's eye or to the environment forward the user) as well as light from a projector or display to the user's eye to present images to the user's eye. In certain designs, for example such as where the light-guiding component is used to both convey illumination from the illumination source as well as light from an image projector or display, both the out-coupling optical element (EPE) 1112 comprising the diffusive optical elements (or diffractive optical elements) as well as an out-coupling optical element (EPE) for out-coupling light from the display or the image projector may be included. In some cases, either or both the out-coupling optical element (EPE) 1112 comprising the diffusive optical elements (or diffractive optical elements) and/or the out-coupling optical element (EPE) for out-coupling light from the display or image projector are wavelength selective. For example, the out-coupling optical element (EPE) 1112 comprising the diffusive optical elements (or diffractive optical elements) may be configured to selectively out-couple a first wavelength or group of wavelengths and the out-coupling optical element (EPE) for out-coupling light from the display or image projector may be configured to selectively out-couple a second wavelength or group of wavelengths. In some such cases, the out-coupling optical element (EPE) 1112 comprising the diffusive optical elements (or diffractive optical elements) may be configured to not out-couple light having the second wavelength or group of wavelengths and the out-coupling optical element (EPE) for out-coupling light from the display or image projector may be configured not to out-couple light having the first wavelength or group of wavelengths. The first wavelength or group of wavelengths may include infrared wavelengths and not visible wavelengths and the second wavelength or group of wavelengths may include visible wavelengths and not infrared wavelengths. In such cases, for example, the out-coupling optical element (EPE) 1112 comprising the diffusive optical elements (or diffractive optical elements) may out-couple infrared and not visible light while the out-coupling optical element (EPE) for out-coupling light from the display or image projector may out-couple visible light and not the infrared light or at least the infrared light output by the illumination source. Accordingly, in some designs, the out-coupling optical elements 1112 may be wavelength-selective, such that, for example, the out-coupling optical elements only out-couples select wavelengths (e.g. IR) guided therein and do not interact with or out-couple other wavelengths (e.g. visible) guided therein. Other approaches are possible. For example, in some implementations, the out-coupling optical element (EPE) for out-coupling light from the display or image projector may have openings or breaks corresponding with the lateral placement or location of the out-coupling optical element (EPE) 1112 comprising the diffusive optical elements (or diffractive optical elements).

FIG. 12B shows an illumination source 1104 disposed with respect to the in-coupling optical element 1108 to couple light into the light guiding component 1102 such that the light is guided therein by total internal reflection. The light distribution element 1210 is disposed to receive the light coupled into the light-guiding component 1102 by the in-coupling optical element and redirect the light toward the out-coupling optical element comprising the diffusive optical elements or scatter regions. The out-coupling optical element, namely, the diffusive optical elements or scatter regions, cause light from the illumination source to be ejected from the light guiding component 1102. As discussed above, the out-coupling optical element may comprise diffusive features or scatter features configured to turn the light guided within the light-guiding component 1102 such that the light is not guided therein. For example, the light may be directed toward the user's eye at an angle such that the light will not be guided within the light-guiding component 1102 by total internal reflection. The scatter features 1122A, 1122B, 1122C, 1122D may be disposed in localized regions such that the light appears to emanate from localized light sources (e.g., point sources) that may be located on or at the light-guiding component, for example, a surface thereof.

Accordingly, in some configurations, the diffusive regions 1122A, 1122B, 1122C, 1122D are small compared to light-guiding component 1102. The reduced size may in some instances cause divergence of the beam by diffraction. One of the diffusive regions 1122A, 1122B, 1122C, 1122D may, for example, have lateral extents, e.g., widths or diameters of about 1 µm, about 5 µm, about 10 µm, about 20 µm, about 50 µm, about 100 µm, about 500 µm, about 1 mm or about 5 mm, or any range between any of these values. In some cases, one of the diffusive regions 1122A, 1122B, 1122C, 1122D can be considered to create a point source of light. Several such localized light sources spaced apart from each other may be created by the plurality of diffusive regions 1122A, 1122B, 1122C, 1122D.

FIG. 12B illustrates out-coupled light 1126A, 1126B, 1126C, 1126D, ejected by the diffusive regions 1122A, 1122B, 1122C, 1122D, which may correspond to point sources, as shown. FIG. 12B specially depicts the illumination source 1104 emitting a divergent light 1020 to the in-coupling optical element 1108. In-coupling element 1108 couples the light into the light-guiding component 1102 such that the light is guided therein by total internal reflection. The light beam, however, may continue to diverge within the light-guiding optical element. The light in-coupled into the light-guiding component 1102 may propagate to the light distribution element or OPE 1110. The light distribution element or OPE 1010 may redirect at least a portion of this light to the out-coupling optical element 1112 comprising the plurality of diffusive optical elements or scatter regions 1122A, 1122B, 1122C, 1122D. As discussed above, the out-coupling optical element 1112 comprising the plurality of diffusive optical elements or scatter regions 1122A, 1122B, 1122C, 1122D is configured to eject light form the light-guiding component 1102. Light 1126A, 1126B, 1126C, 1126D may be ejected by diffusive optical elements or scatter regions 1122A, 1122B, 1122C, 1122D, for example, to the user's eye (or to the environment in front of the user).

In some implementations, a plurality of light beams illuminate a plurality of out-coupling optical elements comprising a plurality of diffusive optical elements. For example, in some designs, reflection off an opposite edge and/or splitting of the beam directs the beam towards different out-coupling optical elements comprising different diffusive optical elements. In various implementations, for example, different light beams of the plurality of light beams comprises different wavelengths of light and different ones of the plurality of out-coupling optical elements selectively out-couple respective ones of these wavelengths, such that different light beams having different wavelengths are out-coupled through different respective out-coupling optical elements. In some designs, these plurality of light beams can be turned or out-coupled simultaneously or sequentially.

The illumination source may emit light of a wide variety of different wavelengths, such as IR and/or visible wavelengths. As discussed above, the illumination source may comprise an LED or laser. In some implementations, the illumination source comprises a vertical-cavity surface-emitting laser (VCSEL). In some embodiments, the illumination source may produce a divergent beam and/or a divergent beam is coupled into the light-guiding component. In some configurations, the one or more illumination sources may comprise a plurality of illumination sources that produce a plurality of beams of light. In some implementations, the plurality of light beams have different respective wavelengths. In some configurations, a filter, such as a narrow band pass filter is employed to tailor the wavelength characteristics of the light. In some designs, a plurality of illumination source include a plurality of filters, different filters producing light beams of different wavelengths. Any number of illumination sources may be utilized, for example, such as 1, 2, 3, 4, 5 or 10 illumination sources, or any range between any of these values. In some embodiments, a plurality of light beams can be turned simultaneously or sequentially.

In some configurations, an in-coupling element may comprise an in-coupling grating (ICG). In some configurations, the in-coupling element comprises an in-coupling prism. In some implementations, the in-coupling element is configured to in-couple light from at least one illumination source into the light guiding component at angle larger than the critical angle of the light guiding component. In some designs, the in-coupling element is configured to in-couple light from at least one illumination source into the light guiding component at an angle of about 45°. A prism having an inclined reflective surface (e.g., providing reflection via total internal reflection) may be suitable to turn light from the illumination source into the light guiding component at 45° with respect to the light-guiding component (e.g., with respect to the major, top and bottom or front and rear, reflecting surfaces of the light guiding component that guide the light within the light-guiding component via total internal reflection). If the light propagates within the light-guiding component (such as a planar light guide plate, sheet, or film) at an angle of 45° with respect to the light-guiding component (e.g., with respect to major, top and bottom or front and rear, reflecting surfaces of the light-guiding components), and is not turned out of the light-guiding component, the light may reflect from the end of the light-coupling component and continue to be guided therein in the opposite direction via total internal reflection. More than one in-coupling element may be employed.

In various implementations, the light-guiding component may comprise material optically transmissive to light from the one or more illumination sources. Light may be guided within the light-guiding component by total internal reflection. In some implementations, however, the light-guiding component comprises a hollow conduit having inner sidewalls from which the light is reflected to guide the light within the light-guiding component.

In some implementations, the light distributing optical element or OPE may be formed on the light-guiding component or in the light guiding component. In some configurations, the light distributing optical element or OPE may be excluded.

In some configurations, a majority of the out-coupled light exits from the light-guiding component from the diffusive optical elements. In some designs, the diffusive optical elements may scatter out light. In some configurations, the diffusive optical elements are refractive, reflective, diffractive, or any combination thereof. In some designs, the out-coupling optical element may be formed on or in the light-guiding component. In some designs, for example, the diffusive optical elements are disposed on the top surface of the light guiding component. In some implementations, a diffusive optical element such as a diffusing sheet or film or portion thereof or diffusing material or particles is placed on a surface of the light guiding component. In some configurations, the diffusive optical elements are disposed within the volume of the light guiding component. In some embodiments, the out-coupling optical element may comprise the diffusive optical elements. In some embodiments, a plurality of out-coupling optical elements are employed comprising a plurality of diffusive optical elements. In some embodiments, the out-coupling optical elements (or plurality of diffusive optical element) selectively out-couple a light from different spectral regions respectively.

The out-coupling optical element may comprise one or more diffusing or scattering features or layers. For example, the out-coupling optical element may comprise one or more diffuser sheets, one or more light shaping diffusers, one or more diffuser films, one or more etchings, one or more transmissive optical elements, one or more particles or layer of particles, one or more irregular surfaces, one or more surface relief structures, polytetrafluoroethylene (e.g., PTFE and/or Teflon.), ground glass, opal glass, greyed glass, one or more white surfaces, colored gel, one or more holograms or any combination thereof. In some implementations, the diffusive optical elements only extend across a small portion of the light-guiding component. The diffusive optical element may, for example, extend across an area of the light-guiding component that that is less than 10%, less than 5%, less than 3%, less than 2%, less than 1%, less than 0.5% or less than 1%, or any range between any of these values. The out-coupling optical element may cause the light guided within the light-guiding component to be directed such that at least some of the light can exit.

As discussed above, in some configurations, light is ejected out of the light-guiding optical element towards the user's eye to illuminate the user's eye, for example, with infrared light for eye tracking. In some implementations, one or more cameras are used to capture the images of the eye illuminated by the illumination source. In some configurations, a time-multiplexing approach may be used with a camera to increase eye tracking robustness.

In some configurations, light is ejected out of the light-guiding optical element towards the environment in front of the user possibly to illuminate objects in the environment, for example, to provide for depth sensing.

In some implementations, at least one illumination source may emit visible light and be out-coupled from the light-guiding optical element to provide visual indicia (e.g., alerts, notifications, etc.) to the user and/or the user's environment. For example, in some embodiments, the visible light may be out-coupled (e.g., to bystanders other than the user) to provide a blinking color (e.g., red) illumination pattern. In some configurations, for example, the blinking illumination pattern may indicate that the eyepiece is recording video. In some designs, the visible light may be out-coupled (e.g., to the user) to provide a pulsating color (e.g., green) illumination pattern. In some designs, for example, the pulsating (e.g. green) illumination pattern may indicate that the user has an unread message (e.g. email, text message) or may be used to provide another form of alert.

In some implementations, at least one illumination sources may emit visible light and be out-coupled from the light-guiding optical element to provide aesthetic enhancements and/or entertainment-driven special visual effects. For example, in some designs, the visible light may be out-coupled to surround the user's visual periphery with a glowing and/or fluctuating color (e.g., blue) aura, for example, while the user is engaged an activity such as in a deep sea diving mixed reality experience, thereby creating a greater sense of immersion.

In some configurations, at least one illumination sources may emit visible and/or invisible (e.g. IR or UV) light and be out-coupled from the light-guiding optical element to the user and/or the user's environment and produce illumination patterns that may serve to provide one or more signals or fiducial points recognizable to external imaging sensors located in the environment (e.g., third party cameras, other head mounted displays, etc.).

Accordingly, one or more eye tracking cameras, depth sensor(s), or other components may additionally be included. Likewise, one or more displays for projecting image content into the eye of the users may also be included. Similarly, any of the features, structures, variations, applications, uses, benefits, etc. described above may be used in connection with or are applicable to implementations that employ the diffusive optical element or scatter regions to provide illumination.

In some embodiments, the image projector of the head mounted display and the illumination source share the same in-coupling optical element and light-guiding component.

Outer and Inner Covers or Shields

Figure 13B:
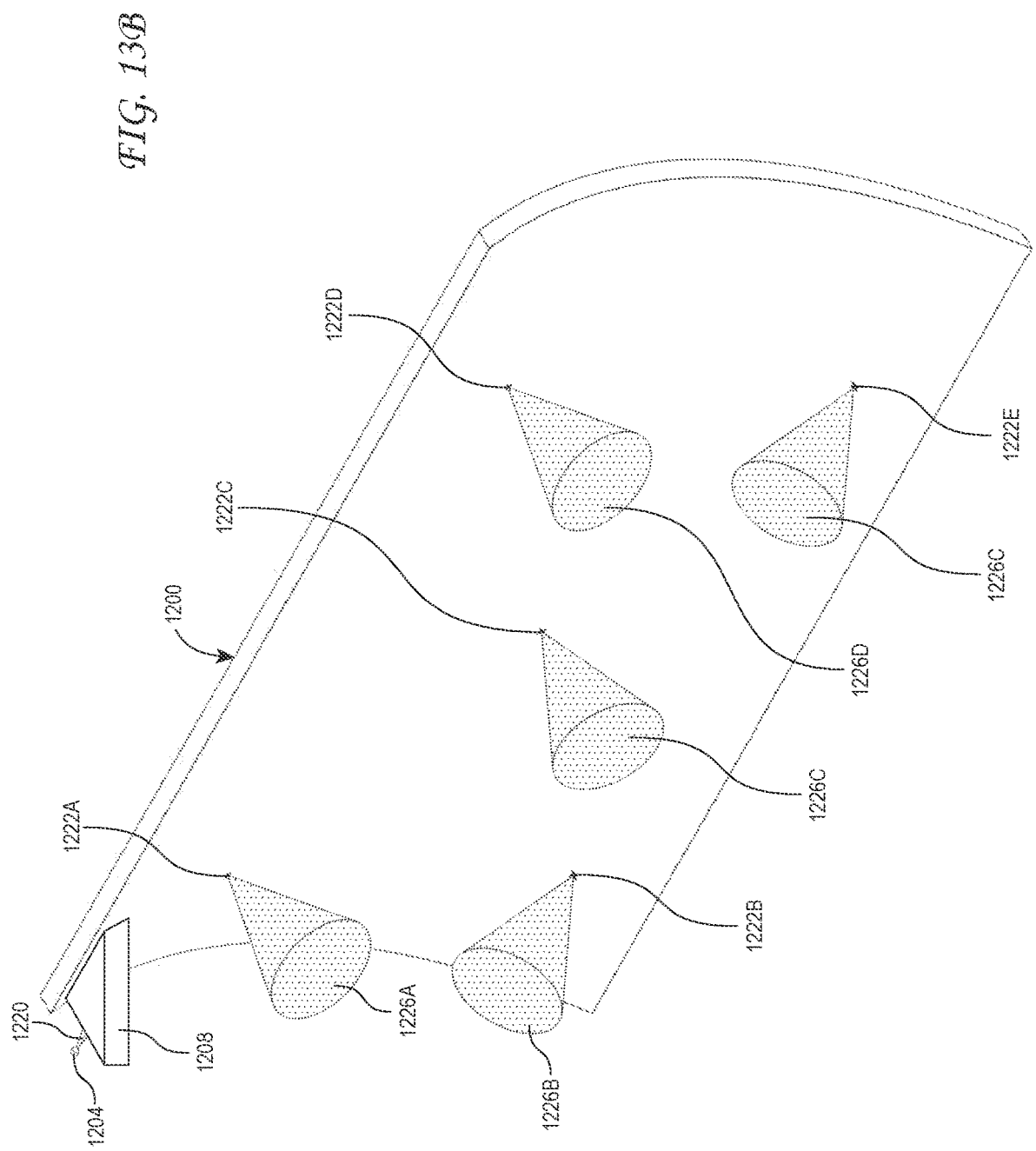

As described above, in some implementations, the light-guiding component for providing illumination (e.g., to the eye for eye tracking) supplements the eyepiece comprising one or more waveguides for directing light from one or more displays to the eye to provide image content thereto. FIGS. 13A-13B show an example of such a configuration wherein the light-guiding component comprises a cover or shield.

In particular, FIG. 13A illustrate the light-guiding component comprising an outer cover or shield 1200 in front of the light guiding element 1202. In this particular example, the outer cover 1200 is curved. FIG. 13A also shows a waveguide 1202 having an in-coupling grating (ICG), a light distribution element (OPE) 1210 and out-coupling optical element (EPE) 1212 configured to receive light from a display (not shown) and direct light from the display to the user's eye to present image content thereto. FIG. 13A also shows the outer cover 1200 in front of the waveguide 1202. An in-coupling element 1208 is positioned to couple light from an illumination source into the light-guiding component 1200 comprising the outer cover.

The system further comprises an illumination source 1204 configured to couple light into an in-coupling optical element 1208 such that light is guided within the light-guiding component 1200. FIG. 13B shows the light-guiding component/cover 1200 without the eyepiece comprising the waveguide 1202 rearward of the light-guiding component/cover 1200. FIG. 13B also shows light ejected out from the light-guiding component/cover 1200 to a user's eye (not shown) with diffusive optical elements 1222A, 1222B, 1222C, 1222D, 1222E disposed in or on the outer cover 1200. These diffusive optical elements 1222A, 1222B, 1222C, 1222D, 1222E have relatively small lateral extent, for example, compared to the light-guiding component/cover 1200. Consequently, light ejected from the light-guiding component/cover 1200 by the diffusive optical elements 1222A, 1222B, 1222C, 1222D, 1222E can be considered to be emanating effectively from a plurality of respective point sources.

In various implementations the light-guiding component/cover 1200 comprises a protective cover for the eyepiece 1202. The light-guiding component/cover 1200 may comprises, for example, plastic, such as polycarbonate and/or acrylic, and glass or any combination thereof. As illustrated, the cover 1200 is forward the eyepiece 1202, which is forward the user's eye. The cover 1200, however, is rearward of the environment in front of the user. The cover 1200 may be supported by a frame, not shown. The cover 1200 may protect the eyepiece 1202 from the environment forward the user. In the example illustrated in FIGS. 13A-13B, the cover 1200 is curved more in one direction than in the other (e.g., orthogonal) direction. The cover 1200 has a cylindrical shape. In particular, the cover 1200 is curved on one direction (vertical) and not the other orthogonal direction (horizontal). The cover 1200 has a shape of a portion of a right circular cylinder. Although the cover is shown as curved, the cover need not be curved or need not have the particular curved shape shown.

In some embodiments, the outer cover may be disposed over the eyepiece to act as a shield. In some embodiments, a head mounted display may include a visor, wherein the visor comprises the outer cover that comprises the light-guiding component. Accordingly, in various implementations, an outer cover and/or a light visor is configured to guide the illumination from the illumination to the user's eye or to the environment (e.g., using total internal reflection.)

As described above, the light-guiding component for providing illumination (e.g., to the eye for eye tracking) can supplement the eyepiece comprising one or more waveguides for directing light from one or more displays to the eye to provide image content thereto. In particular, the light-guiding component can comprise a cover or shield and this cover or shield may be disposed rearward of the eyepiece.

Figure 14A:
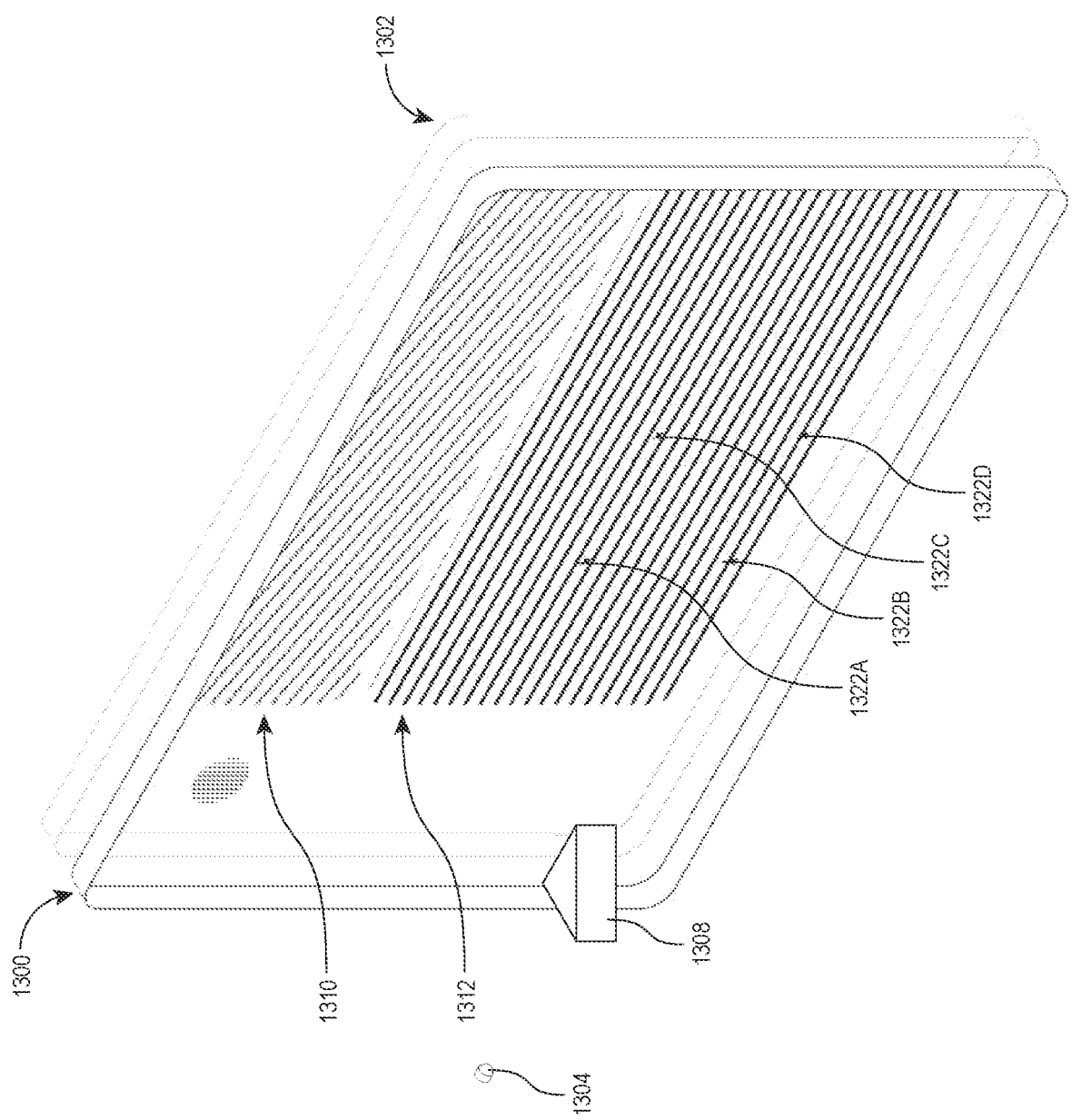
FIGS. 14A-14B illustrate a light-guiding component comprising an inner cover for the eyepiece of a head-mounted display. One or more out-coupling optical elements comprising a plurality of diffusive optical elements are disposed with respect to the light-guiding component to cause light guided within the light-guiding component to be ejected therefrom.
Figure 14B:
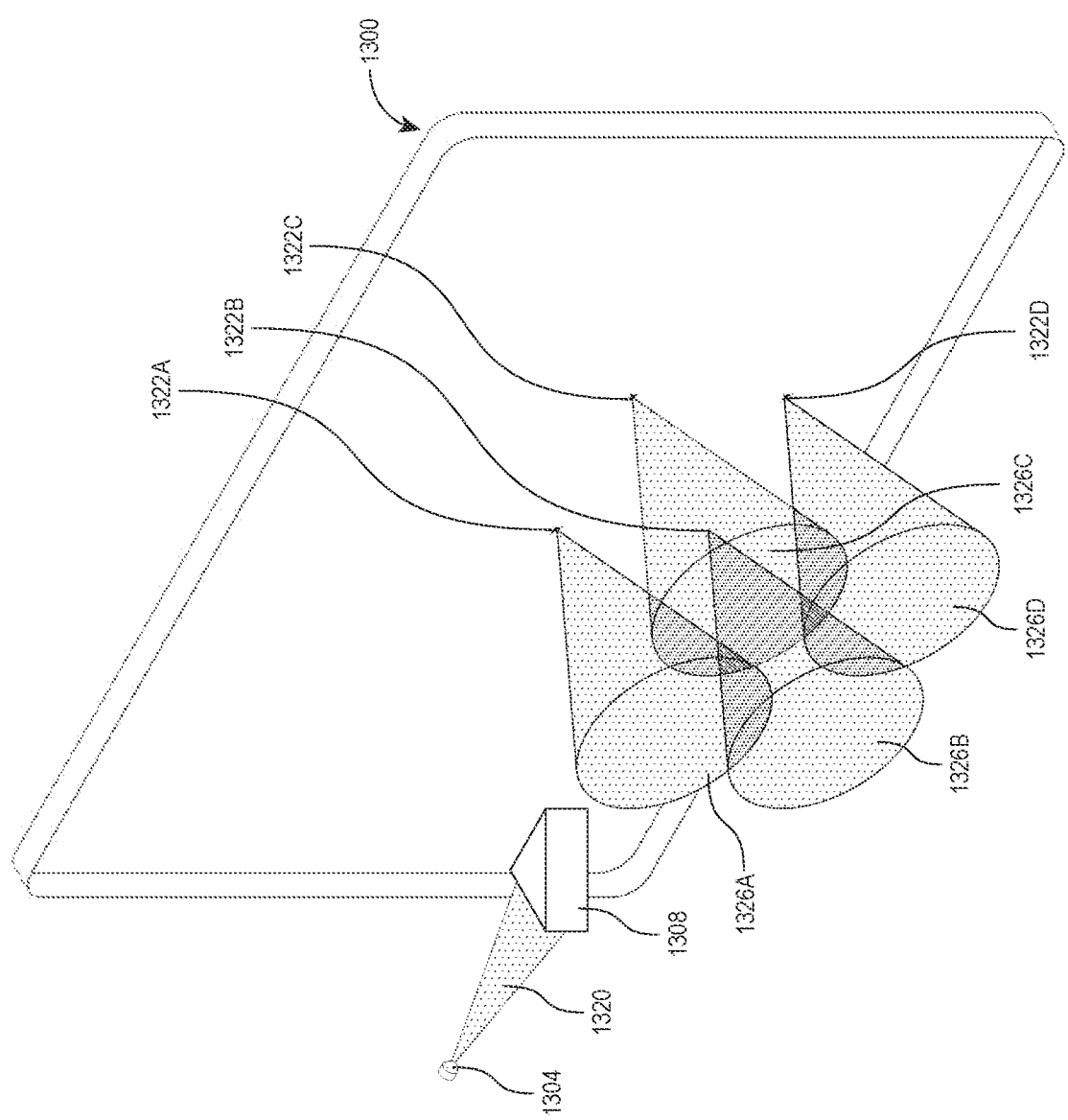

The FIGS. 14A-14B, in particular, show a light-guiding component comprising an inner cover or shield 1300 rearward of the eyepiece (e.g., light guiding element configured to display image content) 1302. In this particular example, the inner cover 1300 is not curved but is planar. FIG. 14A also shows a waveguide 1302 having an in-coupling grating (ICG), a light distribution element (OPE) 1310 and out-coupling optical element (EPE) 1312 configured to receive light from a display (not shown) and direct light from the display to the user's eye to present image content thereto. FIG. 14A also shows the inner cover 1300 rearward of the waveguide 1302.

The system further comprises an illumination source 1304 configured to couple light into an in-coupling optical element (e.g., prism) 1308 such that light is guided within the light-guiding component 1300. FIG. 14B shows the light-guiding component/cover 1300 without the eyepiece comprising the waveguide 1202 forward of the light-guiding component/cover 1300. FIG. 14B also shows light ejected out from the light-guiding component/cover 1300 to a user's eye (not shown) with diffusive optical elements 1322A, 1322B, 1322C, 1322D, 1322E disposed in or on the inner cover 1300. These diffusive optical elements 1322A, 1322B, 1322C, 1322D, 1322E have relatively small lateral extent, for example, compared to the light-guiding component/cover 1300. Consequently, light ejected from the light-guiding component/cover 1300 by the diffusive optical elements 1322A, 1322B, 1322C, 1322D, 1322E can be consider to be emanating effectively from a plurality of respective point sources.

In various implementations the light-guiding component/cover 1300 comprises a protective cover for the eyepiece 1302. The light-guiding component/cover 1300 may comprises for example plastic, such as polycarbonate and/or acrylic, and glass or any combination thereof. As illustrated, the cover 1300 is rearward the eyepiece 1202, both of which are forward the user's eye and rearward the environment in front of the user. The cover 1200 may be supported by a frame, not shown. The cover 1200 may protect the rearward side of the eyepiece 1202. Although the cover 1200 is shown as flat or planar, the cover need not be flat but may be curved and may be curved in one direction more than the orthogonal direction (e.g., cylindrical).

In some implementations, a display includes one or more covers. In some designs, the cover may be cosmetic, tinted, impact resistant or combinations thereof. For example, the cover(s) can obscure the system components behind the covers for a cleaner (e.g., less cluttered) look to the display. In some configurations, the display may also include a front band and a sensor cover to protect the system components while forming a contiguous front of the display around the external lenses. The covers may have a 50% to 70% transparency (which may in some cases be provided by tint) that may in some instances potentially improve or optimize an AR experience involving light from both virtual objects and real-world physical objects.

In some designs, the display may further include on or more (e.g., a pair) of inner covers to protect the system components and/or form a protective inner surface for the display adjacent the user's face. In some implementations, the display may include one or more optional prescription lenses to accommodate users requiring corrective lenses. In some designs, a mounting structure may house a cover, disposed either on the environment side or the user's side of the viewing optics assembly.

In some implementations, the cover or cover lens may comprise anti-scratch material or other protective covering to prevent contact of the display such as with oils from fingertips or dust and debris from the external environment. In some configurations, the cover or cover lens may include light modifiers, such as polarized lens to reflect or absorb certain light. In some designs, displays comprise such a protective cover or cover lens in addition to the plurality of waveguides.

Any of these covers or lenses may comprise the light-guiding component and be configured to guide light from the illumination source (e.g., via total internal reflection).

Variations in design and configuration are possible. For example, out-coupling could be provided by diffractive optical elements such as holograms and may provide for virtual light sources disposed on a separate depth plane than the cover. Similarly, a mask with openings may be employed. Still other arrangements, configurations, and combinations are possible.

Frame

Figure 15B:
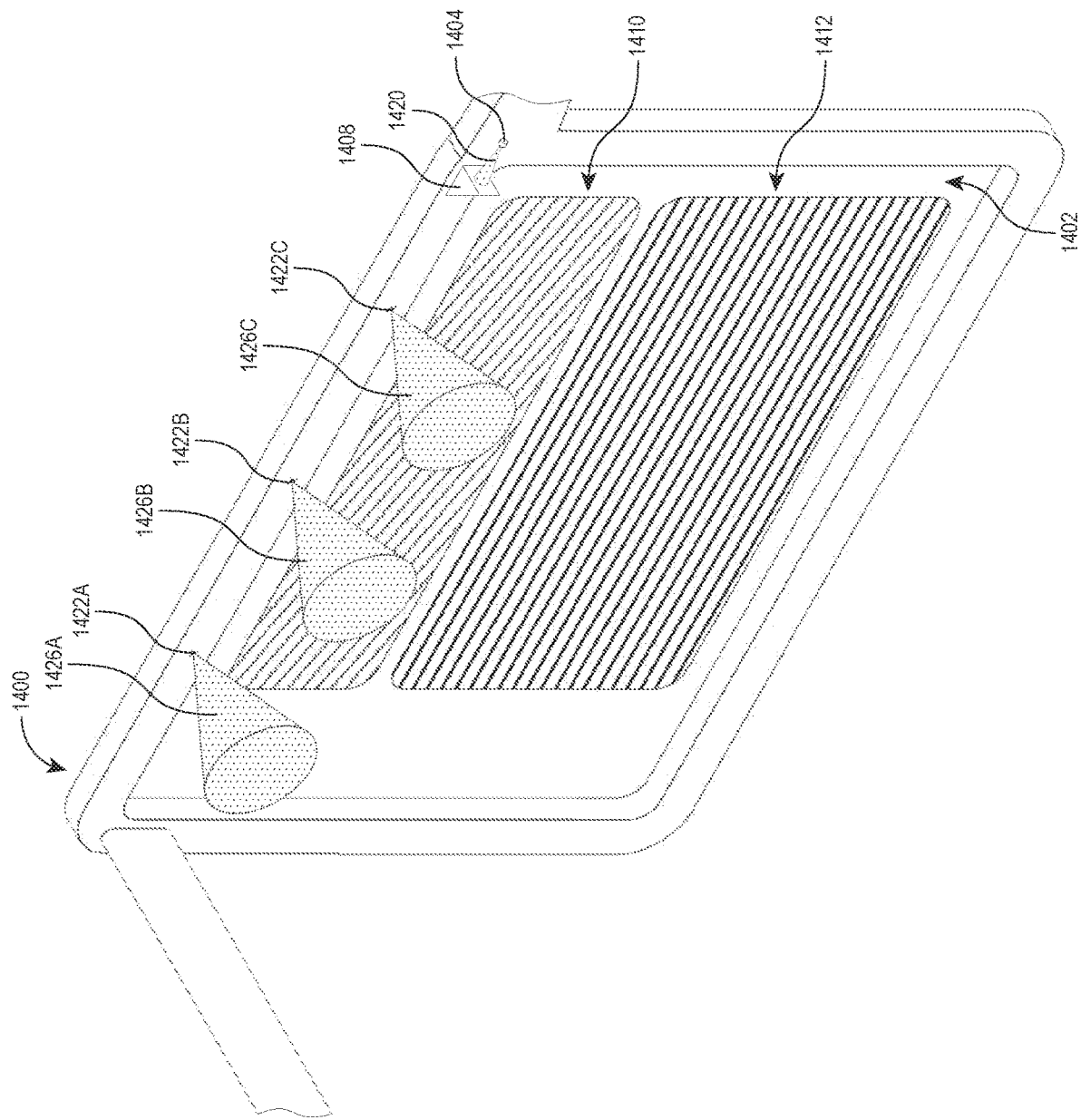

As illustrated in FIGS. 15A-15B, the light-guiding component may comprise a portion of the frame. Accordingly, the light-guiding component for providing illumination (e.g., to the eye for eye tracking) can supplement the eyepiece comprising one or more waveguides for directing light from one or more displays to the eye to provide image content thereto.

FIGS. 15A-15B, in particular, show a light-guiding component 1400 comprising a portion of the frame surrounding the eyepiece (e.g., waveguide configured to display image content) 1402. FIG. 15A also shows an eyepiece/waveguide 1402 having a light distribution element (OPE) 1410 and out-coupling optical element (EPE) 1412 configured to receive light from a display (not shown) and direct light from the display to the user's eye to present image content thereto.

FIG. 15A also shows parts of the frame surrounding the eyepiece/waveguide 1402. One of the portions of the frame comprises the light-guiding component 1400 for conveying light therethrough. FIG. 15A also shows an illumination source 1404 configured to couple light into an in-coupling optical element (e.g., prism) 1408 such that light is guided within the light-guiding component 1400 included in a portion of the frame.

In some implementations, the portion of the frame comprising the light guiding component 1400 may comprise a material that is transmissive to light output by the illumination source 1404 and may have an index of refraction sufficient to cause such light to be guided therein by total internal reflection. In some alternative implementations, the portion of the frame comprising the light-guiding component 1400 may comprise a hollow cavity having sidewalls from which light from the illumination source 1404 may reflect thereby propagating light within the light-guiding component.

FIG. 15B also shows light ejected out from the light-guiding component 1400 to a user's eye (not shown) with diffusive optical elements 1422A, 1422B, 1422C, 1422D, 1422E disposed in or on the light-coupling component 1300. These diffusive optical elements 1422A, 1422B, 1422C, 1422D, 1422E have relatively small lateral extent, for example, compared to the light-guiding component 1400. Consequently, light ejected from the light-guiding component 1400 by the diffusive optical elements 1422A, 1422B, 1422C, 1422D, 1422E can be consider to be emanating effectively from a plurality of respective point sources.

In some embodiments, the diffusive optical elements 1422A, 1422B, 1422C, 1422D, 1422E are disposed on the surface of the frame, which may be solid or hollow. The diffusive optical elements may also be disposed within a hollow frame or the volume of a solid frame.

In some instances, wherein the light-guiding component 1400 comprises a portion on the frame and the out-coupling optical elements are include on this portion of the frame, light may be emitted from a peripheral region in contrast to the light-guiding components discussed above, which are more centrally located with respect to the field-of-view of the user's eye. In this example, multiple light beams are projected to the user's eye from diffusive optical elements. Furthermore, the multiple beams are arranged along a line. Other designs are possible. For example, less beams (e.g., even a single beam) may be used. Additionally, the beams need not be arranged in a line. Likewise, although the portion of the frame comprising the light-guiding component 1400 is generally linear, the shape may be non-linear. Other non-linear light guiding shapes and structures may be used. In some implementations, the frame may comprise a plurality of arms configured to contact and/or secure the frame to the user's head, wherein light may be in-coupled and/or out-coupled from one or more arms of the frame.

Variations in design and configuration are possible. For example, out-coupling could be provided by diffractive optical elements such as holograms and may provide for virtual light sources disposed on a separate depth plane than the frame. Similarly, a mask with openings may be employed. Still other arrangements, configurations, and combinations are possible.

Other Shapes

Figure 16:
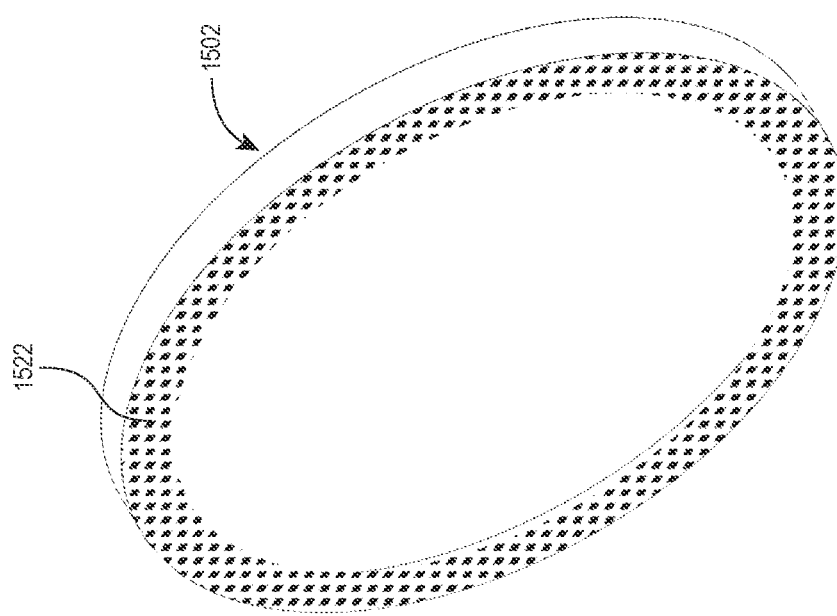
FIG. 16 illustrates a circular shaped light-guiding component that includes a ring-shaped output coupling element comprising, for example, an annular shaped diffusing film or diffractive optical element.

Multiple patterns and/or geometries of light-guiding components, out-coupling elements, masks and mask opening openings, and diffusive optical elements may be used. FIG. 16 illustrates a circularly shaped light-guiding component. FIG. 16 also illustrates an annular or ring-shaped diffusive optical element pattern. A region comprising diffusive optical elements or scatter features may be configured to extract light from the light-coupling component. Light ejected may thus be emitted from this annular or ring-shaped region. Other shapes are possible. Additionally, although in this example, the region comprises diffusive optical elements, the region could otherwise comprise one or more diffractive optical elements or holograms or a mask with openings such as described above. Combinations of these types of features are also possible.

Other shapes are possible. For example, although the light-guiding component is circular in shape, the light-guiding component may be elliptical or oval in shape, square, rectangular or other regular or irregular shapes. The light-guiding component may be flat, e.g., planar or may be curved.

In some implementations, out-coupling elements, mask openings and/or diffusive optical elements are peripherally located on the light-guiding component. In some designs, out-coupling elements, mask openings and/or diffusive optical elements are centrally located on the light-guiding component. In some configurations, the shape of the distribution of the out-coupling elements, mask openings and/or diffusive optical elements over light-guiding component is annular or circular or has other shapes such as linear.

In some implementations, the density of the distribution of the out-coupling elements, mask openings and/or diffusive optical elements over light-guiding component is 1 element/mm$^2$, 5 elements/mm$^2$, 10 elements/mm$^2$, 50 elements/mm$^2$, 100 elements/mm$^2$, 500 elements/mm$^2$, 1000 elements/mm$^2$, 10000 elements/mm$^2$, 1 element/μm$^2$, 5 elements/μm$^2$, 10 elements/μm$^2$, 50 elements/μm$^2$, 100 elements/μm$^2$, 500 elements/μm$^2$, 1000 elements/μm$^2$ or 10000 elements/μm$^2$, or any range between any of these values. Other variations are possible.

Stacking of Light-Guiding Components and/or Out-Coupling Optical Elements

In some instances, a stack of a plurality of light guiding components and/or out-coupling elements may be employed.

FIG. 17A, for example, illustrates first and second light-guiding components stacked on top of each other. In this example, the first and second light-guiding components are separated by an out-coupling optical element comprising, e.g., a diffusive optical element or a diffractive optical element, that is configured to couple light guided within the first and second light-guiding components out of the light-guiding components. In some implementations, the out-coupling is bi-directional, with light being ejected forward and rearward of the pair of light guiding components.

FIG. 17B illustrates a light guiding component comprising first and second out-coupling optical elements disposed on either side of the light-guiding component to couple light guided within the light-guiding component out of the light-guiding component. In some examples, the first and second out-coupling optical elements may be configured to provide bidirectional out-coupling such that light is ejected forward and rearward of the light-guiding component and the pair of out-coupling optical elements.

Figure 17C:
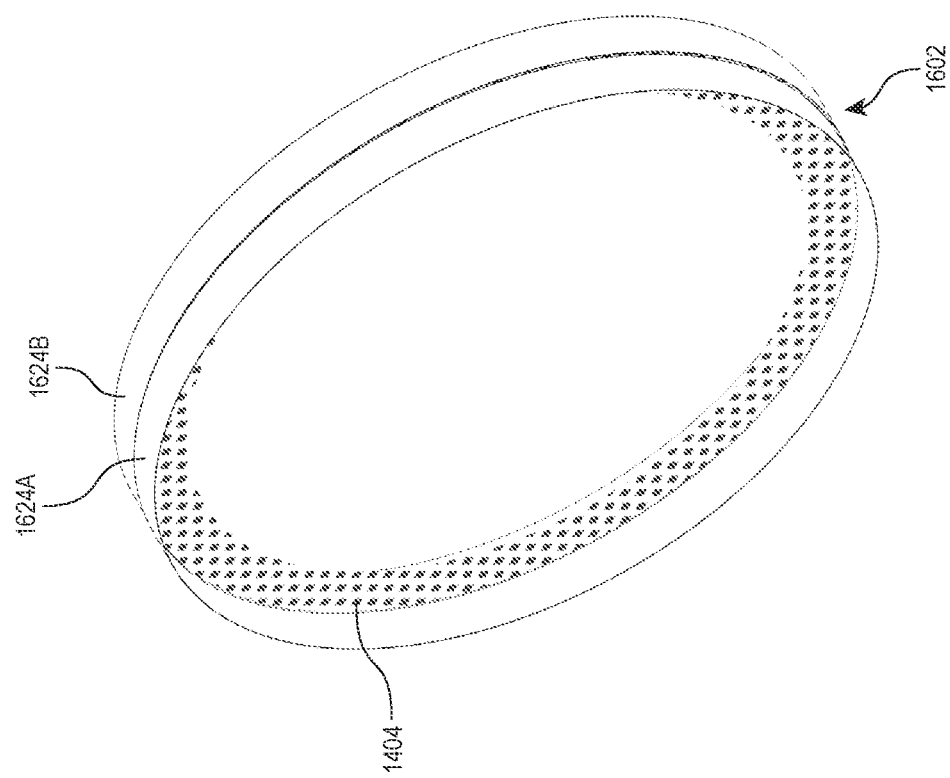
FIG. 17C illustrates first and second light-guiding components on opposite sides of one or more out-coupling optical elements comprising, e.g., a diffusive optical element or diffractive optical element, that is configured to couple light guided within the first and second light-guiding components out of the light-guiding components. In some implementations, the out-coupling is bi-directional, with light being ejected forward and rearward of the pair of light guiding components. As illustrated, the first and second light-guiding components are circularly shaped and the out-coupling optical element is annularly shaped.

FIG. 17C illustrates first and second light-guiding components on opposite sides of one or more out-coupling optical elements comprising, e.g., a diffusive optical element or diffractive optical element, that is configured to couple light guided within the first and second light-guiding components out of the light-guiding components. In some implementations, the out-coupling is bi-directional, with light being ejected forward and rearward of the pair of light guiding components. As illustrated, the first and second light-guiding components are circularly shaped and the out-coupling optical element is annularly shaped.

Although diffusive optical elements may be used in these example, in other implementations, the out-coupling optical element may comprise diffractive optical elements. Other components such as masks with one or more openings or other features or structures described herein may be used. Also, the shapes and distributions may vary. Other features may also vary.

In some embodiments, directing light from illumination source toward said environment may provide depth sensing. In some embodiments, directing light toward the user and/or to the environment may provide an indication to the user and/or to world. For example, the light may indicate that the wearable is recording video. For example, in some implementations, the visible light may be out-coupled to provide a blinking (e.g., red) illumination pattern to indicate that the eyepiece is recording video. In another example, in some configurations, the visible light may be out-coupled to provide a pulsating (e.g., green) illumination pattern to indicate that the user has an unread message (e.g. email, text message) or provide another message or alert.

In some implementations, directing light toward the user and/or to the environment may be for aesthetic purposes and/or provide special effects. For example, in some designs, the visible light may be out-coupled to surround the user's visual periphery with a glowing and/or fluctuating (e.g., blue) aura while the user is engaged in a certain activity such as a deep sea diving mixed reality experience, thereby creating a greater sense of immersion.

In some configurations, at least one illumination source may emit visible and/or invisible (e.g. IR or UV) light and be out-coupled from the light-guiding optical element to the user and/or the user's environment and produce illumination patterns that may serve to provide one or more fiducial points or signals recognizable to external imaging sensors located in the environment (e.g., third party cameras, head mounted displays, etc.).

In some embodiments, the light is out-coupled using a virtual light source architecture. In some embodiments, the light is out-coupled using a mask architecture. In some embodiments, the light is out-coupled using a diffusive optical element architecture.

Examples

Various examples are provided below.

1. A head-mounted display system configured to project light to an eye of a user wearing the head-mounted display system to display content in a vision field of said user, said head-mounted display system comprising:
 a frame configured to be supported on a head of the user;
 an image projector configured to project an image;
 at least one illumination source;
 a light-guiding component, said light-guiding component configured so as to be positioned forward one of the user's eyes when the frame is worn by the user;
 at least one illumination in-coupling optical element configured to in-couple light from the at least one illumination source into the light-guiding component so as to guide light from the at least one illumination source therein; and
 at least one diffusive optical element disposed on the light-guiding component so as to be positioned forward one of the user's eyes when the frame is worn by the user, wherein the at least one diffusive optical element is configured to diffusively couple light from the at least one illumination source out of the light-guiding component.

2. A head-mounted display system configured to project light to an eye of a user wearing the head-mounted display system to display content in a vision field of said user, said head-mounted display system comprising:
 a frame configured to be supported on a head of the user;
 an image projector configured to project an image;
 at least one illumination source;
 a light-guiding component, said light-guiding component configured so as to be positioned forward one of the user's eyes when the frame is worn by the user;
 at least one illumination in-coupling optical element configured to in-couple light from the at least one illumination source into the light-guiding component so as to guide light from the at least one illumination source therein; and
 at least one out-coupling optical element disposed on the light-guiding component so as to be positioned forward one of the user's eyes when the frame is worn by the user, wherein the at least one out-coupling optical element is configured to couple light from the at least one illumination source out of the light-guiding component and cause light coupled out of the light-guiding component to diverge in a manner consistent with light originating from a location a distance forward said light-guiding component.

3. A head-mounted display system configured to project light to an eye of a user wearing the head-mounted display system to display content in a vision field of said user, said head-mounted display system comprising:
 a frame configured to be supported on a head of the user;
 an image projector configured to project an image;
 at least one illumination source;
 a light-guiding component, said light-guiding component configured so as to be positioned forward one of the user's eyes when the frame is worn by the user;
 at least one illumination in-coupling optical element configured to in-couple light from the at least one illumination source into the light-guiding component so as to guide light from the at least one illumination source therein; and
 at least one mask comprising at least one mask opening disposed on the light-guiding component so as to be positioned forward one of the user's eyes when the frame is worn by the user, wherein the at least one mask and at least one mask opening are configured to couple light from the at least one illumination source out of the light-guiding component through the at least one mask opening.

4. A head-mounted display system configured to project light to an eye of a user wearing the head-mounted display system to display content in a vision field of said user, said head-mounted display system comprising:

a frame configured to be supported on a head of the user;
an image projector configured to project an image;
at least one illumination source;
a light-guiding component, said light-guiding component configured so as to be positioned forward one of the user's eyes when the frame is worn by the user; and
at least one illumination in-coupling optical element configured to in-couple light from the at least one illumination source into the light-guiding component so as to guide light from the at least one illumination source therein, said at least one in-coupling optical element comprising a prism,
wherein said light-guiding component is configured such that light from the illumination source guided within the light-guiding component is coupled out of the light-guiding component.

5. A head-mounted display system configured to project light to an eye of a user wearing the head-mounted display system to display content in a vision field of said user, said head-mounted display system comprising:
a frame configured to be supported on a head of the user;
an image projector configured to project an image;
at least one illumination source;
a light-guiding component, said light-guiding component configured so as to be positioned forward one of the user's eyes when the frame is worn by the user; and
at least one illumination in-coupling optical element configured to in-couple light from the at least one illumination source into the light-guiding component so as to guide light from the at least one illumination source therein;
wherein said light-guiding component is configured such that light from the illumination source guided within the light-guiding component is coupled out of the light-guiding component, and
wherein the image projector is configured to in-couple the image and the at least one illumination source is configured to in-couple light into the at least one illumination in-coupling optical element.

6. A head-mounted display system configured to project light to an eye of a user wearing the head-mounted display system to display content in a vision field of said user, said head-mounted display system comprising:
a frame configured to be supported on a head of the user;
an image projector configured to project an image;
at least one illumination source;
a light-guiding component, said light-guiding component configured so as to be positioned forward one of the user's eyes when the frame is worn by the user;
at least one illumination in-coupling optical element configured to in-couple light from the at least one illumination source into the light-guiding component so as to guide light from the at least one illumination source therein; and
an eyepiece configured to direct light into said user's eye to display augmented reality image content to the user's vision field, at least a portion of said eyepiece being transparent and disposed at a location forward the user's eye when the user wears said frame such that said transparent portion transmits light from the environment forward the user to the user's eye to provide a view of the environment forward the user,
wherein said eyepiece comprises a waveguide and at least one image in-coupling optical element configured to in-couple light from the image projector into the waveguide so as to guide light from the image projector therein.

7. A head-mounted display system configured to project light to an eye of a user wearing the head-mounted display system to display content in a vision field of said user, said head-mounted display system comprising:
a frame configured to be supported on a head of the user;
an image projector configured to project an image;
at least one illumination source;
a light-guiding component, said light-guiding component configured so as to be positioned forward one of the user's eyes when the frame is worn by the user, said light-guiding component being curved; and
at least one illumination in-coupling optical element configured to in-couple light from the at least one illumination source into the light-guiding component so as to guide light from the at least one illumination source therein,
wherein said light-guiding component is configured such that light from the illumination source guided within the light-guiding component is coupled out of the light-guiding component.

8. A head-mounted display system configured to project light to an eye of a user wearing the head-mounted display system to display content in a vision field of said user, said head-mounted display system comprising:
a frame configured to be supported on a head of the user;
an image projector configured to project an image;
at least one illumination source;
a light-guiding component, said light-guiding component configured so as to be positioned forward one of the user's eyes when the frame is worn by the user, said light-guiding component comprising a portion of said frame; and
at least one illumination in-coupling optical element configured to in-couple light from the at least one illumination source into the light-guiding component so as to guide light from the at least one illumination source therein,
wherein said light-guiding component is configured such that light from the illumination source guided within the light-guiding component is coupled out of the light-guiding component.

9. A head-mounted display system configured to project light to an eye of a user wearing the head-mounted display system to display content in a vision field of said user, said head-mounted display system comprising:
a frame configured to be supported on a head of the user;
an image projector configured to project an image;
at least one illumination source;
a light-guiding component, said light-guiding component configured so as to be positioned forward one of the user's eyes when the frame is worn by the user; and
at least one illumination in-coupling optical element configured to in-couple light from the at least one illumination source into the light-guiding component so as to guide light from the at least one illumination source therein, and
at least one out-coupling optical element disposed on the light-guiding component so as to be positioned forward one of the user's eyes when the frame is worn by the user, wherein the at least one out-coupling optical element is configured to couple light from the at least one illumination source out of the light-guiding component,
wherein said light-guiding component comprises two light-guiding components disposed on opposite sides of said at least one out-coupling optical element.

10. The system of any of the above Examples, wherein said image projector comprises a visible light source and modulator.

11. The system of any of the above Examples, wherein the light modulator comprises a spatial light modulator.

12. The system of any of the above Examples, wherein the at least one illumination source comprises an infrared (IR) light source configured to emit IR light.

13. The system of any of the above Examples, wherein the at least one illumination source comprises a visible light source configured to emit visible light.

14. The system of any of the Examples above, wherein said light-guiding component comprises a material that is transparent to visible light having a refractive index sufficient to guide light from said at least one illumination source in said light-guiding component by total internal reflection.

15. The system of any of the Examples above, wherein at least a portion of said light-guiding component is transparent and disposed at a location forward the user's eye when the user wears said frame such that said transparent portion transmits light from the environment forward the user to the user's eye to provide a view of the environment forward the user.

16. The system of any of the Examples above, wherein the at least one illumination in-coupling optical element comprises at least one prism.

17. The system of any of the Examples above, further comprising at least one image in-coupling optical element configured to in-couple light from the image projector into the light-guiding component so as to guide light from the image projector therein.

18. The system of any of the Examples above, wherein the image projector is configured to in-couple the image and the at least one illumination source is configured to in-couple light into the at least one illumination in-coupling optical element.

19. The system of any of the Examples above, further comprising an eyepiece configured to direct light into said user's eye to display augmented reality image content to the user's vision field, at least a portion of said eyepiece being transparent and disposed at a location forward the user's eye when the user wears said frame such that said transparent portion transmits light from the environment forward the user to the user's eye to provide a view of the environment forward the user.

20. The system of any of the Examples above, wherein said eyepiece comprises a waveguide and at least one image in-coupling optical element configured to in-couple light from the image projector into the waveguide so as to guide light from the image projector therein.

21. The system of any of the Examples above, wherein said light-guiding component is disposed on an inside portion of said eyepiece, wherein the inside portion is between the user's eye and the eyepiece.

22. The system of any of the Examples above, wherein said light-guiding component is disposed on an outside portion of said eyepiece, wherein the outside portion is between the environment and the eyepiece.

23. The system of any of the Examples above, wherein said light-guiding component is curved.

24. The system of any of the Examples above, wherein said light-guiding component has the shape of a portion of a cylinder.

25. The system of any of the Examples above, wherein said light-guiding component comprises a shield or visor attached to said frame.

26. The system of any of the Examples above, wherein said shield or visor is disposed on an inside portion of said display system.

27. The system of any of the Examples above, wherein said shield or visor is disposed on an outside portion of said display system.

28. The system of any of the Examples above, wherein said light-guiding component comprises a portion of said frame.

29. The system of any of the Examples above, wherein the at least one diffusive optical element is configured to couple light from the at least one illumination source out of the light-guiding component toward said user's eye.

30. The system of any of the Examples above, wherein the at least one diffusive optical element is configured to couple light from the at least one illumination source out of the light-guiding component toward the environment forward the user to the user's eye.

31. The system of any of the Examples above, wherein the at least one mask blocks light guided within said light-guiding component from exiting said light-guiding component.

32. The system of any of the Examples above, wherein said at least one mask reflects light from said at least one illumination source back into said light-guiding components.

33. The system of any of the Examples above, wherein said at least one mask is dichroic reflecting certain wavelengths emitted by said at least one illumination source and transmitting other wavelengths not emitted by said at least one illumination source.

34. The system of any of the Examples above, wherein said at least one mask is dichroic reflecting certain infrared wavelengths emitted by said at least one illumination source and transmitting other visible wavelengths not emitted by said at least one illumination source.

35. The system of any of the Examples above, wherein said at least one mask is configured to absorb light emitted by said illumination source.

36. The system of any of the Examples above, wherein said at least one mask opening is about 10 μm in diameter.

37. The system of any of the Examples above, wherein the at least one diffusive optical element extends across an area that is less than 5% the area of the at least one light-guiding component.

38. The system of any of the Examples above, wherein the at least one mask opening extends across an area that is less than 5% the area of the at least one light-guiding component.

39. The system of any of the Examples above, further comprising a light redirecting element configured to direct light received from said at least one illumination in-coupling optical element to within said light-guiding component such that said light-guiding component redirects said light to said at least one diffusive optical element.

40. The system of any of the Examples above, further comprising a light redirecting element configured to direct light received from said at least one illumination in-coupling optical element to within said light-guiding component such that said light-guiding component redirects said light to said at least one mask opening.

41. The system of any of the Examples above, further comprising a light redirecting element configured to direct light received from said at least one illumination in-coupling optical element to within said light-guiding component such that said light-guiding component redirects said light to said at least one out-coupling element.

42. The system of any of the Examples above, wherein said light redirecting element comprises an orthogonal pupil expander.

43. The system of any of the Examples above, further comprising at least one camera configured to image the user's eye using light from said at least one illumination source that is reflected from said eye.

44. The system of any of the Examples above, wherein said at least one camera comprises an eye tracking camera that is configured to communicate with electronics configured to track movement of said eye based on images from said at least one camera.

45. The system of any of the Examples above, wherein said light-guiding component has a circular shape.

46. The system of any of the Examples above, wherein said light-guiding component comprises two light-guiding components disposed on opposite sides of said at least one diffusive optical element.

47. The system of any of the Examples above, wherein said at least one light-guiding component comprises first and second light-guiding components disposed on opposite sides of a diffusive film.

48. The system of any of the Examples above, wherein said at least one diffusive optical element comprises a pair of diffusive optical elements disposed on opposite sides of said light-guiding component.

49. The system of any of the Examples above, wherein said at least one diffusive optical element comprises first and second diffusive films disposed on opposite sides of said light-guiding component.

50. The system of any of the Examples above, wherein said at least one diffusive optical element comprises first and second diffusive optical elements configured to direct light into distributions oriented in different first and second directions.

51. The system of any of the Examples above, wherein said at least one diffusive optical element comprises first and second diffusive optical elements configured to selectively direct light having first and second wavelengths, respectively, into distributions oriented in different first and second directions, and said at least one illumination source comprising first and second light sources that selectively emits said first and second wavelengths respectively.

52. The system of any of the Examples above, wherein said at least one illumination source comprises a plurality of illuminations sources.

53. The system of any of the Examples above, wherein said at least one illumination source comprises a plurality of illuminations sources and said at least one diffusive optical element directs light from different illumination sources into respective distributions oriented in different directions.

54. The system of any of the Examples above, wherein said at least one illumination source comprises a plurality of illuminations sources and said at least one diffusive optical element directs light from different illumination sources as if originating from different respective locations forward said at least one light-guiding component.

55. The system of any of the Examples above, wherein said at least one illumination source comprises a laser, LED, or vertical cavity surface emitting laser (VCSEL).

56. The system of any of the Examples above, wherein said at least one illumination source further comprises at least one filter.

57. The system of any of the Examples above, wherein said at least one diffusive optical element is refractive, reflective, diffractive, or any combination thereof.

58. The system of any of the Examples above, wherein said at least one diffusive optical element comprises one or more diffuser sheets, one or more light shaping diffusers, one or more diffuser films, one or more etchings, one or more transmissive optical elements, one or more particles, one or more irregular surfaces, one or more surface relieve structures, PTFE, Teflon, ground glass, opal glass, greyed glass, one or more white surfaces, colored gel, one or more holograms or any combination thereof.

59. The system of any of the Examples above, wherein said at least one diffusive optical element is wavelength selective so as to substantially selectively diffuse one or more wavelengths of light emitted from the at least one illumination source and not others.

60. The system of any of the Examples above, wherein the system comprises a plurality of diffusive optical elements and at least one illumination source emits a plurality of wavelength bands of light, and wherein different of the diffusive optical elements selectively diffuse respective ones of the plurality of wavelength bands from the at least one illumination source.

61. The system of any of the Examples above, wherein said at least one diffusive optical element does not re-direct visible light from said environment.

62. The system of any of the Examples above, wherein said at least one diffusive optical element is configured to direct light from said illumination source toward said environment.

63. The system of any of the Examples above, wherein said at least one illumination source comprises an infrared source configured to output infrared light and said at least one diffusive optical element is configured to direct infrared light from said at least one illumination source toward said environment to provide depth sensing.

64. The system of any of the Examples above, wherein said at least one illumination source comprises a visible source configured to output visible light and said at least one diffusive optical element is configured to direct visible light from said at least one illumination source toward said environment to provide indicia to a non-user.

65. The system of any of the Examples above, wherein said at least one illumination source comprises a visible source configured to output visible light and said at least one diffusive optical element is configured to direct visible light from said at least one illumination source toward said eye to provide indicia to the user.

66. The system of any of the Examples above, wherein said at least one illumination source comprises a visible source configured to output visible light and said at least one diffusive optical element is configured to direct visible light from said at least one illumination source toward a periphery of an eye.

67. The system of any of the Examples above, wherein said at least one illumination source comprises a visible source, an infrared source, or both configured to output light and said at least one diffusive optical element is configured to direct the light from said at least one illumination source toward said environment to provide a signal or fiducial to an external sensor or external imaging sensor.

68. The system of any of the Examples above, wherein said at least one illumination source comprises a visible source, an infrared source or both configured to output light and said at least one diffusive optical element is configured to direct the light from said at least one illumination source toward said user to provide a signal or fiducial to an external sensor or external imaging sensor.

69. The system of any of the Examples above, wherein the at least one out-coupling optical element extends across an area that is less than 5% the area of the at least one light-guiding component.

70. The system of any of the Examples above, wherein said light-guiding component comprises two light-guiding components disposed on opposite sides of said at least one out-coupling optical element.

71. The system of any of the Examples above, wherein said at least one light-guiding component comprises first and second light-guiding components disposed on opposite sides of an out-coupling optical film.

72. The system of any of the Examples above, wherein said at least one out-coupling optical element comprises a pair of out-coupling optical element disposed on opposite sides of said light-guiding component.

73. The system of any of the Examples above, wherein said at least one out-coupling optical element comprises first and second out-coupling optical films disposed on opposite sides of said light-guiding component.

74. The system of any of the Examples above, wherein said at least one out-coupling optical element comprises first and second out-coupling optical elements configured to direct light into distributions oriented in different first and second directions.

75. The system of any of the Examples above, wherein said at least one out-coupling optical element comprises first and second out-coupling optical elements configured to selectively direct light having first and second wavelengths, respectively, into distributions oriented in different first and second directions, and said at least one illumination source comprising first and second light sources that selectively emits said first and second wavelengths respectively.

76. The system of any of the Examples above, wherein said at least one illumination source comprises a plurality of illuminations sources.

77. The system of any of the Examples above, wherein said at least one illumination source comprises a plurality of illuminations sources and said at least one out-coupling optical element directs light from different illumination sources into respective distributions oriented in different directions.

78. The system of any of the Examples above, wherein said at least one illumination source comprises a plurality of illuminations sources and said at least one out-coupling optical element directs light from different illumination sources as if originating from different respective locations forward said at least one light-guiding component.

79. The system of any of the Examples above, wherein said at least one illumination source comprises a laser, LED, or vertical cavity surface emitting laser (VCSEL).

80. The system of any of the Examples above, wherein said at least one illumination source further comprises at least one filter.

81. The system of any of the Examples above, wherein said at least one out-coupling optical element is refractive, reflective, diffractive, or any combination thereof.

82. The system of any of the Examples above, wherein said at least one out-coupling optical element comprises one or more diffuser sheets, one or more light shaping diffusers, one or more diffuser films, one or more etchings, one or more transmissive optical elements, one or more particles, one or more irregular surfaces, one or more surface relieve structures, PTFE, Teflon, ground glass, opal glass, greyed glass, one or more white surfaces, colored gel, one or more holograms or any combination thereof.

83. The system of any of the Examples above, wherein said at least one out-coupling optical element is wavelength selective so as to substantially only interact with a wavelength band of light emitted from the at least one illumination source.

84. The system of any of the Examples above, wherein the system comprises a plurality of out-coupling optical elements and at least one illumination source emits a plurality of wavelength bands of light, and wherein each out-coupling optical element is wavelength selective so as to substantially only interact with different wavelength bands of light emitted from the at least one illumination source.

85. The system of any of the Examples above, wherein said at least one out-coupling optical element does not re-direct visible light from said environment.

86. The system of any of the Examples above, wherein said at least one out-coupling optical element is configured to direct light from said illumination source toward said environment.

87. The system of any of the Examples above, wherein said at least one illumination source comprises an infrared source configured to output infrared light and said at least one out-coupling optical element is configured to direct infrared light from said at least one illumination source toward said environment to provide depth sensing.

88. The system of any of the Examples above, wherein said at least one illumination source comprises a visible source configured to output visible light and said at least one out-coupling optical element is configured to direct visible light from said at least one illumination source toward said environment to provide indicia to a non-user.

89. The system of any of the Examples above, wherein said at least one illumination source comprises a visible source configured to output visible light and said at least one out-coupling optical element is configured to direct visible light from said at least one illumination source toward said eye to provide indicia to the user.

90. The system of any of the Examples above, wherein said at least one illumination source comprises a visible source configured to output visible light and said at least one out-coupling optical element is configured to direct visible light from said at least one illumination source toward a periphery of an eye.

91. The system of any of the Examples above, wherein said at least one illumination source comprises a visible source, an infrared source, or both configured to output light and said at least one out-coupling optical element is configured to direct the light from said at least one illumination source toward said environment to provide a signal or a fiducial to an external sensor or external imaging sensor.

92. The system of any of the Examples above, wherein said at least one illumination source comprises a visible source, an infrared source, or both configured to output light and said at least one out-coupling optical element is configured to direct the light from said at least one illumination source toward said user to provide a signal or a fiducial to an sensor or external imaging sensor.

93. The system of any of the Examples above, wherein the image projector and the illumination source share the same in-coupling optical element and light-guiding component.

94. The system of any of the Examples above, wherein said at least one out-coupling optical element comprises at least one diffusive optical element or at least one diffusive film or any combination thereof.

95. The system of any of the Examples above, wherein said at least one out-coupling optical element comprises at least one diffractive optical element or at least one holographical optical element or any combination thereof.

Additional Considerations

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially exampled as such, one or more features from an exampled combination may in some cases be excised from the combination, and the exampled combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended examples are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following examples. In some cases, the actions recited in the examples may be performed in a different order and still achieve desirable results.

Accordingly, the disclosure are not intended to be limited to the embodiments shown herein, but are to be accorded the widest scope consistent with this disclosure, the principles and the novel features disclosed herein.

What is claimed is:

1. A head-mounted display system configured to project light via one or more waveguides to an eye of a user wearing the head-mounted display system to display image content in a vision field of said user, said head-mounted display system comprising:
    a frame configured to be supported on a head of the user, the frame being distinct from the one or more waveguides utilized to display the image content in the vision field of said user, wherein at least a portion of the frame serves as a light-guiding component that is supplemental to the one or more waveguides and configured to provide illumination of the eye of the user separate from the light projected from the one or more waveguides for displaying the image content in the vison field of the user, and wherein the at least the portion of the frame is configured to cause light to be guided therein by total internal reflection to be out-coupled only at one or more discrete locations of the frame via a respective out-coupling element;
    an image projector configured to project an image;
    at least one illumination source;
    at least one illumination in-coupling optical element configured to in-couple light from the at least one illumination source into the at least the portion of the frame serving as the light-guiding component so as to guide light from the at least one illumination source through the at least the portion of the frame; and
    at least one diffusive optical element disposed on a surface of the at least the portion of the frame serving as the light-guiding component so as to be positioned forward one of the user's eyes when the frame is worn by the user, wherein the at least one diffusive optical element serves as the out-coupling element at one discrete location of the frame and is configured to diffusively couple light from the at least one illumination source out of the at least the portion of the frame serving as the light-guiding component toward the eye of the user, and wherein the at least one diffusive optical element extends across an area that is less than 5% the area of the light-guiding component.

2. The system of claim 1, wherein the at least one illumination source comprises an infrared (IR) light source configured to emit IR light.

3. The system of claim 1, wherein said light-guiding component comprises a material that is transparent to visible light having a refractive index sufficient to guide light from said at least one illumination source in said light-guiding component by total internal reflection.

4. The system of claim 1, wherein the at least one diffusive optical element is configured to couple light from the at least one illumination source out of the light-guiding component toward said user's eye.

5. The system of claim 1, wherein the at least one diffusive optical element is configured to couple light from the at least one illumination source out of the light-guiding component toward the environment forward the user to the user's eye.

6. The system of claim 1, wherein said at least one light-guiding component comprises first and second light-guiding components disposed on opposite sides of a diffusive film.

7. The system of claim 1, wherein said at least one diffusive optical element comprises a pair of diffusive optical elements disposed on opposite sides of said light-guiding component.

8. The system of claim 1, wherein said at least one diffusive optical element comprises first and second diffusive optical elements configured to direct light into distributions oriented in different first and second directions.

9. The system of claim 1, wherein said at least one diffusive optical element comprises first and second diffusive optical elements configured to selectively direct light having first and second wavelengths, respectively, into distributions oriented in different first and second directions, and said at least one illumination source comprises first and second light sources that selectively emit said first and second wavelengths respectively.

10. The system of claim 1, wherein said at least one illumination source comprises a plurality of illumination sources and said at least one diffusive optical element directs light from different illumination sources into respective distributions oriented in different directions.

11. The system of claim 1, wherein said at least one illumination source comprises a plurality of illumination sources and said at least one diffusive optical element directs light from different illumination sources as if originating from different respective locations forward said at least one light-guiding component.

12. The system of claim 1, wherein said at least one diffusive optical element is refractive, reflective, diffractive, or any combination thereof.

13. The system of claim 1, wherein said at least one diffusive optical element comprises one or more diffuser sheets, one or more light shaping diffusers, one or more diffuser films, one or more etchings, one or more transmissive optical elements, one or more particles, one or more irregular surfaces, one or more surface relieve structures, PTFE, Teflon, ground glass, opal glass, greyed glass, one or more white surfaces, colored gel, one or more holograms or any combination thereof.

14. The system of claim 1, wherein said at least one diffusive optical element is wavelength selective so as to substantially selectively diffuse one or more wavelengths of light emitted from the at least one illumination source and not others.

15. The system of claim 1, wherein the system comprises a plurality of diffusive optical elements and the at least one illumination source emits a plurality of wavelength bands of light, and wherein different diffusive optical elements selectively diffuse different wavelength bands of light from the at least one illumination source.

16. The system of claim 1, wherein light is coupled out of the light-guiding component from a region peripheral with respect to a field-of-view of the user's eye.

17. The system of claim 1, wherein the system comprises a plurality of diffusive optical elements arranged along a line.

18. The system of claim 1, wherein the frame comprises at least one arm, and wherein the at least one diffusive optical element is disposed on the at least one arm.

* * * * *

UNITED STATES PATENT AND TRADEMARK OFFICE
CERTIFICATE OF CORRECTION

PATENT NO. : 12,001,016 B2
APPLICATION NO. : 17/459958
DATED : June 4, 2024
INVENTOR(S) : Lionel Ernest Edwin et al.

Page 1 of 1

It is certified that error appears in the above-identified patent and that said Letters Patent is hereby corrected as shown below:

In the Claims

Column 61, Claim 5, Line 10:
"environment forward the user to the user's eye."
Should read:
--environment forward the user's eye.--.

Column 61, Claim 6, Lines 11-12:
"wherein said at least one light-guiding component"
Should read:
--wherein said light-guiding component--.

Column 61, Claim 9, Line 30:
"second wavelengths respectively."
Should read:
--second wavelengths, respectively.--.

Column 62, Claim 11, Lines 3-4:
"locations forward said at least one light-guiding component."
Should read:
--locations forward said light-guiding component.--.

Signed and Sealed this
Seventh Day of January, 2025

Derrick Brent
*Acting Director of the United States Patent and Trademark Office*